US012761536B2

(12) United States Patent
Gonzalez

(10) Patent No.: US 12,761,536 B2

(45) Date of Patent: Oct. 13, 2026

(54) POINT OF VIEW CAMERA HOUSING

(71) Applicant: Juan Josue Gonzalez, Fort Worth, TX (US)

(72) Inventor: Juan Josue Gonzalez, Fort Worth, TX (US)

( * ) Notice: Subject to any disclaimer, the term of this patent is extended or adjusted under 35 U.S.C. 154(b) by 251 days.

(21) Appl. No.: 18/545,618

(22) Filed: Dec. 19, 2023

(65) Prior Publication Data

US 2025/0147391 A1 May 8, 2025

Related U.S. Application Data

(60) Provisional application No. 63/433,875, filed on Dec. 20, 2022.

(51) Int. Cl.

| | |
|---|---|
| ***G03B 17/56*** | (2021.01) |
| ***A41D 20/00*** | (2006.01) |
| ***A42B 3/04*** | (2006.01) |
| ***A42B 3/12*** | (2006.01) |
| ***A42B 3/20*** | (2006.01) |
| ***A42B 3/30*** | (2006.01) |
| ***G03B 29/00*** | (2021.01) |
| ***H04N 5/265*** | (2006.01) |
| ***H04N 7/08*** | (2006.01) |
| ***H04N 13/156*** | (2018.01) |
| ***H04N 13/239*** | (2018.01) |
| ***H04N 23/51*** | (2023.01) |

(Continued)

(52) U.S. Cl.

CPC ........... *G03B 17/561* (2013.01); *A41D 20/00* (2013.01); *A42B 3/042* (2013.01); *A42B 3/127* (2013.01); *A42B 3/20* (2013.01); *A42B 3/30* (2013.01); *G03B 29/00* (2013.01); *H04N 5/265* (2013.01); *H04N 7/0806* (2013.01); *H04N 23/51* (2023.01); *H04N 23/90* (2023.01); *A41D 1/04* (2013.01); *A41D 13/0015* (2013.01); *G03B 2217/002* (2013.01); *H04N 13/156* (2018.05); *H04N 13/239* (2018.05)

(58) Field of Classification Search

CPC ...... H04N 5/265; H04N 7/0806; H04N 23/51; H04N 23/90; H04N 23/45; H04N 13/156; H04N 13/239; G03B 17/561; G03B 29/00; G03B 2217/002; A42B 3/042; A42B 3/127; A42B 3/20; A42B 3/30; A41D 20/00; A41D 1/04; A41D 13/0015

See application file for complete search history.

(56) References Cited

U.S. PATENT DOCUMENTS

| | | | | |
|---|---|---|---|---|
| 9,432,565 B2 * | 8/2016 | Martin | .................. | H04N 23/50 |
| 10,567,641 B1 * | 2/2020 | Rueckner | ............... | H04N 23/62 |

(Continued)

*Primary Examiner* — Twyler L Haskins

*Assistant Examiner* — John H Morehead, III

(74) *Attorney, Agent, or Firm* — Snell & Wilmer L.L.P.

(57) ABSTRACT

Disclosed herein is a point of view camera system. The point of view camera system includes a camera mount configured to attach to a headwear, the camera mount including a base configured to secure the camera mount to the headwear, a first camera including a first image sensor and a first camera lens, a second camera including a second image sensor and a second camera lens, and a camera housing configured to attach to the camera mount. The camera housing includes a first opening configured to receive and secure the first camera and a second opening configured to receive and secure the second camera.

11 Claims, 40 Drawing Sheets

(51) Int. Cl.

| | |
|---|---|
| ***H04N 23/90*** | (2023.01) |
| *A41D 1/04* | (2006.01) |
| *A41D 13/00* | (2006.01) |

(56) References Cited

U.S. PATENT DOCUMENTS

| | | | | |
|---|---|---|---|---|
| 10,642,050 | B1* | 5/2020 | Kothari | H04N 23/51 |
| 10,944,893 | B1* | 3/2021 | Daulton | G06F 1/1632 |
| 2006/0055786 | A1* | 3/2006 | Ollila | H04N 23/50<br>348/207.99 |
| 2009/0109292 | A1* | 4/2009 | Ennis | A42B 3/042<br>348/158 |
| 2018/0017850 | A1* | 1/2018 | Shen | F16M 11/04 |
| 2019/0265645 | A1* | 8/2019 | Northrup | G07D 7/0032 |
| 2019/0268550 | A1* | 8/2019 | Arnold | A42B 3/042 |
| 2019/0387178 | A1* | 12/2019 | Ogata | H04N 23/90 |
| 2020/0193162 | A1* | 6/2020 | Birch | G06T 7/248 |
| 2020/0409242 | A1* | 12/2020 | Isakov | G03B 29/00 |
| 2021/0051253 | A1* | 2/2021 | Liu | G06F 1/3231 |
| 2021/0392243 | A1* | 12/2021 | Salemnia | G03B 17/04 |
| 2022/0217253 | A1* | 7/2022 | Tian | H04N 23/51 |
| 2022/0294986 | A1* | 9/2022 | Ha | G01S 3/7864 |
| 2022/0394889 | A1* | 12/2022 | Maric | G02B 7/028 |

* cited by examiner

POINT OF VIEW CAMERA HOUSING

CROSS-REFERENCE TO RELATED APPLICATIONS

This application claims priority to and the benefit of U.S. Provisional Patent Application No. 63/433,875, entitled "Point of View Camera Housing", filed Dec. 20, 2022, which is hereby incorporated by reference in its entirety for all purposes.

FIELD

The present disclosure generally relates to camera housings, and more specifically, to wearable camera housings.

BACKGROUND

As cameras, including video cameras, become increasingly smaller and portable they are used with increasing frequency for a variety of tasks. A variety of camera mounts have been devised allowing people to record their everyday activities. One example includes the use of vests for chest mounted cameras, such as those used by police officers. Another example is a helmet mount that positions the camera directly overhead of the user providing a view of the surroundings. Each camera mount has its benefits and drawbacks. It remains a difficult task to mount a camera close to the eyes of a person while keeping both the person and the camera safe.

SUMMARY

Disclosed herein is a point of view camera system including a camera mount, a camera housing, a first camera, a second camera, a controller, and a power source. The camera mount is configured to attach to a headwear and includes a first portion extending in a first direction, a second portion extending in a second direction approximately orthogonal to the first portion, a third portion extending in the second direction approximately orthogonal to the first portion, the second portion and the third portion coupled to the first portion and the second portion adjacent the third portion, and a camera securing feature extending from the first portion. The camera housing is configured to attach to the camera mount and includes a top, a bottom, a first sidewall coupled to the top and the bottom, a second sidewall coupled to the top and the bottom opposite the first sidewall, a front wall coupled to the first sidewall, the second sidewall, the top, and the bottom, a back wall coupled to the first sidewall, the second sidewall, the top, and the bottom opposite the front wall, a first opening in the front wall, a second opening in the front wall adjacent the first opening, and a housing securing feature extending from the back wall and configured to engage the camera securing feature to secure the camera housing to the camera mount. The first camera includes a first camera lens disposed within the first opening and a first image sensor coupled to the first camera lens. The second camera includes a second camera lens disposed within the second opening and a second image sensor coupled to the second camera lens. The controller is disposed within the first portion of the camera mount and coupled to the first camera and the second camera. The power source is disposed within the first portion of the camera mount and coupled to the first camera, the second camera, and the controller.

Also disclosed herein is a system including a first point of view camera, a second point of view camera, a remote server, a plurality of users, a processor, and a memory operatively coupled to the processor. The memory includes instructions stored thereon that, when executed by the processor, cause the processor receive a first video stream from the first point of view camera, receive a second video stream from the second point of view camera, synchronize the first video stream and the second video stream, receive a first player information from the remote server, receive a second player information from the remote server, insert the first player information in the first video stream, insert the second player information in the second video stream, combine the first video stream and the second video stream into a third video stream, and transmit the third video stream to the plurality of users.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1B:
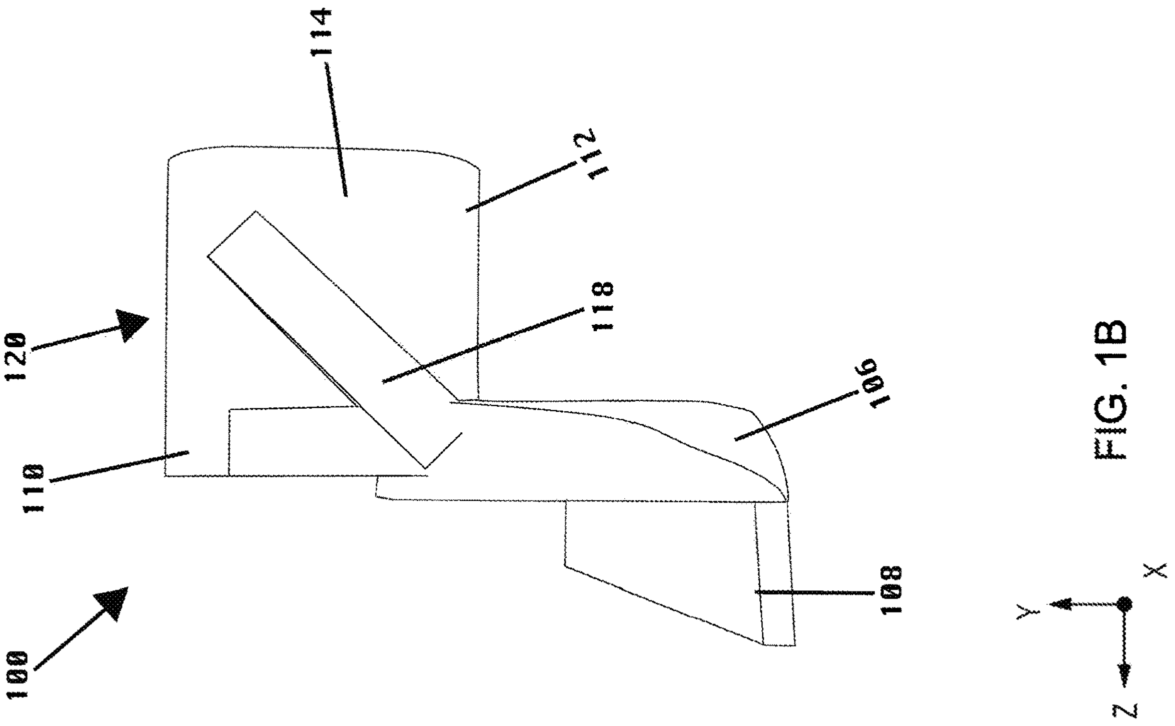
FIGS. 1A, 1B, 1C, and 1D illustrate a point of view camera mount for a single camera, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to “a,” “an” or “the” may include one or more than one and that reference to an item in the singular may also include the item in the plural. Further, all ranges may include upper and lower values and all ranges and ratio limits disclosed herein may be combined.

Disclosed herein is a point of view camera mount for attaching a camera to a person. In various embodiments, the point of view camera mount may be secured to the head of the person using a helmet, a hat, a headband, or a visor, among other articles of headwear. In various embodiments, the point of view camera mount may be secured to the chest of the person or a shoulder of the person such as being secured to a shirt, a jersey, a jacket, a coat, or a sweater, among other articles of clothing. In various embodiments, the point of view camera mount may include a single mount to securely hold a single camera. In various embodiments, the point of view camera mount may include two mounts to securely hold two cameras. In various embodiments, the point of view camera mount may be a single monolithic unit. In various embodiments, the point of view camera mount may include two portions, a base portion and a detachable camera portion.

Also disclosed herein is a point of view camera system to be secured to a person. In various embodiments, the point of view camera system may be secured to a helmet, a hat, a headband, or a visor, among other articles of headwear. In various embodiments, the point of view camera system may be integrated into a facemask of a football helmet such that the lens of the camera is in close proximity to the eyes of the wearer. In various embodiments, the point of view camera system may be a single monolithic unit. In various embodiments, the single monolithic unit may be detachable from the headwear. In various embodiments, the point of view camera system may include a mount portion and a detachable camera portion. In various embodiments, components of the point of view camera system may be integrated into the headwear (e.g., beneath the padding of a football helmet). In various embodiments, the point of view camera system may include a single integrated camera. In various embodiments, the point of view camera system may include two integrated cameras. In various embodiments, the point of view camera system may include a fastener to further secure the camera system to the headwear. In various embodiments, the fastener may include as a clip, a latch, a snap button, or an adhesive, among others.

Also disclosed herein is a system for recording, streaming, retrieving, synchronizing, and transmitting one or more still images and/or videos recorded by a camera secured by the point of view camera mount or the point of view camera system. In various embodiments, the one or more still images and/or videos may include audio associated with the one or more images and/or videos. In various embodiments, the system may further incorporate player information, statistics, advertisements, and/or other information. In various embodiments, the system may display still images and/or videos from a single camera in real time. In various embodiments, the system may display still images and/or videos from multiple cameras (e.g., four cameras) simultaneously in real time. In various embodiments, the still images and/or videos from the multiple cameras may be synchronized to provide real time, simultaneous views from the multiple cameras.

Figure 1A:
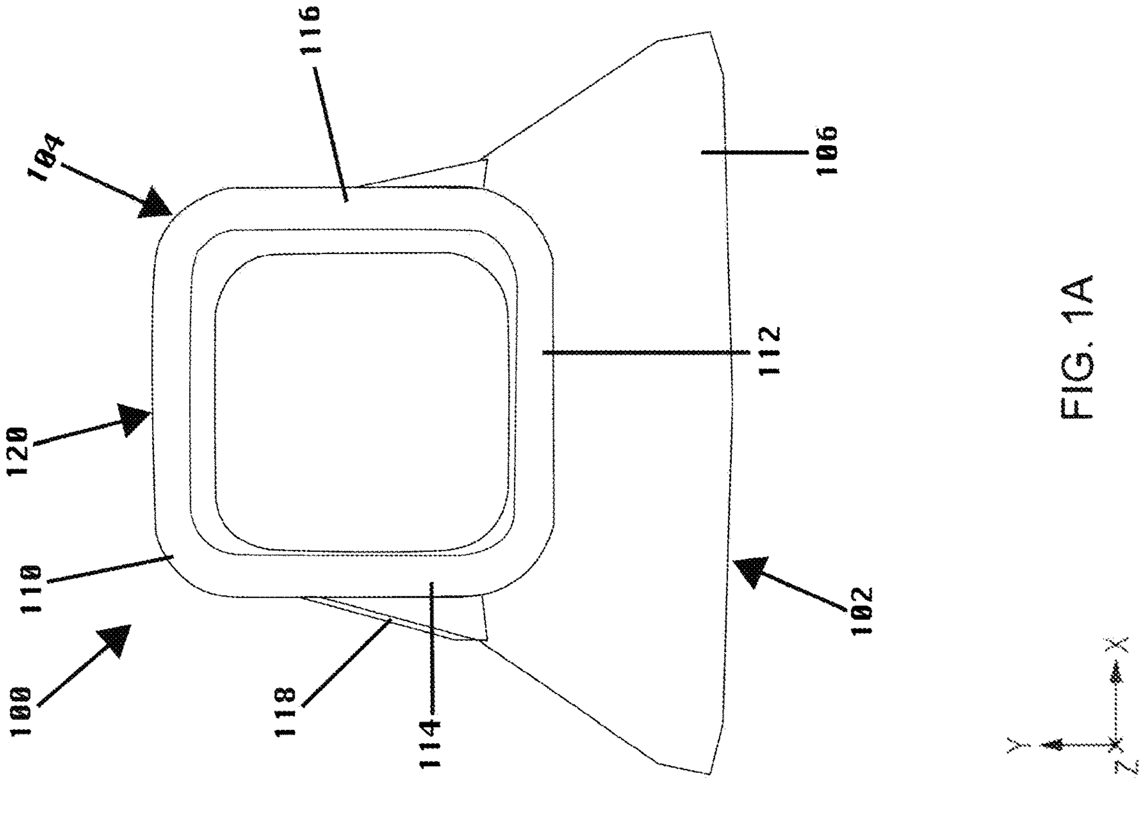
Figure 1D:
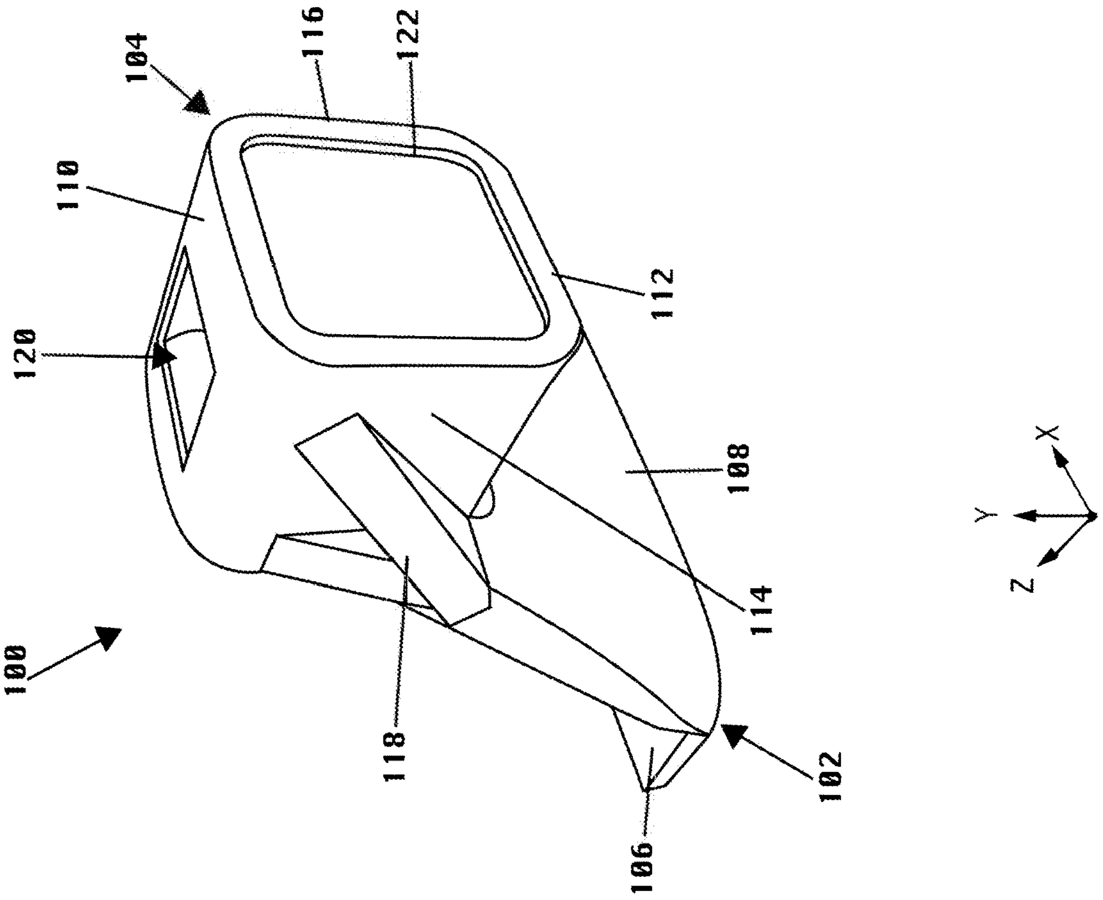
Figure 1C:
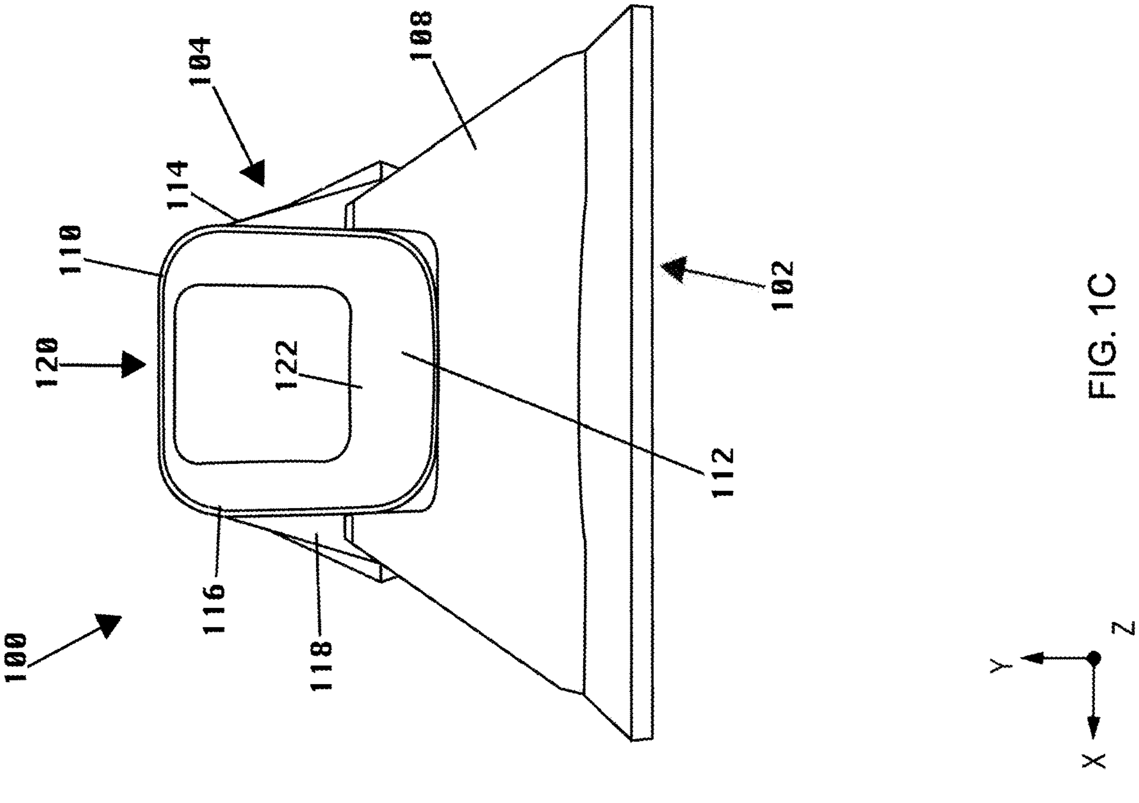

Referring now to FIGS. 1A-1D, illustrated are various views of a point of view (POV) camera mount 100, in accordance with various embodiments. FIG. 1A illustrates a front view of POV camera mount 100. FIG. 1B illustrates a side view of POV camera mount 100. FIG. 1C illustrates a back view of POV camera mount 100. FIG. 1D illustrates a perspective view of POV camera mount 100. In various embodiments, POV camera mount 100 may be used to secure a still or video camera to the head or body of a person in order to provide a point of view video. In various embodiments, POV camera mount 100 may be configured to secure a single camera to a headwear such as a helmet, a hat, a headband, or a visor, among other. For simplicity and ease of discussion, the description below will refer to a football helmet. It should be appreciated that any type of headwear may be used while remaining within the scope of this disclosure.

POV camera mount 100 includes a base 102 and a camera housing 104 coupled to the base 102. Base 102 includes a first portion 106 that extends in a first plane (e.g., the z-plane) and a second portion 108 that extends orthogonally to first portion 106 (e.g., the y-plane). In various embodiments, base 102 may be a single monolithic component including first portion 106 and second portion 108. In various embodiments, first portion 106 and second portion 108 may be separate components that are coupled together to form base 102. Base 102 may be used to secure POV camera mount 100 to the football helmet such as between the football helmet and a facemask. In various embodiments, first portion 106 may extend away from the facemask and into the football helmet and second portion 108 may fit between the facemask and the football helmet. This arrangement secures POV camera mount 100 to the football helmet so that it can be used during practices, drills, and/or other events.

Camera housing 104 is coupled to base 102, and more specifically, to second portion 108 opposite first portion 106. In various embodiments, camera housing 104 and base 102 may be a single monolithic component forming POV camera mount 100. In various embodiments, camera housing 104 and base 102 may be separate components that are coupled together to form POV camera mount 100. Camera housing 104 includes a top 110, a bottom 112, a first sidewall 114, and a second sidewall 116. Top 110 is above (e.g., in the positive y-direction) bottom 112, first sidewall 114, and second sidewall 116. Bottom 112 is below (e.g., in the negative y-direction) top 110, first sidewall 114, and second sidewall 116. First sidewall 114 is coupled to a first side of top 110 and a first side of bottom 112 and second sidewall 116 is coupled to a second side of top 110 and a second side of bottom 112 thereby forming a rectangular prism. Furthermore, top 110, bottom 112, first sidewall 114, and second sidewall 116 define an opening, or cavity, that is configured to secure a camera. The sizing and spacing of camera housing 104 (i.e., top 110, bottom 112, first sidewall 114, and second sidewall 116) may be modified for use with a variety of different sports cameras.

In various embodiments, camera housing 104 may further include one or more supports 118. The one or more supports 118 may be secured to base 102 at a first end and to camera housing 104 at a second end. More specifically, the one or more supports 118 may be secured to the second portion 108 of base 102 at the first end and to first sidewall 114 or second sidewall 116 at the second end. The one or more supports may be used provide additional structural support for the camera that is secured by camera housing 104. Additionally, camera housing 104 may rest on the facemask of the football helmet.

In various embodiments, camera housing 104 may further include an opening 120 in top 110. Opening 120 may provide access to controls of the camera secured by camera housing 104. In various embodiments, opening 120 may be formed in first sidewall 114 and/or second sidewall 116. In various embodiments, camera housing 104 may further include a structure 122 to further secure the camera. Structure 122 may be a ridge or other protrusion configured to interface with and secure the camera. In various embodiments, structure 122 may further include an adhesive material, a hook and loop assembly, or a rubber material, among others, to provide friction to secure the camera in place.

Figure 2B:
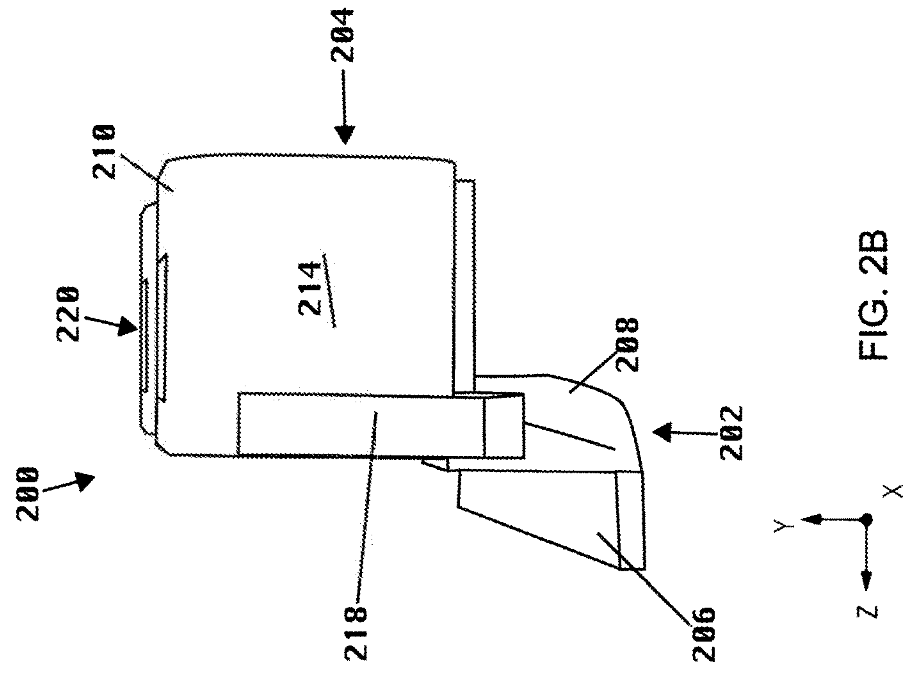
FIGS. 2A, 2B, 2C, and 2D illustrate a point of view camera mount for two cameras, in accordance with various embodiments.
Figure 2A:
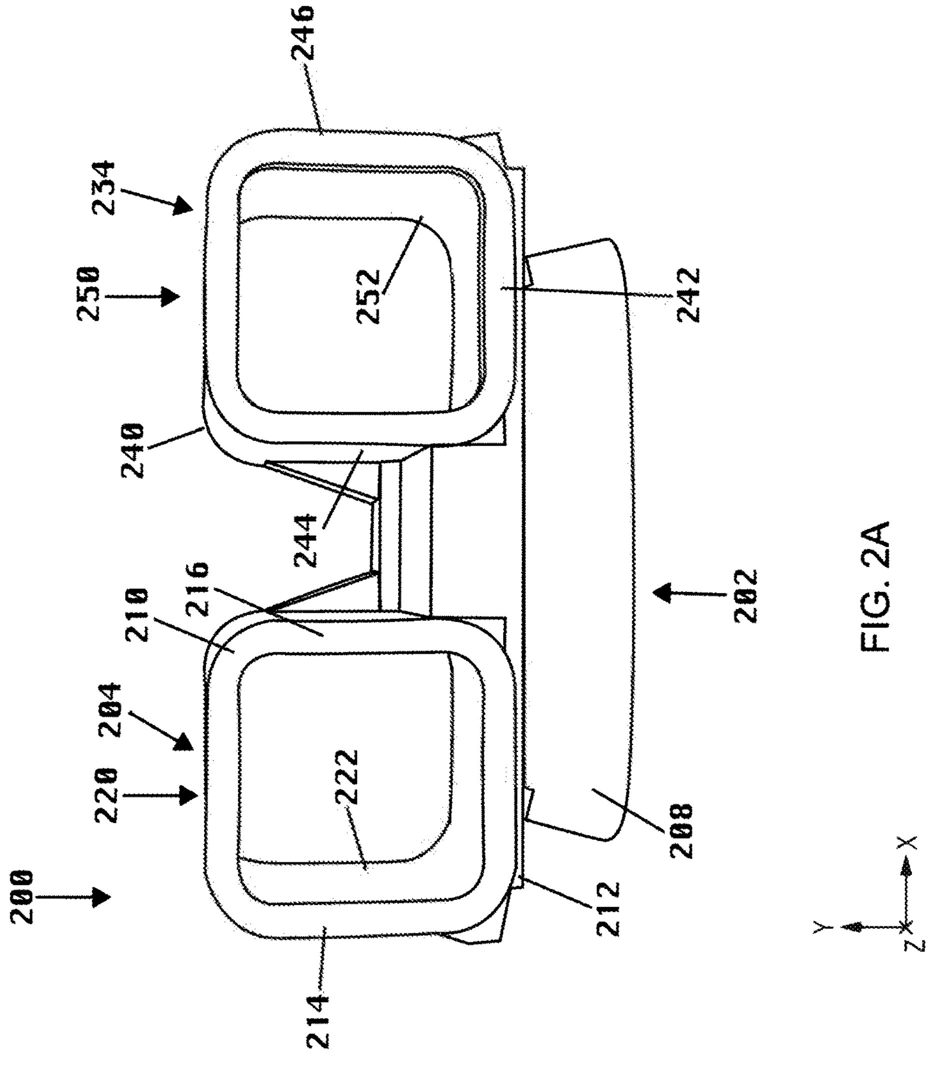
Figure 2D:
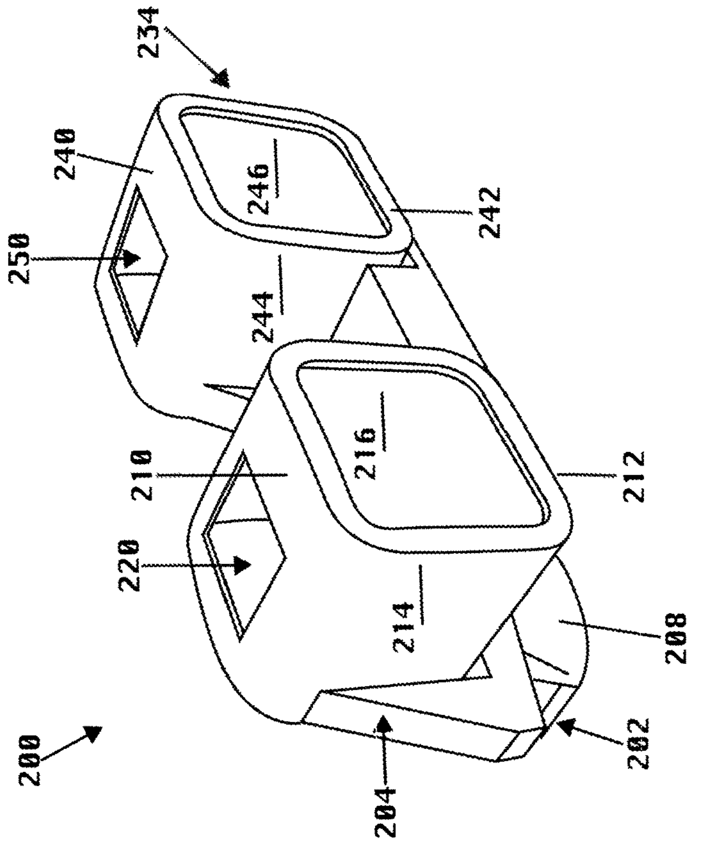
Figure 2C:
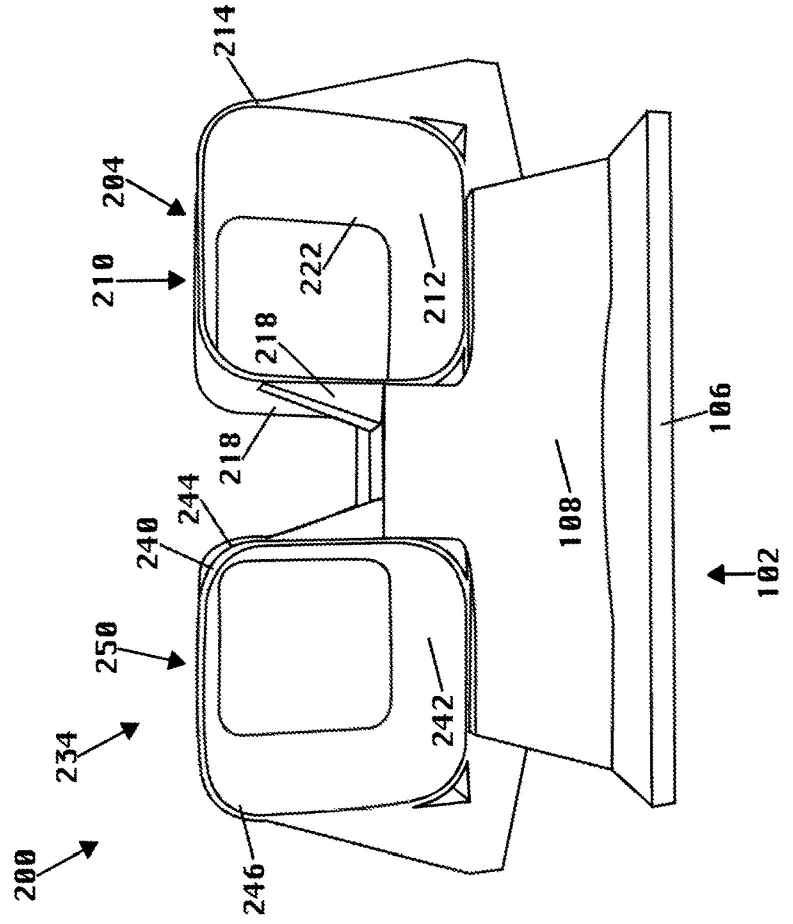

Referring now to FIGS. 2A-2D, illustrated are various views of a point of view (POV) camera mount 200, in accordance with various embodiments. FIG. 2A illustrates a front view of POV camera mount 200. FIG. 2B illustrates a side view of POV camera mount 200. FIG. 2C illustrates a back view of POV camera mount 200. FIG. 2D illustrates a perspective view of POV camera mount 200. POV camera mount 200 includes similar components to those described above with respect to POV camera mount 100 referenced in FIGS. 1A-1D, including a base 202, a first camera housing 204, a first portion 206, a second portion 208, a first top 210, a first bottom 212, a first sidewall 214, a second sidewall 216, one or more supports 218, a first opening 220, and a first structure 222. POV camera mount 200 further includes a second camera housing 234 including a second top 240, a second bottom 242, a third sidewall 244, a fourth sidewall 246, one or more supports 248, a second opening 250, and a second structure 252. Each of these components is similar to those described above with respect to POV camera mount 100 in FIGS. 1A-1D. The description of each component may not be repeated below.

POV camera mount 200 is able to secure and support one or two cameras using first camera housing 204 and second camera housing 234. POV camera mount 200 allows users to view still images and/or videos from the two cameras in stereo or in a virtual reality setting. This tends to provide a more immersive experience for education, entertainment, and training, among other uses.

Figure 3B:
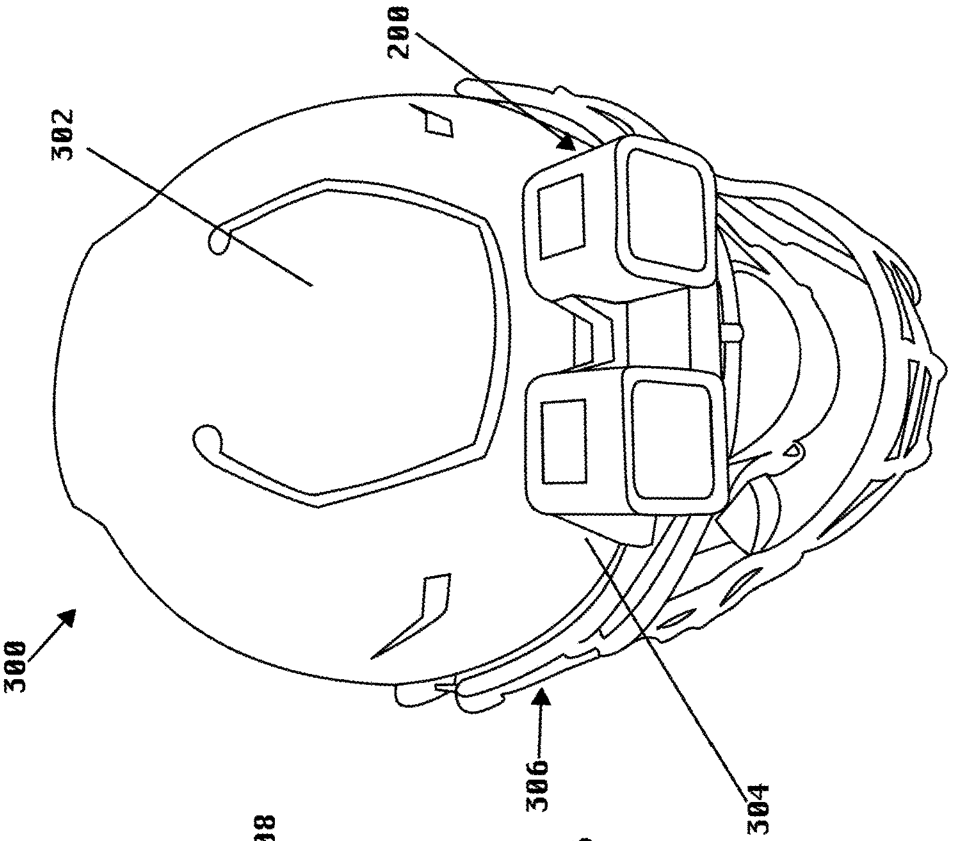
FIGS. 3A and 3B illustrate a football helmet with a point of view camera mounted thereon, accordance with various embodiments.
Figure 3A:
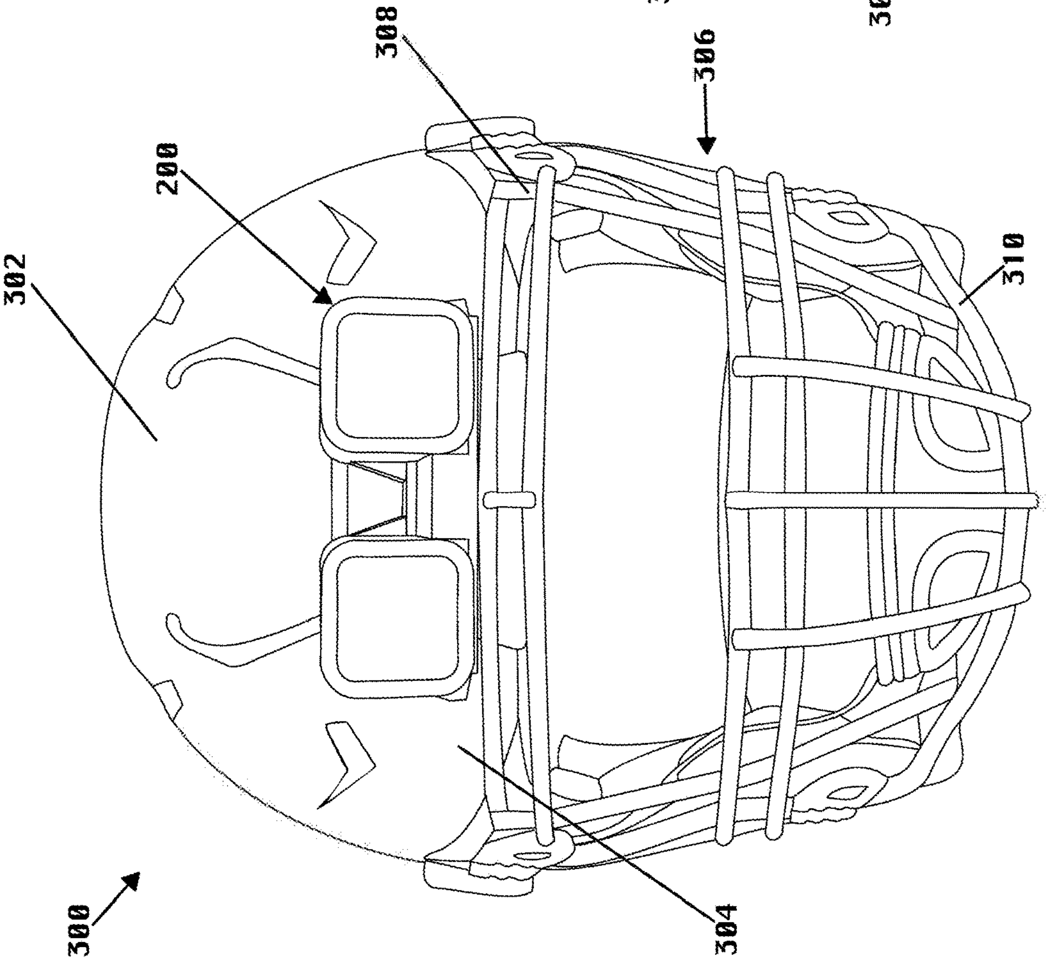

Referring now to FIGS. 3A and 3B, illustrated is a football helmet 300 with POV camera mount 200 attached, in accordance with various embodiments. Football helmet 300 has a top surface 302 and a front surface 304. Football helmet further includes a facemask 306 having an upper portion 308 and a lower portion 310. Typical camera mounts are configured to be positioned on front surface 304 helmet 300. As disclosed herein, mounting the camera(s) closer to the eyes (e.g., POV camera mount 100 and POV camera mount 200) provides an improved point of view experience when watching the recorded video. As illustrated in FIGS. 3A and 3B, the camera mounts disclosed herein (e.g., POV camera mount 100 and POV camera mount 200) may be secured between the football helmet 300 and the facemask 306. More specifically, the camera mounts may be secured between front surface 304 and upper portion 308.

Figure 4B:
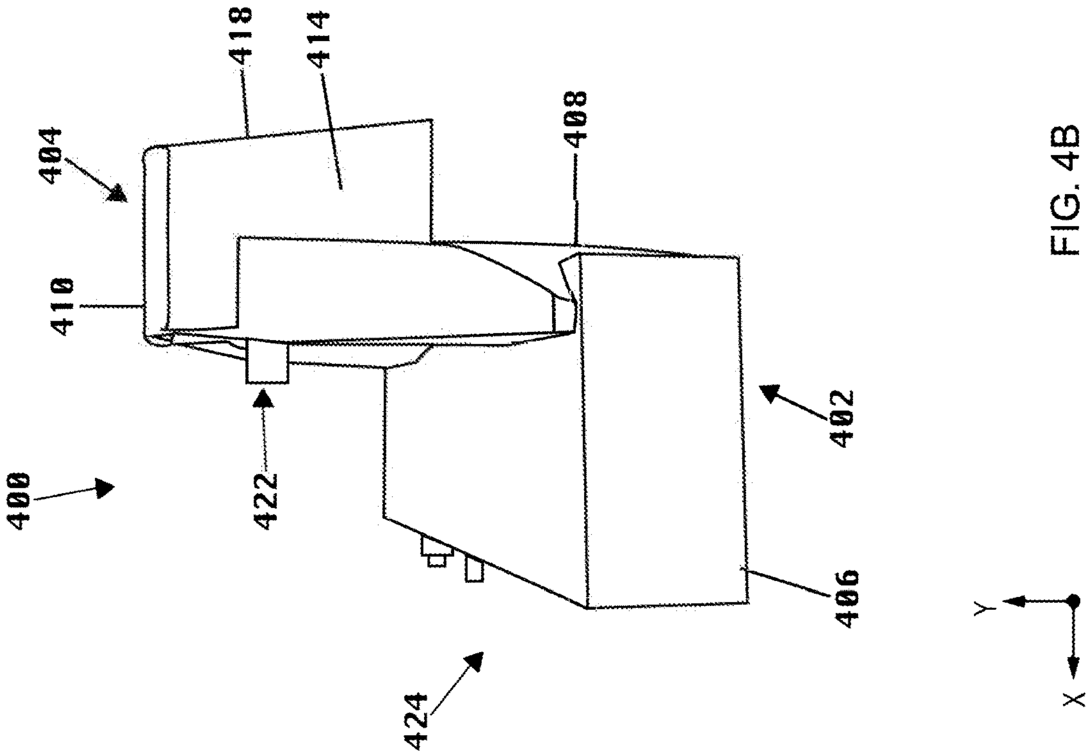
FIGS. 4A, 4B, 4C, 4D illustrate a point of view camera system including a single camera, in accordance with various embodiments.
Figure 4A:
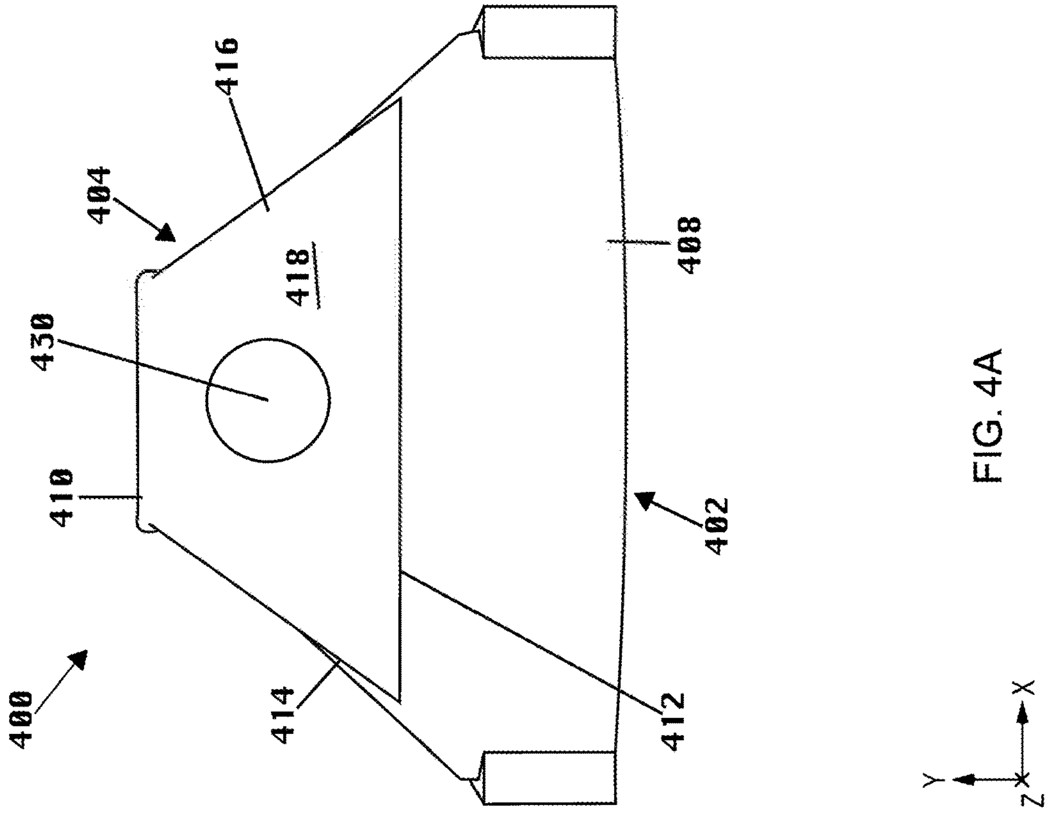
Figure 4D:
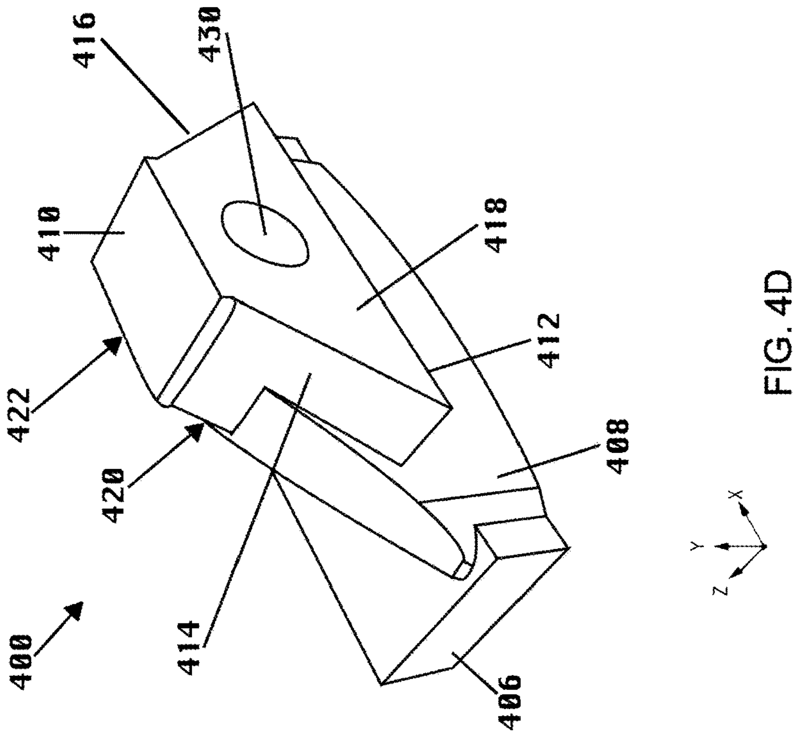
Figure 4C:
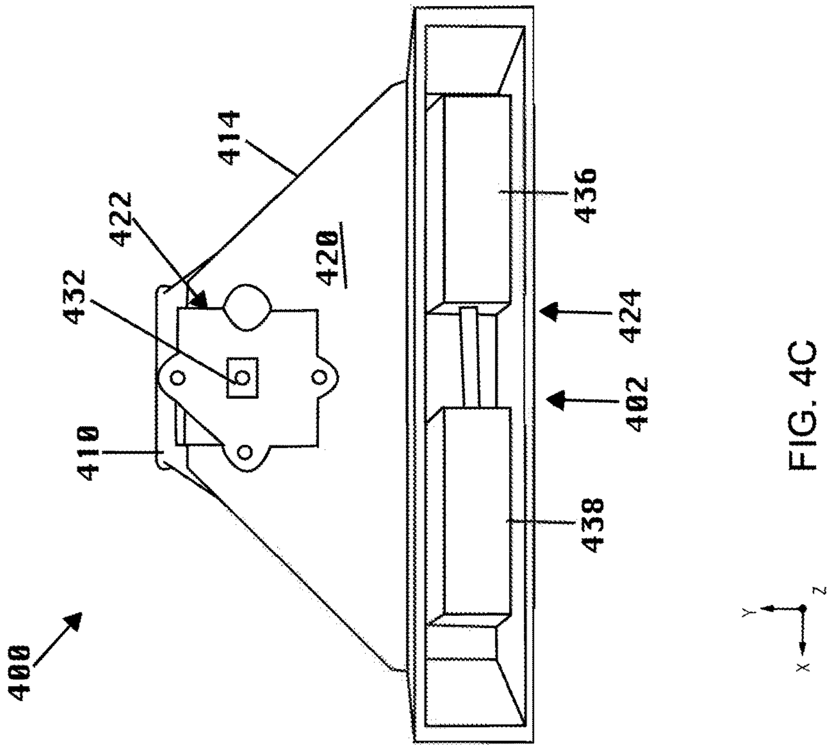

Referring now to FIGS. 4A-4D, illustrated is a point of view camera system 400, in accordance with various embodiments. FIG. 4A illustrates a front view of POV camera system 400, FIG. 4B illustrates a side view of POV camera system 400, FIG. 4C illustrates a side view of POV camera system 400, and FIG. 4D illustrates perspective view of POV camera system 400. POV camera system 400 includes a base 402 and a camera housing 404. Base 402 includes a first portion 406 that extends in a first plane (e.g., the z-plane) and a second portion 408 that extends orthogonally to first portion 406 (e.g., the y-plane). In various embodiments, base 402 may be a single monolithic component including first portion 406 and second portion 408. In various embodiments, first portion 406 and second portion 408 may be separate components that are coupled together to form base 402. Base 402 may be used to secure POV camera system 400 to the football helmet such as between the football helmet and a facemask. In various embodiments, first portion 406 may extend away from the facemask and into the football helmet and second portion 408 may fit between the facemask and the football helmet. This arrangement secures POV camera system 400 to the football helmet so that it can be used during practices, drills, and/or other events.

Camera housing 404 is coupled to base 402, and more specifically, to second portion 408. In various embodiments, camera housing 404 and base 402 may be a single monolithic component forming POV camera system 400. In various embodiments, camera housing 404 and base 402 may be separate components that are coupled together to form POV camera system 400. Camera housing 404 includes a top 410, a bottom 412, a first sidewall 414, and a second sidewall 416, a front wall 418, and a back wall 420. Top 410 is above (e.g., in the positive y-direction) bottom 412, first sidewall 414, and second sidewall 416. Bottom 412 is below (e.g., in the negative y-direction) top 410, first sidewall 414, and second sidewall 416. First sidewall 414 is coupled to a first side of top 410 and a first side of bottom 412 and second sidewall 416 is coupled to a second side of top 410 and a second side of bottom 412 with front wall 418 and back wall 420 extending from bottom 412 to top 410 and from first sidewall 414 to second sidewall 416. As illustrated, top 410, bottom 412, first sidewall 414, and second sidewall 416 are arranged in the shape of a triangle, or triangular prism. In various embodiments, camera housing 404 (i.e., top 410, bottom 412, first sidewall 414, and second sidewall 416) may be formed as a rectangle, a square, a semi-circle, or a hexagon, among other shapes including more or fewer sidewalls to accommodate various headwear and camera hardware. Camera housing 404 further includes an opening 422 located in the front wall 418.

POV camera system 400 further includes a camera lens 430, an image sensor 432, a microphone, a power source 436, and a controller circuit 438. Camera lens 430 is disposed in opening 422 in front wall 418. In various embodiments, camera lens 430 may be flush with front wall 418. In various embodiments, camera lens 430 may protrude outward (e.g., the negative z-direction) from front wall 418. In various embodiment, camera lens 430 may not fully extend to front wall 418. Camera lens 430 is coupled to image sensor 432.

Image sensor 432 is configured to capture still and video images. In various embodiments, image sensor 432 may be a digital image sensor. In various embodiments, image sensor 432 may be a charge-coupled device (CCD). In various embodiments, image sensor 432 may be a complementary metal-oxide-semiconductor (CMOS) sensor. Image sensor 432 receives light through camera lens 430 and outputs digital image information to controller circuit 438.

The microphone is configured to capture audio corresponding to the captured still and/or video images. The microphone may be position in various locations around camera housing 404. In various embodiments, POV camera system 400 may include more than one microphone. In various embodiments, an opening may be provided in camera housing 404 along top 410, bottom 412, first sidewall 414, second sidewall 416, front wall 418, and/or back wall 420. The microphone may be coupled to controller circuit 438 and output audio information to controller circuit 438.

Controller circuit 438 is coupled to image sensor 432 and the microphone and is configured to receive and record visual and audio data from image sensor and the microphone, respectively. Controller circuit 438 may include a controller, a memory, a wired interface, and/or a wireless interface. The controller may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof. The memory may store data, executable instructions, system program instructions, and/or controller instructions to implement the control logic of the controller.

Power source 436 may provide power to image sensor 432 and controller circuit 438. In various embodiments, power source 436 may be a battery that may be an alkaline, nickel metal hydride, or lithium ion battery, among others. In various embodiments, power source 436 may be rechargeable (e.g., rechargeable battery). In various embodiments, power source 436 may be removeable.

In various embodiments, camera lens 430, image sensor 432 and the microphone may be housed in camera housing 404. In the embodiment illustrated in FIG. 4B, there is an opening in back wall 420 to access image sensor 432 and camera lens 430. In various embodiments, a removable cover may be placed over the opening in back wall 420. In various embodiments, there may be no opening in back wall 420 such that camera lens 430 and image sensor 432 are not accessible. In various embodiments, back wall 420 may be secured to first sidewall 414, second sidewall 416, top 410, and/or bottom 412 using screws allowing back wall 420 to be removed.

In various embodiments, controller circuit 438 and power source 436 may be housed in base 402. As such, base 402 may include a cavity 424, as illustrated in FIG. 4B. Cavity 424 may be sized to accommodate controller circuit 438 and power source 436. In the illustrated embodiment, there is an opening in base 402 providing access to controller circuit 438 and power source 436. In various embodiments, a removable cover may be placed over the opening in base 402. In various embodiments, a removable back wall for base 402 may be secured to base 402 using screws.

There may be power wires within and extending between base 402 and camera housing 404 to provide power from power source 436 to image sensor 432 and controller circuit 438. Additionally, there may be communication cables extending within and between base 402 and camera housing 404 allowing the transfer of data from image sensor 432 and the microphone to controller circuit 438. In various embodiments, there may be a module that provides external, removable storage of video and audio, such as for example, an secure digital (SD) card. In various embodiments, internal memory (e.g., flash memory) may be used to store video and audio data, among others. In various embodiments, there may be connector (e.g., universal serial bus (USB)) extending through base 402 to connect to an external computer system to copy the stored data from POV camera system 400 to the external computer system. In various embodiments, there may be an antenna in base 402 and/or camera housing 404 for wireless communication (e.g., Bluetooth, Wi-Fi, cellular 5G, etc.) with the external computer system.

In various embodiments, power source 436 and controller circuit 438 may be located external to base 402 and camera housing 404 while remaining part of POV camera system 400. For example, power source 436 and controller circuit 438 may be located in a football helmet. In various embodiments, power source 436 and controller circuit 438 may be placed between padding and an outer shell of the football helmet. Power and communication cables may run between power source 436, controller circuit 438, image sensor 432, and the microphone between the padding and the outer shell.

POV camera system 400 may be secured to helmet between a facemask of the football helmet and a front surface of the outer shell. Bottom 412 may contact the facemask of the football helmet and back wall 420 may contact a front portion of the outer shell of the football helmet. In various embodiments, base 402 may extend into the football as described with previous embodiments. In various embodiments, base 402 may further include a connector to transfer power and data between image sensor 432 and the microphone in camera housing 404 and power source 436 and controller circuit 438 located in the football helmet.

Figure 5B:
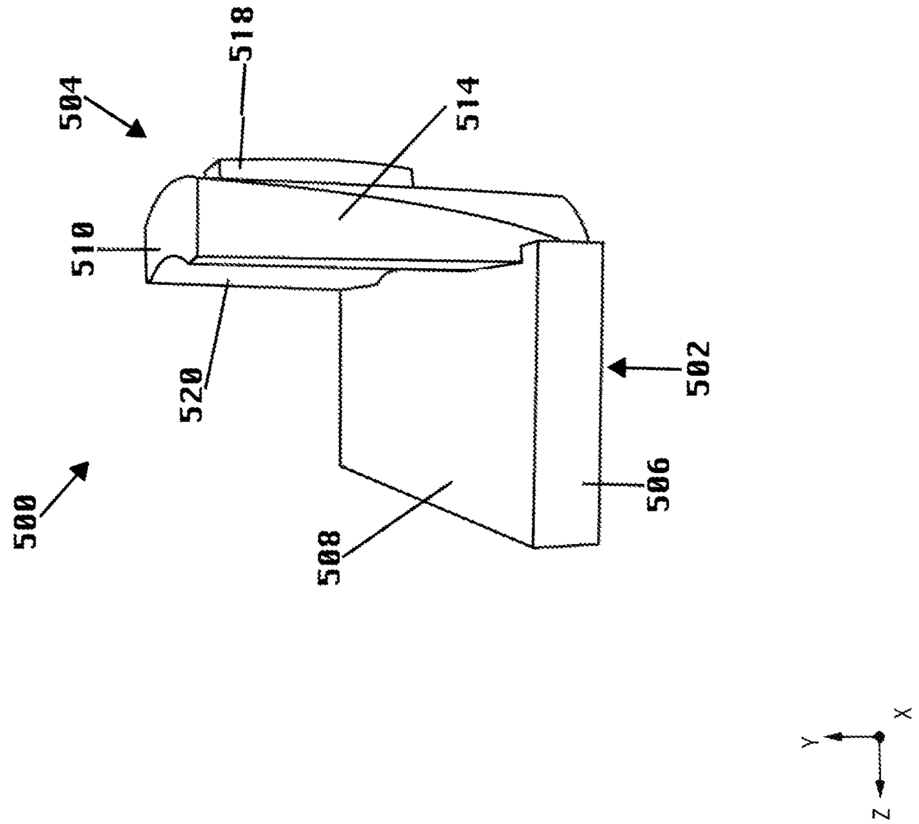
FIGS. 5A, 5B, 5C, 5D illustrate a point of view camera system including two cameras, in accordance with various embodiments.
Figure 5A:
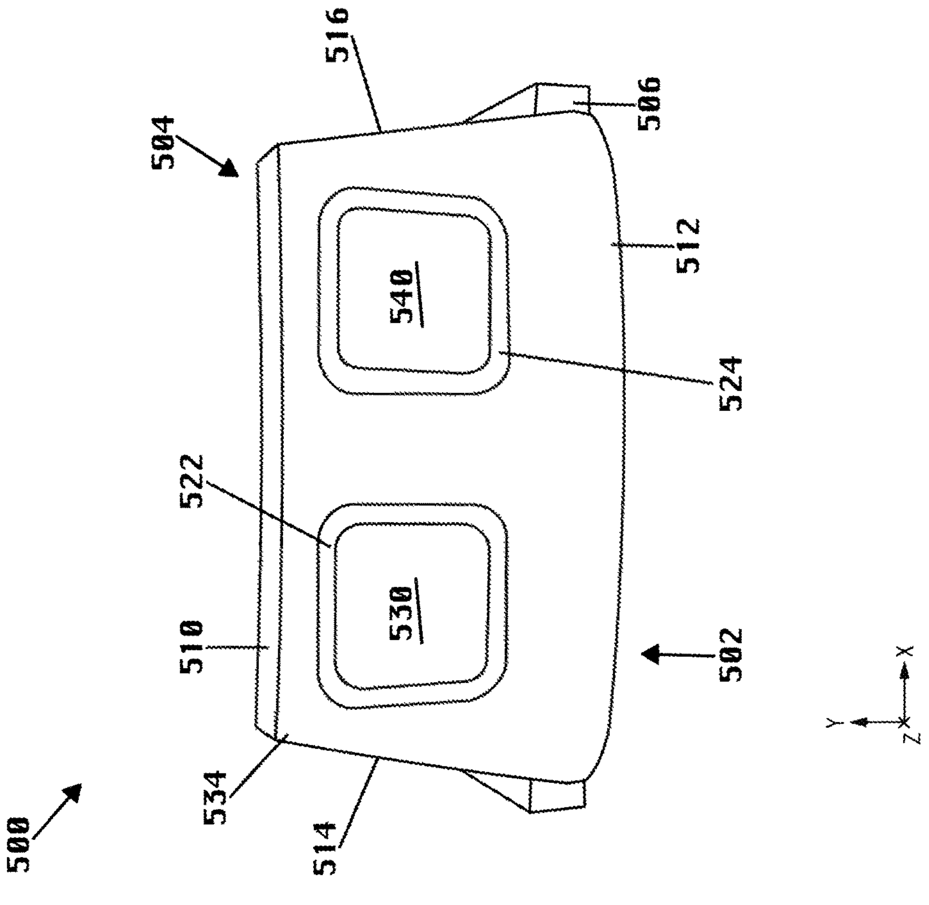
Figure 5D:
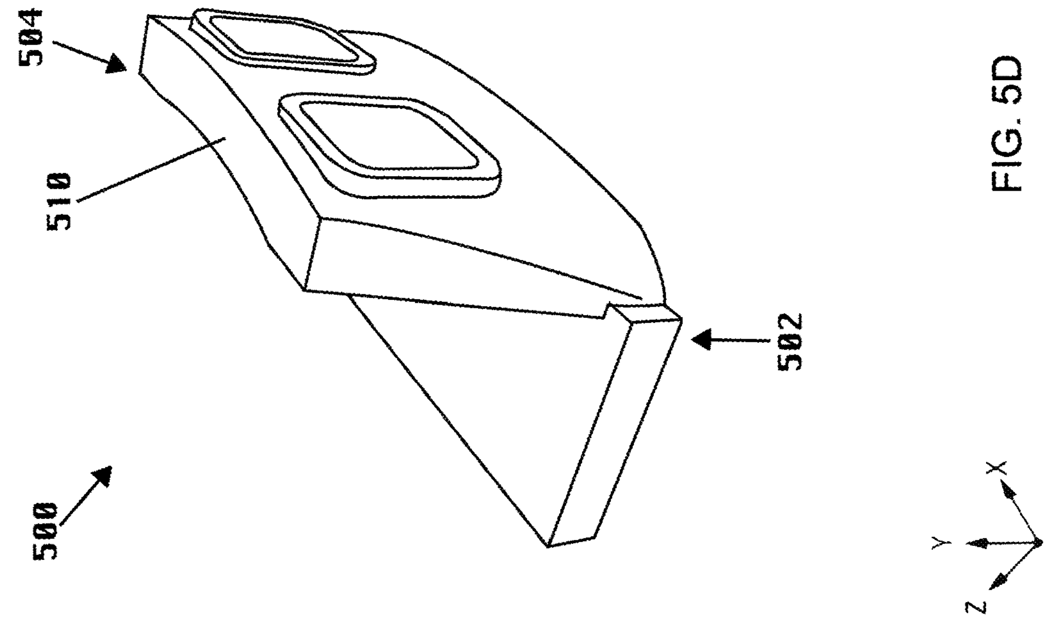
Figure 5C:
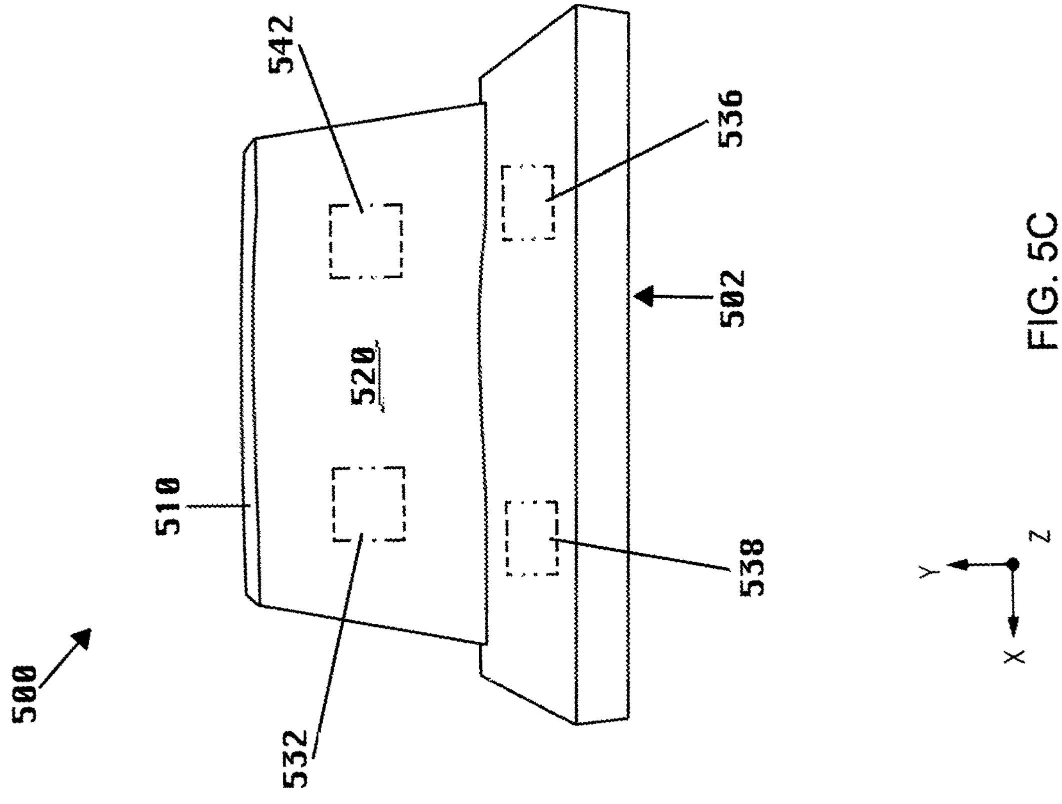

Referring now to FIGS. 5A-5D, a point of view (POV) camera system 500 is illustrated, in accordance with various embodiments. FIG. 5A illustrates a front view of POV camera system 500, FIG. 5B illustrates a side view of POV camera system 500, FIG. 5C illustrates a back view of POV camera system 500, and FIG. 5D illustrates a perspective view of POV camera system 500. POV camera system 500 includes a base 502 and a camera housing 504. Base 502 includes a first portion 506 that extends in a first plane (e.g., the z-plane) and a second portion 508 that extends orthogonally to first portion 506 (e.g., the y-plane). In various embodiments, base 502 may be a single monolithic component including first portion 506 and second portion 508. In various embodiments, first portion 506 and second portion 508 may be separate components that are coupled together to form base 502. Base 502 may be used to secure POV camera system 500 to a football helmet such as between the football helmet and a facemask of the football helmet. In various embodiments, first portion 506 may extend away from the facemask and into the football helmet and second portion 508 may fit between the facemask and the football helmet. This arrangement secures POV camera system 500 to the football helmet so that it can be used during practices, drills, and/or other events.

Camera housing 504 is coupled to base 502, and more specifically, to second portion 508. In various embodiments, camera housing 504 and base 502 may be a single monolithic component forming POV camera system 500. In various embodiments, camera housing 504 and base 502 may be separate components that are coupled together to form POV camera system 500. Camera housing 504 includes a top 510, a bottom 512, a first sidewall 514, and a second sidewall 516, a front wall 518, and a back wall 520. Top 510 is above (e.g., in the positive y-direction) bottom 512, first sidewall 514, and second sidewall 516. Bottom 512 is below (e.g., in the negative y-direction) top 510, first sidewall 514, and second sidewall 516. First sidewall 514 is coupled to a first side of top 510 and a first side of bottom 512 and second sidewall 516 is coupled to a second side of top 510 and a second side of bottom 512 with front wall 518 and back wall 520 extending from bottom 512 to top 510 and from first sidewall 514 to second sidewall 516. As illustrated, top 510, bottom 512, first sidewall 514, and second sidewall 516 are arranged in the shape of a rectangle, or rectangular prism. In various embodiments, camera housing 504 (i.e., top 510, bottom 512, first sidewall 514, and second sidewall 516) may be formed as a rectangle, a square, a semi-circle, or a hexagon, among other shapes including more or fewer sidewalls to accommodate various headwear and camera hardware. Camera housing 504 further includes a first opening 522 and a second opening 524 in front wall 518. In the depicted embodiment, camera housing 504 includes a curved back wall 520 and a curved front wall 518. The curve of back wall 520 may provide an improved fit against the football helmet as compared to a flat back wall 520. The curve of front wall 518 may reduce sharp edges and/or provide different angles for first opening 522 and second opening 524.

POV camera system 500 further includes a first camera lens 530, a second camera lens 540, a first image sensor 532, a second image sensor 542, one or more microphones, a power source 536, and a controller circuit 538. First camera lens 530 is disposed in first opening 522 in front wall 518. Second camera lens 540 is disposed in second opening 524 in front wall 518. In various embodiments, first camera lens 530 and second camera lens 540 may be flush with front wall 518. In various embodiments, first camera lens 530 and second camera lens 540 may protrude outward (e.g., the negative z-direction) from front wall 518. In various embodiment, first camera lens 530 and second camera lens 540 may not fully extend to front wall 518. First camera lens 530 is coupled to first image sensor 532 and second camera lens is coupled to second image sensor 542.

First image sensor 532 and second image sensor 542 are configured to capture still and video images. In various embodiments, first image sensor 532 and second image sensor 542 may be digital image sensors. In various embodiments, first image sensor 532 and/or second image sensor 542 may be charge-coupled device (CCD) sensors. In various embodiments, first image sensor 532 and/or second image sensor 542 may be complementary metal-oxide-semiconductor (CMOS) sensors. First image sensor 532 receives light through first camera lens 530 and outputs digital image information to controller circuit 538. Second image sensor 542 receives light through second camera lens 540 and outputs digital image information to controller circuit 538.

The one or more microphones may be configured to capture audio corresponding to the captured still and/or video images. The one or more microphones may be position in various locations around camera housing 504. In various embodiments, an opening may be provided in camera housing 504 along top 510, bottom 512, first sidewall 514, second sidewall 516, front wall 518, and/or back wall 520. The one or more microphones may be coupled to controller circuit 538 and output audio information to controller circuit 538.

Controller circuit 538 is coupled to first image sensor 532, second image sensor 542, and the one or more microphones and is configured to receive and record visual and audio data from first image sensor 532, second image sensor 542, and the one or more microphones, respectively. Controller circuit 538 may include a controller, a memory, a wired interface, and/or a wireless interface. The controller may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof. The memory may store data, executable instructions, system program instructions, and/or controller instructions to implement the control logic of the controller.

Power source 536 may provide power to first image sensor 532, second image sensor 542, and controller circuit 538. In various embodiments, power source 536 may be a battery that may be an alkaline, nickel metal hydride, or lithium ion battery, among others. In various embodiments, power source 536 may be rechargeable (e.g., rechargeable battery). In various embodiments, power source 536 may be removeable.

Similar to the embodiments describe above with respect to FIGS. 4A-4C, back wall 520 of camera housing 504 may be removable to access first image sensor 532, second image sensor 542, first camera lens 530, and second camera lens 540. There may also be power wires and/or communication cables extending between base 502 and camera housing 504 to transfer power and data between first image sensor 532, second image sensor 542, controller circuit 538, and power source 536. In various embodiments, there may be connector (e.g., universal serial bus (USB)) extending through base 502 to connect to an external computer system. In various embodiments, there may be an antenna in base 502 and/or camera housing 504 for wireless communication (e.g., Bluetooth, Wi-Fi, cellular 5G) with the external computer system.

In various embodiments, power source 536 and controller circuit 538 may be located external base 502 and camera housing 504 while remaining part of POV camera system 500. For example, power source 536 and controller circuit 538 may be located in a football helmet. In various embodiments, power source 536 and controller circuit 538 may be placed between padding and an outer shell of the football helmet. Power and communication cables may run between power source 536, controller circuit 538, first image sensor 532, second image sensor 542, and the one or more microphones between the padding and the outer shell.

POV camera system 500 may be secured to helmet between a facemask of the football helmet and a front surface of the outer shell. Bottom 512 may contact the facemask of the football helmet and back wall 520 may contact a front portion of the outer shell of the football helmet. In various embodiments, base 502 may extend into the football as described with previous embodiments. In various embodiments, base 502 may further include a connector to transfer power and data between first image sensor 532, second image sensor 542, and the one or more microphones in camera housing 504 and power source 536 and controller circuit 538 located in the football helmet.

Figure 6B:
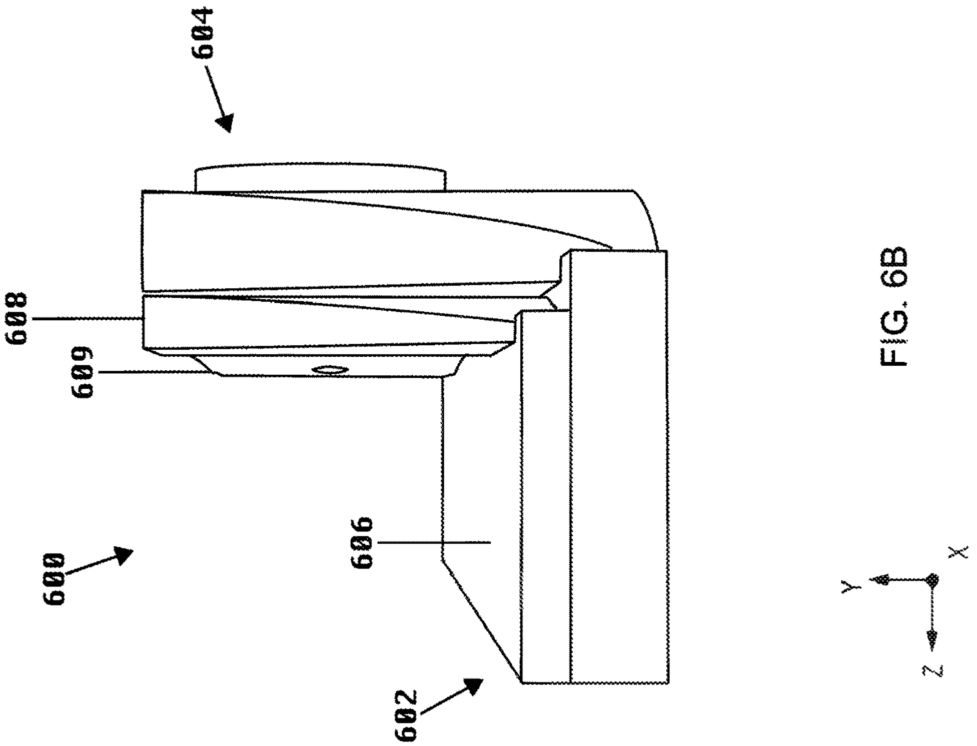
FIGS. 6A, 6B, 6C, and 6D illustrate a point of view camera system including two cameras, in accordance with various embodiments.
Figure 6A:
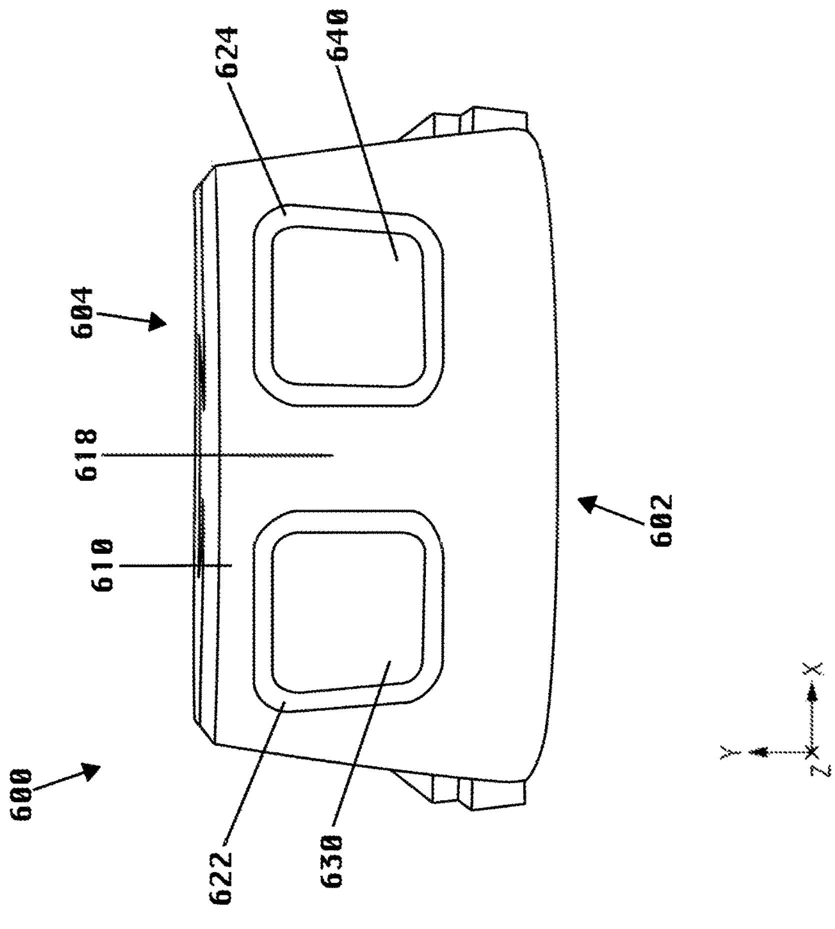
Figure 6D:
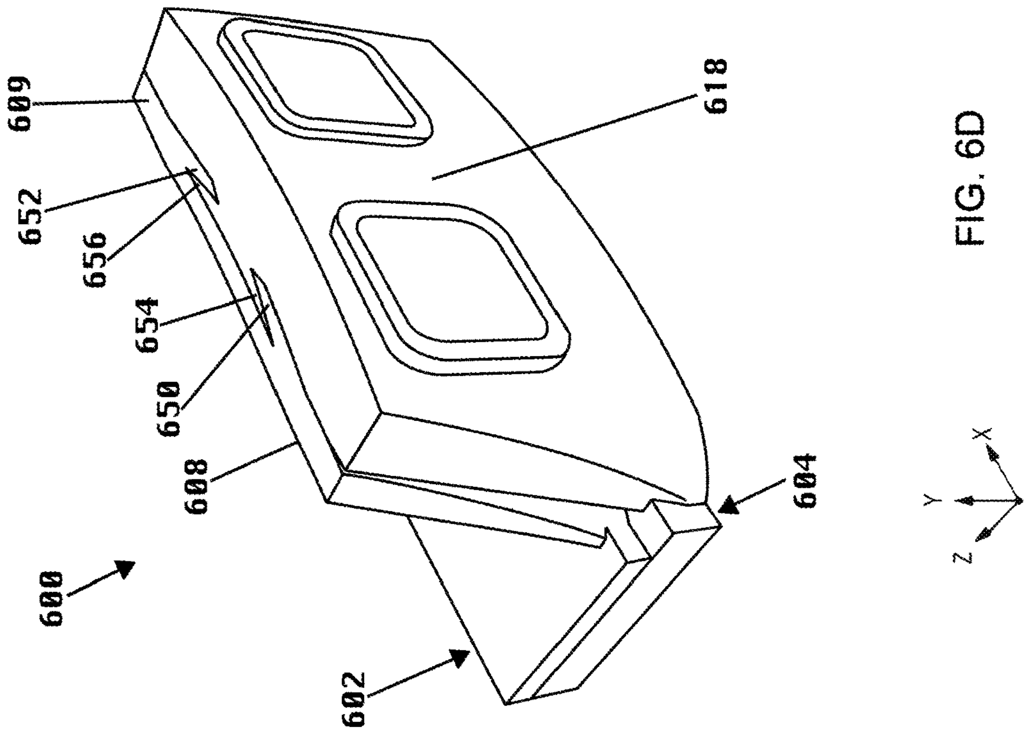
Figure 6C:
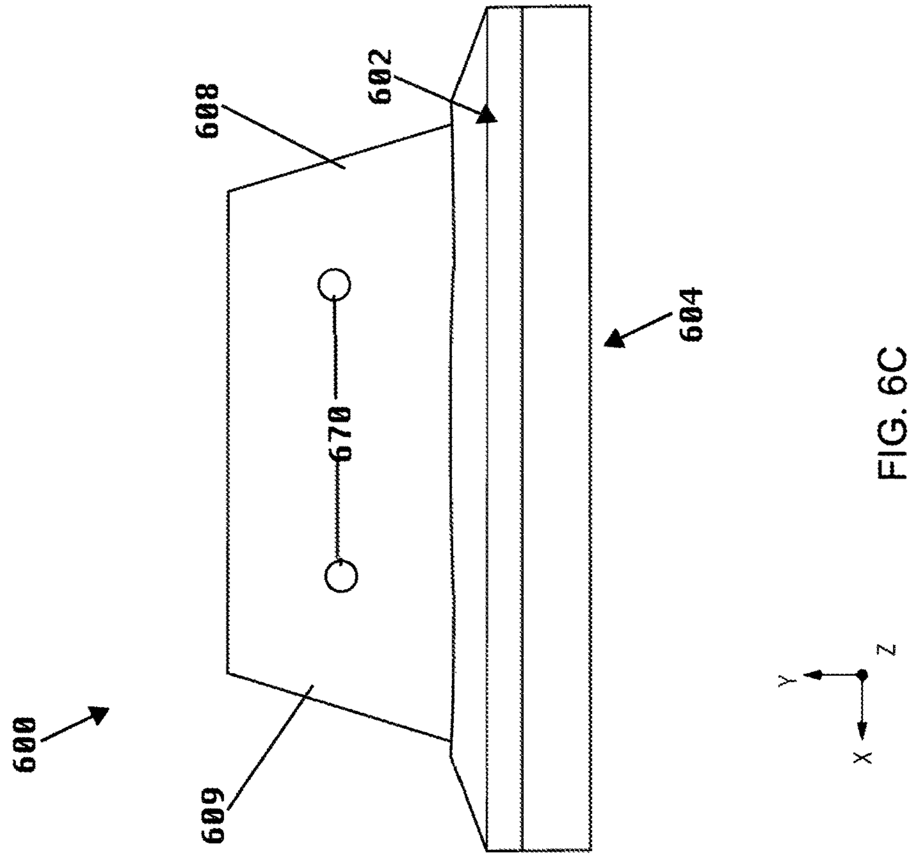
Figure 8A:
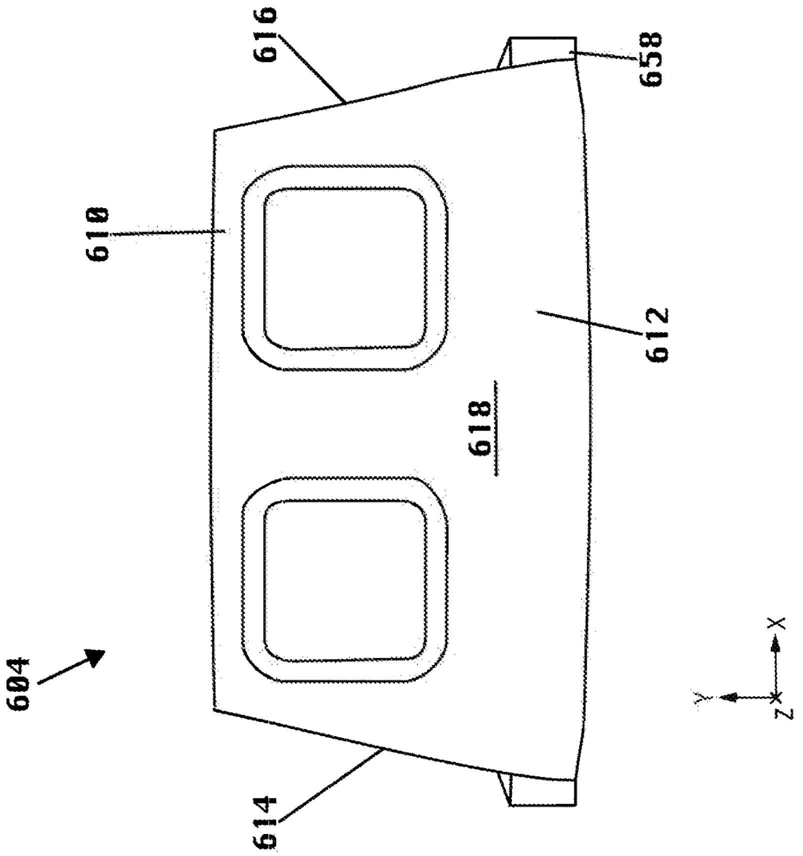
FIGS. 8A, 8B, 8C, and 8D illustrate a camera housing for a point of view camera system, in accordance with various embodiments.
Figure 7A:
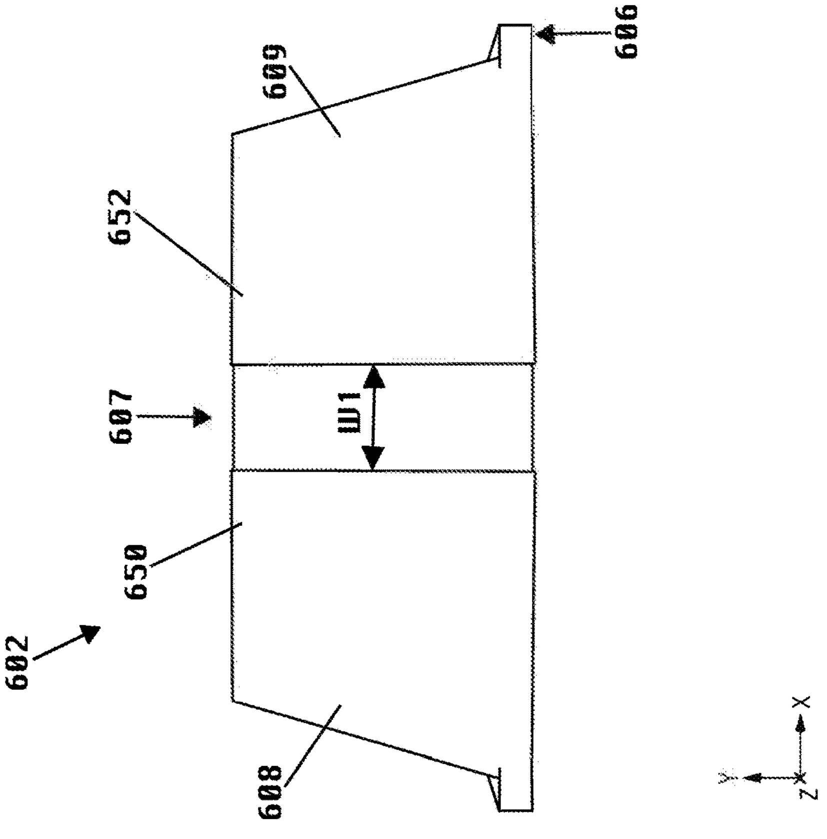
FIGS. 7A, 7B, 7C, and 7D illustrate a camera mount for a point of view camera system, in accordance with various embodiments.
Figure 8B:
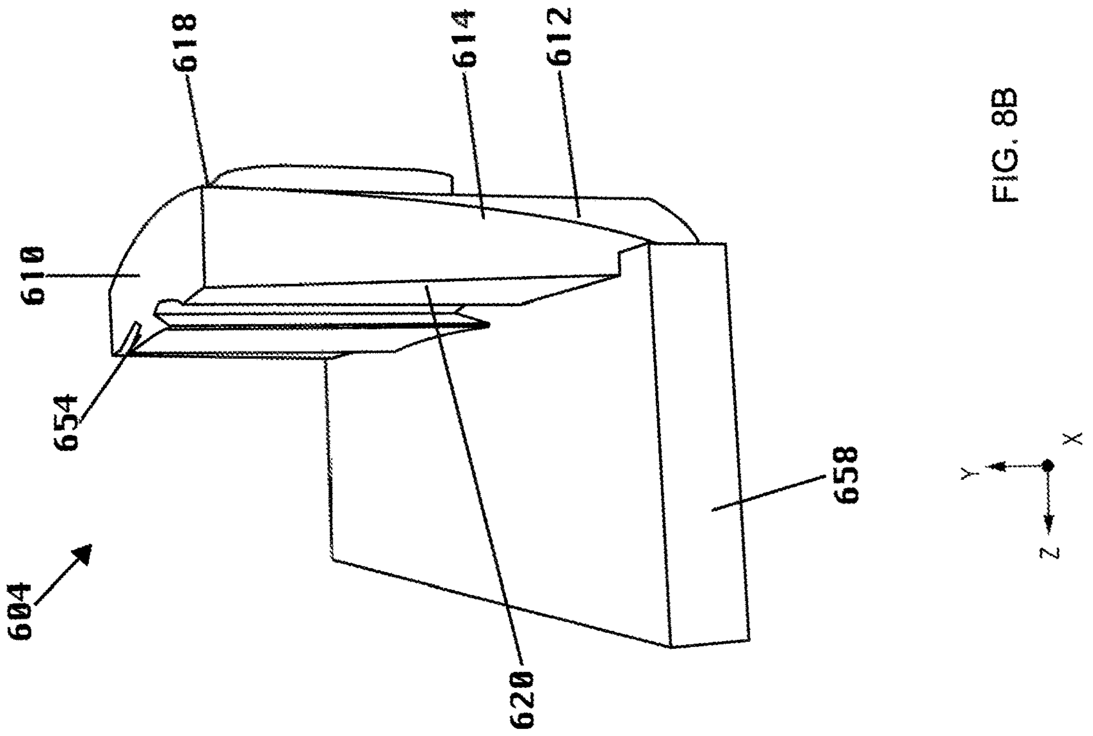
Figure 7B:
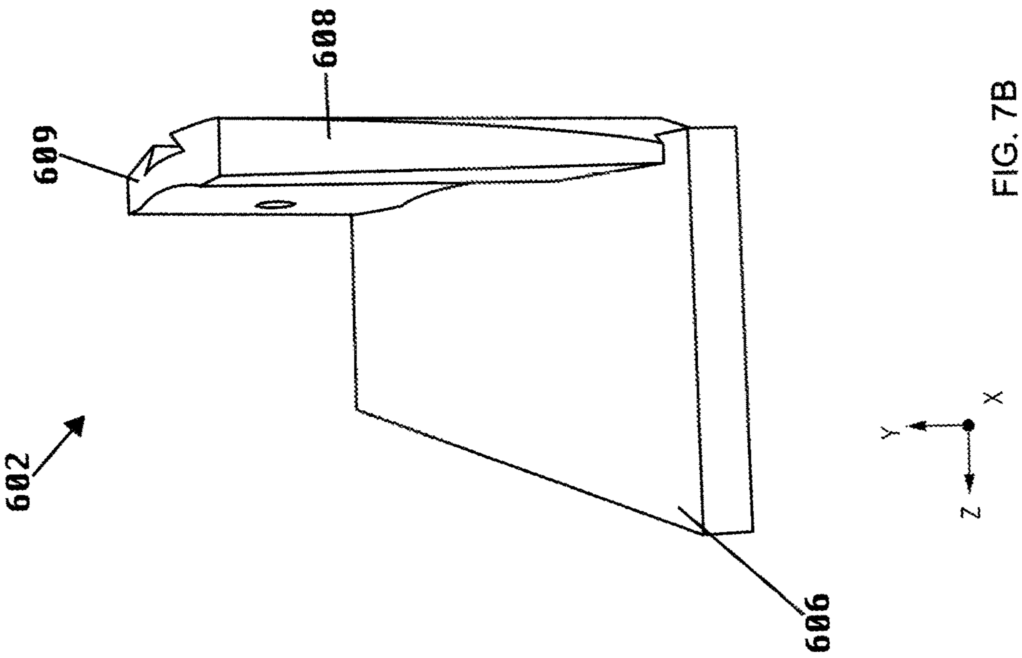
Figure 8C:
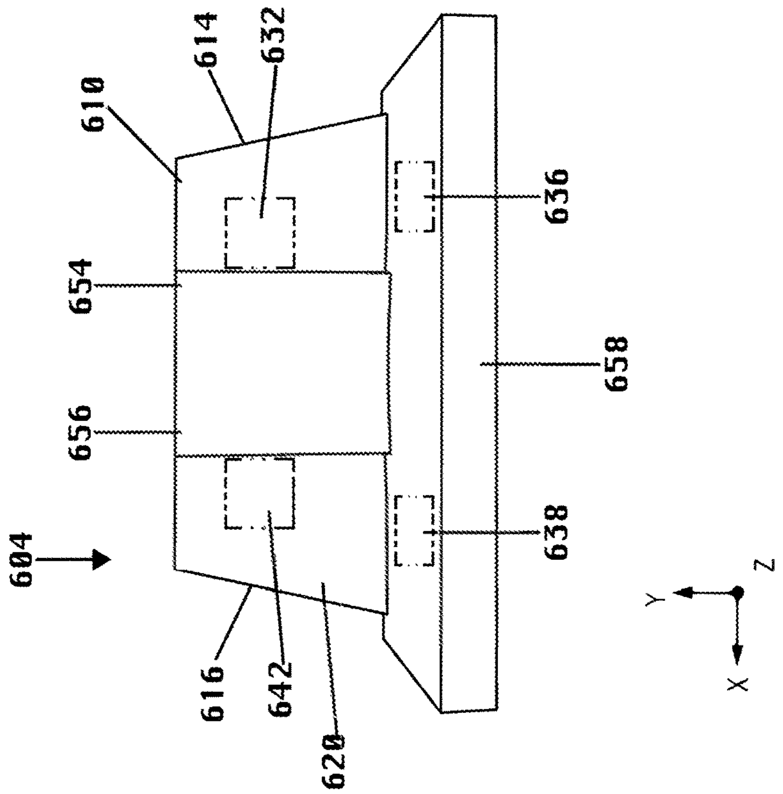
Figure 7C:
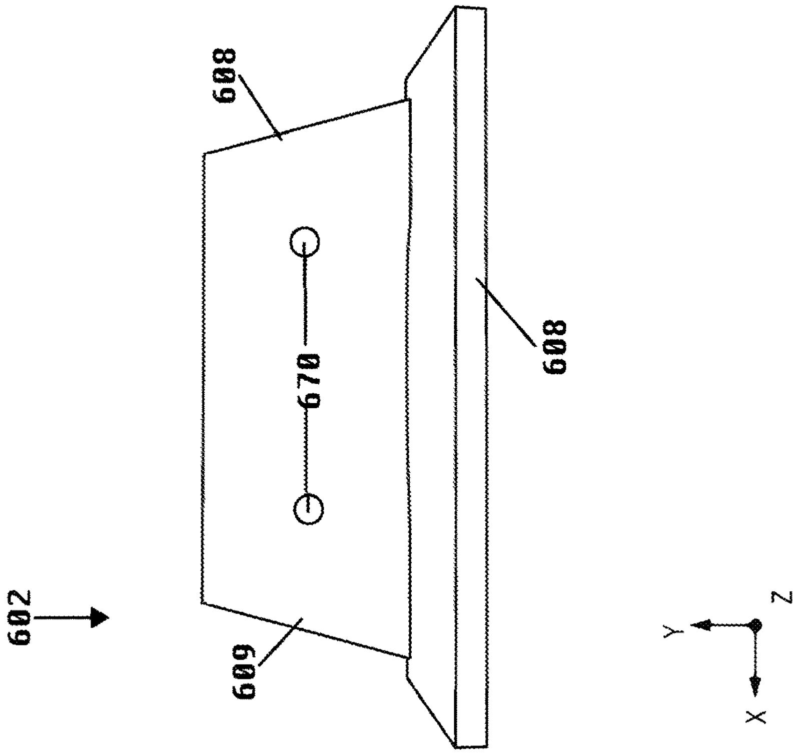
Figure 8D:
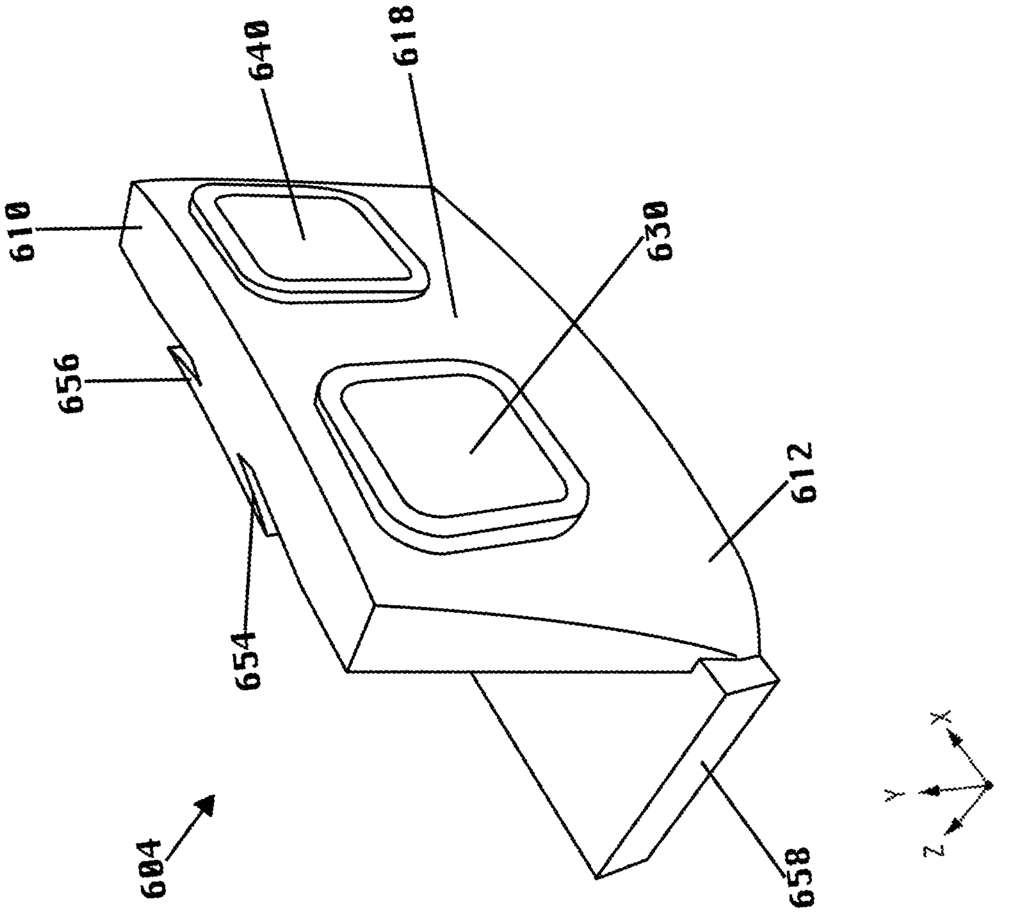
Figure 7D:
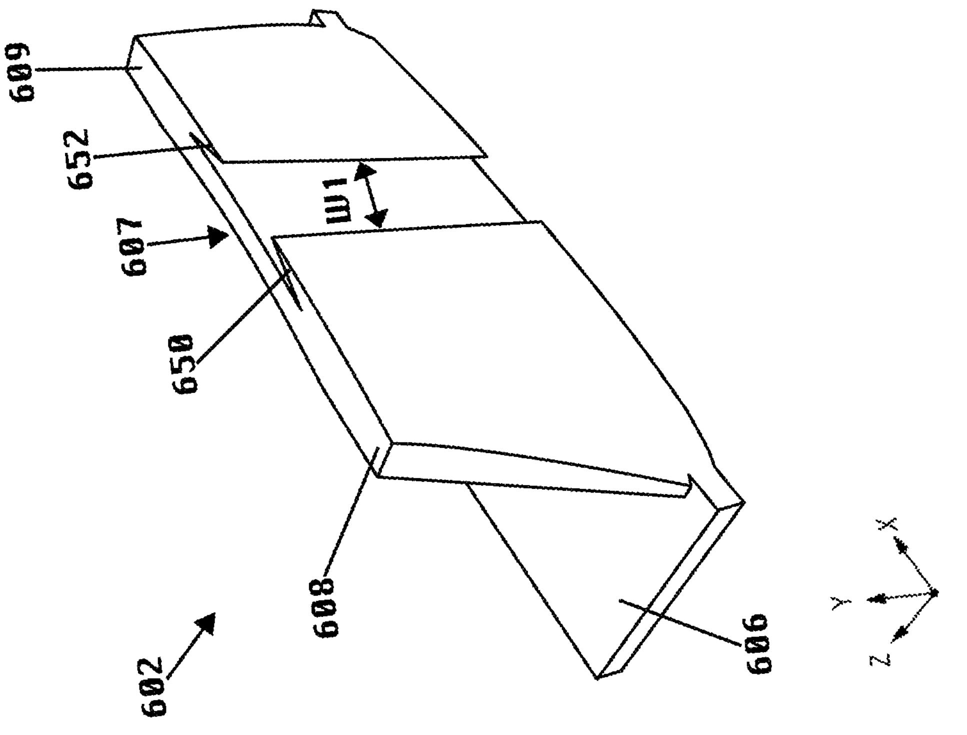

Referring now to FIGS. 6A-6D, 7A-7D, and 8A-8D, a point of view (POV) camera system 600 is illustrated, in accordance with various embodiments. POV camera system 600 includes similar components to those described above with respect to POV camera system 500 illustrated in FIGS. 5A-5D. POV camera system 600 further includes a camera mount 602 and detachable a camera housing 604. In various embodiments, camera mount 602 may be similar to base 502 described above with reference to FIGS. 5A-5D. FIGS. 6A-6D illustrate the combined POV camera system 600 with camera housing 604 attached to camera mount 602. FIGS. 7A-7D illustrate camera mount 602 without camera housing 604. FIGS. 8A-8D illustrate camera housing 604 detached from camera mount 602. FIGS. 6A, 7A, and 8A illustrate front views of POV camera system 600, FIGS. 6B, 7B, and 8B illustrate side views of POV camera system 600, FIGS. 6C, 7C, and 8C illustrate back views of POV camera system 600, and FIGS. 6D, 7D, and 8D illustrate perspective views of POV camera system 600.

Camera mount 602 includes similar components to those described above with respect to POV camera system 500 in FIGS. 5A-5D, including a first portion 606, a second portion 608, a power source 636, a microphone, and a controller circuit 638. First portion 606 extends in a first plane (e.g., the z-plane) and second portion 608 extends orthogonally from first portion 606 (e.g., the y-plane). Camera mount further includes a third portion 609, a space 607, a first camera securing feature 650, and a second camera securing feature 652. Third portion 609 extends orthogonally from first portion 606 (e.g., the y-plane) and adjacent second portion 608 with space 607 between second portion 608 and third portion 609. Space 607 has a width w1 (e.g., in the x-direction) from second portion 608 to third portion 609. In the illustrated embodiment, second portion 608 and third portion 609 are connected along back walls (e.g., in the negative z-direction) and vertical walls (e.g., in the positive y-direction) and space 607 extends partially through the connected portion toward a front wall (e.g., in the positive z-direction). In various embodiments, space 607 may extend completely through camera housing (e.g., along the z-axis) such that second portion 608 and third portion 609 are not coupled along back walls and vertical walls adjacent space 607. In various embodiments, camera mount 602 may be a single monolithic component including first portion 606, second portion 608, and third portion 609. In various embodiments, first portion 606, second portion 608, and third portion 609 may be separate components that are coupled together to form camera mount 602. Camera mount 602 may be secured to a piece of headwear, such as a football helmet. For example, camera mount 602 may be secured between a facemask and a front surface of the football helmet. In various embodiments, first portion 606 may extend away from the facemask and into the football helmet and second portion 608, and third portion 609 may fit between the facemask and the front surface of the football helmet. This arrangement secures camera mount 602 to the football helmet so that it can be used in combination with camera housing 604 during practices, drills, and/or other events.

In various embodiments, first camera securing feature 650 may extend from second portion 608 and second camera securing feature 652 may extend from third portion 609. First camera securing feature 650 and second camera securing feature 652 may extend into space 607 and toward one another. In various embodiments, first camera securing feature 650 may include a first side 650*a*, a second side 650*b*, and meet at a point 650*c*, forming a triangle shape when viewed from the top. Second camera securing feature 652 may similarly include a first side 652*a*, a second side 652*b*, and meet at a point 652*c*, forming a triangle shape when viewed from the top. In various embodiments, first camera securing feature 650 and/or second camera securing feature 652 may be shaped differently including hexagonal, semi-circular, or octagonal, among others. In various embodiments, camera housing 604 further includes one or more screw holes 670. The one or more screw holes 670 are positioned to allow screws to secure camera housing 604 to the piece of headwear (e.g., the football helmet).

Figure 9B:
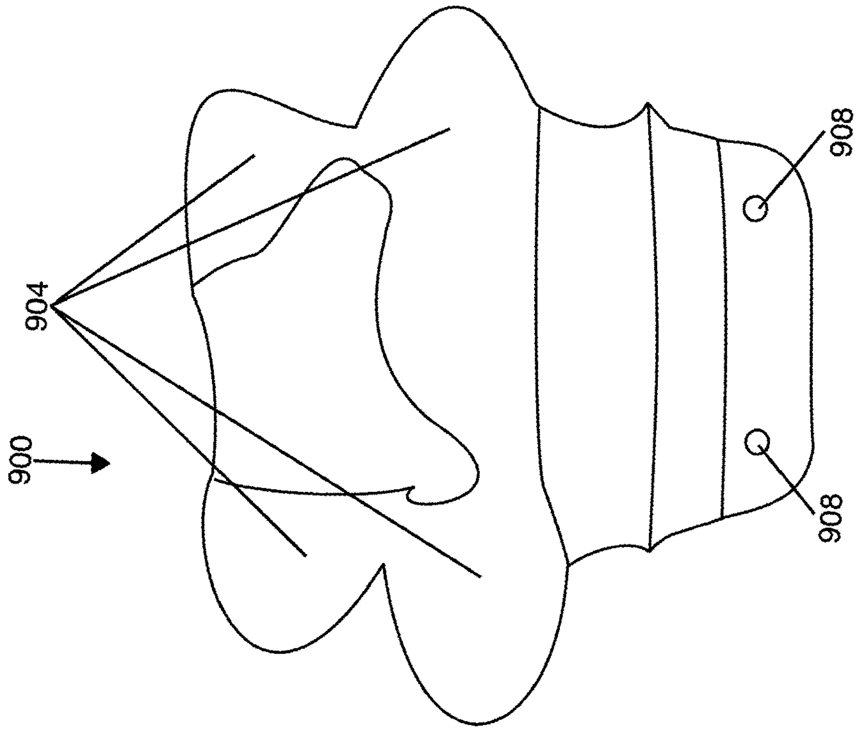
FIGS. 9A, 9B, and 9C illustrate a removable pad for a football helmet including a camera mount for a point of view camera system, in accordance with various embodiments.
Figure 9A:
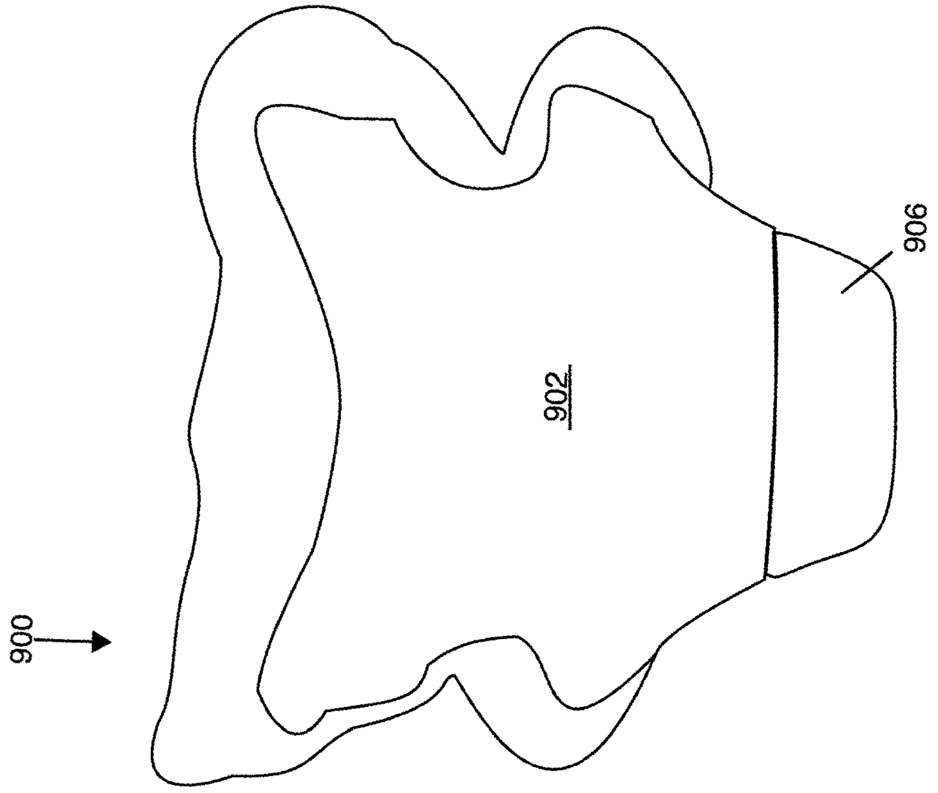
Figure 9C:
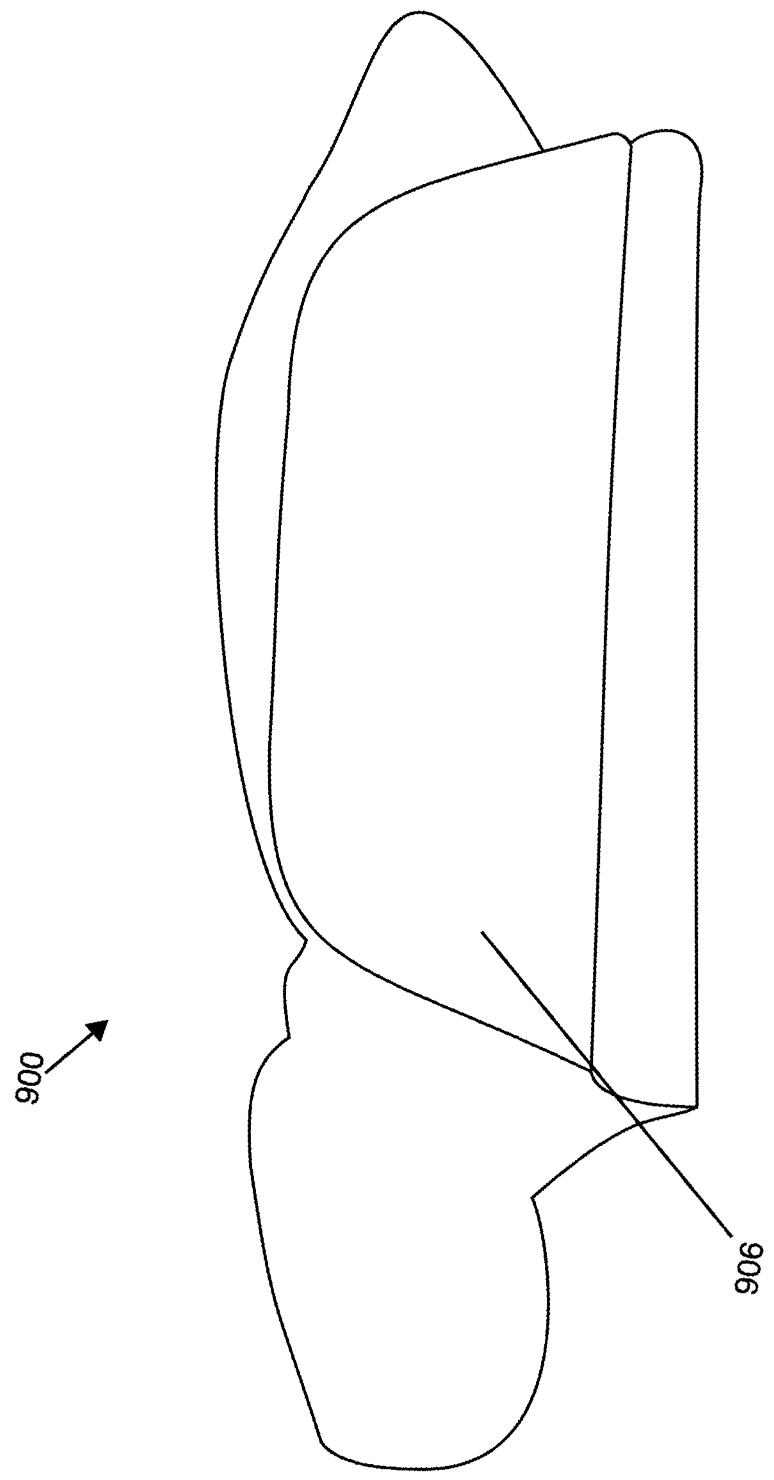

In various embodiments, and with momentary reference to FIGS. 9A-9B, camera mount 602 may be secured to removable pad 900 that is inserted in the football helmet. This is as an example and is not meant to be limiting. Similar modifications may be made to other helmets including, but limited to, baseball, bicycle, motorcycle, skateboard, snowboard, ski, and horse riding helmets, among others. Removable pad 900 includes head pad 902, securing features 904, front piece 906, and snap buttons 908. Securing features 904 may secure removable pad 900 to the football helmet (e.g., football helmet 300) with head pad 902 facing inward and contacting the head of a player. Front piece 906 may snap to the front of the football helmet using snap buttons 908. In various embodiments, front piece 906 may be replaced by camera mount 602 where camera mount 602 includes snap buttons 908 for securing camera mount 602 to the football helmet. In various embodiments, camera mount 602 may be mounted to, or secured to, front piece 906. In either case, second portion 608 and third portion 609 may extend upward (e.g., the positive Y-direction) and between the football helmet and the facemask.

Returning to FIGS. 6A-6D, camera housing 604 includes similar components to camera housing 504 described above with respect to FIGS. 5A-5D, including a top 610, a bottom 612, a first sidewall 614, a second sidewall 616, a front wall 618, a back wall 620, a first opening 622, a second opening 624, a first camera lens 630, a first image sensor 632, one or more microphones 634, a second camera lens 640, and a second image sensor 642. Camera housing 604 further includes a first housing securing feature 654, a second housing securing feature 656, and a camera housing base 658. First housing securing feature 654 may extend from back wall 620 and may be shaped to receive first camera securing feature 650. Second housing securing feature 656 may extend from back wall 620 and may be shaped to receive second camera securing feature 652. In various embodiments, first housing securing feature 654 and second housing securing feature 656 may be a single securing feature that is monolithic with back wall 620. In various embodiments, first housing securing feature 654 includes a concave portion 654*a* configured to receive and secure first camera securing feature 650 and second housing securing feature 656 includes a concave portion 656*a* configured to receive and secure second camera securing feature 652. In various embodiments, concave portion 654*a* and concave portion 656*a* may be shaped differently in order to interface with first camera securing feature 650 and second camera securing feature 652, respectively.

Camera housing base 658 extends orthogonally from back wall 620 (e.g., in the z-direction). In various embodiments, camera housing base 658 includes a clip, a snap, or a post hole, among others, to secure camera housing 604 to camera mount 602. In various embodiments, camera housing base 658 may be similar in size to first portion 606 of camera mount 602. In various embodiments, camera housing base 658 may be smaller than first portion 606 of camera mount 602. In various embodiments, camera housing 604 may not include camera housing base 658 and may include additional securing features (e.g., clip, snap, etc.) in first housing securing feature 654 and second housing securing feature 656.

Figure 10:
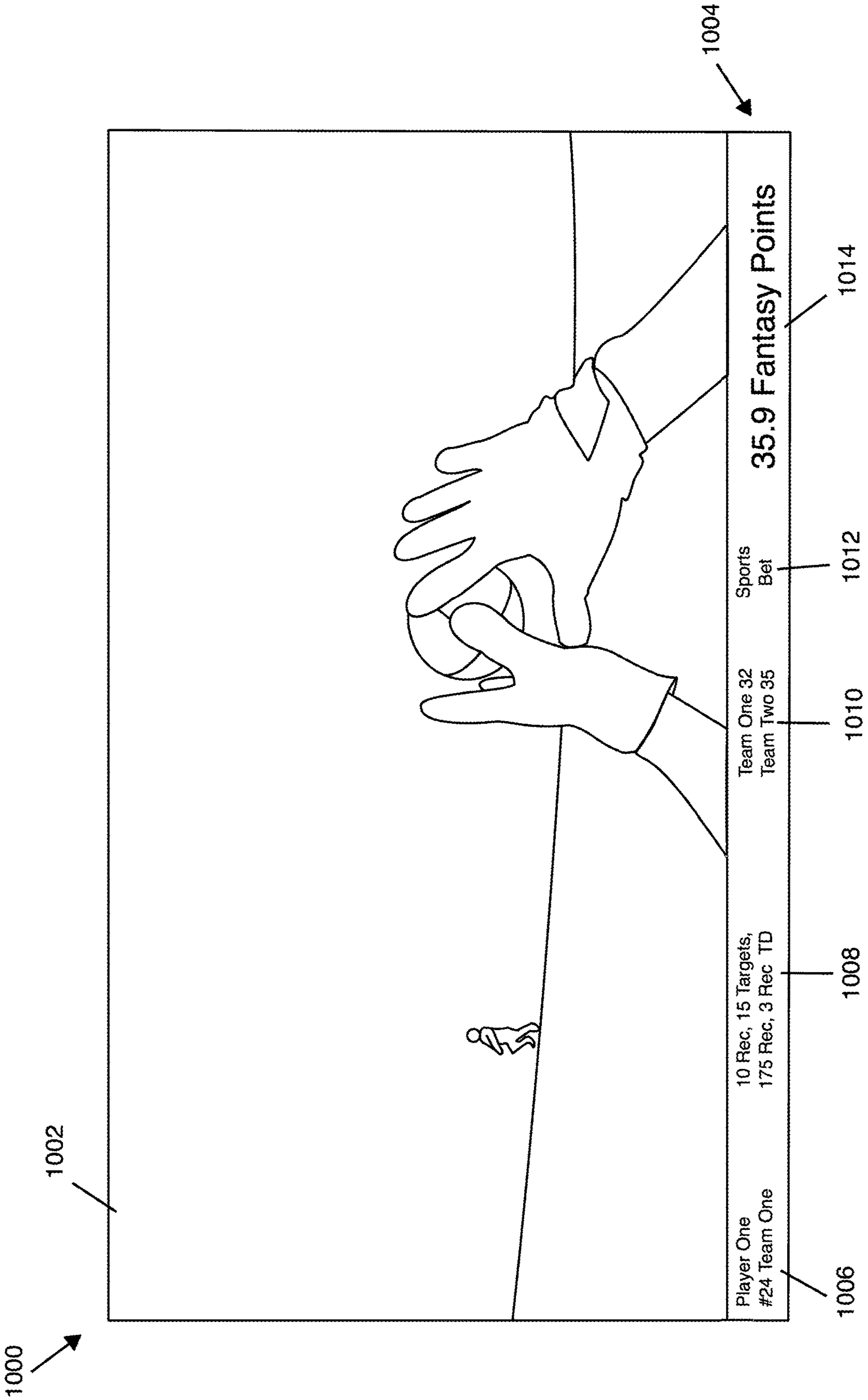
FIG. 10 illustrates an image broadcast of a video from a point of view camera system, in accordance with various embodiments.

Referring now to FIG. 10, an image 1000 broadcast from a point of view (POV) camera described herein (e.g., POV camera system 600) is illustrated, in accordance with various embodiments. Image 1000 includes a POV image 1002 and an information bar 1004. POV image 1002 includes a still image or video from a single image sensor (e.g., first image sensor 632) that has been recorded or is being streamed in real time. In various embodiments, POV image 1002 may include a second still image or video from a second image sensor (e.g., second image sensor 642) that has been recorded or is being streamed in real time from the same POV camera. A headset may be used to view both first image and second image at the same time, thereby providing a more immersive watching experience.

Information bar 1004 may be placed along a bottom of POV image 1002. In various embodiments, information bar 1004 may be placed along a left side of POV image 1002, a right side of POV image 1002, or a top of POV image 1002. Information bar 1004 may include player information 1006 (e.g., the player wearing the POV camera), player statistics 1008, game information 1010, advertising 1012, and/or other information 1014 (e.g., fantasy football).

Figure 11:
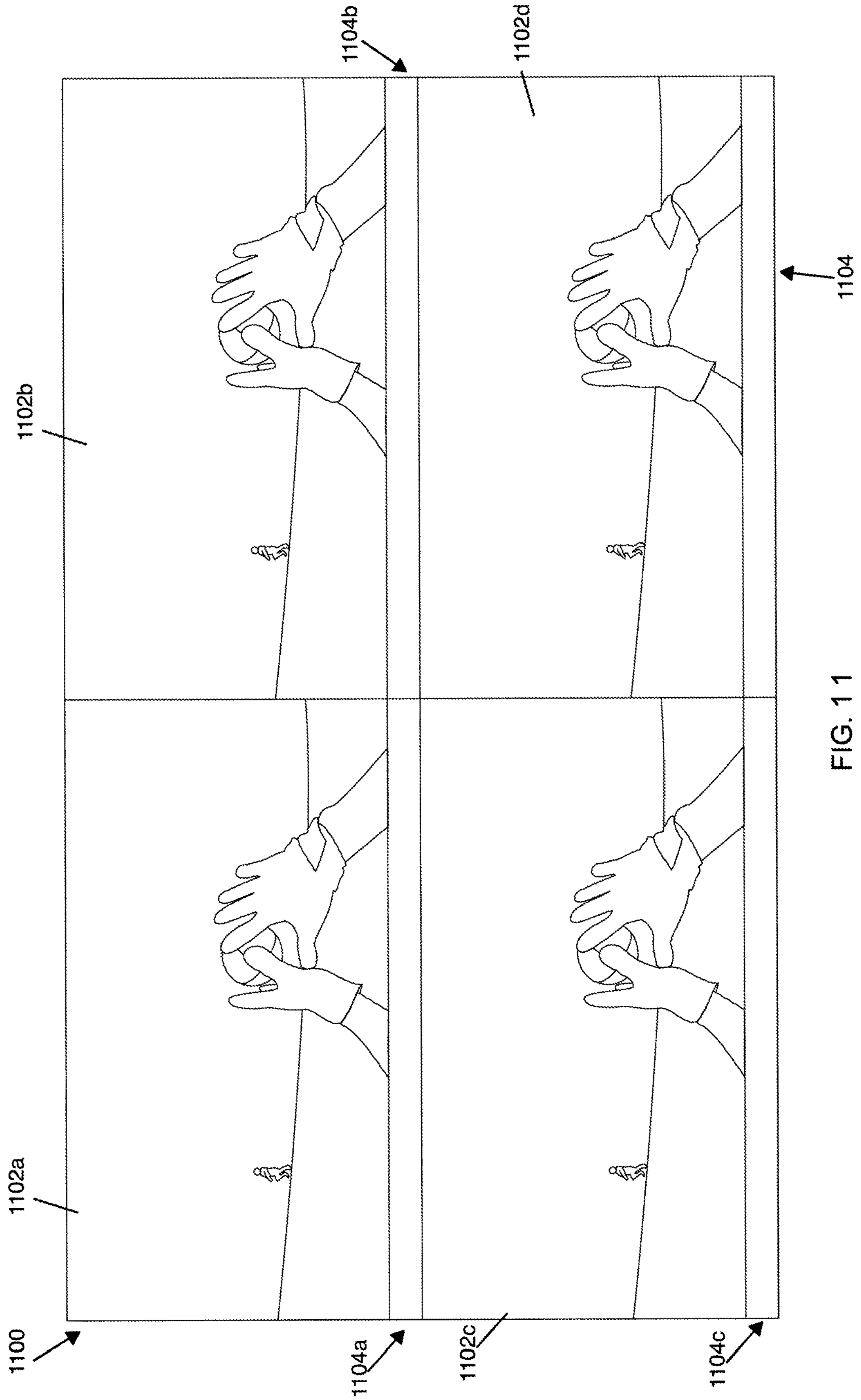
FIG. 11 illustrates an image broadcast of a video from a plurality of point of view camera systems, in accordance with various embodiments.

Referring now to FIG. 11, an image 1100 including multiple point of view (POV) camera (e.g., POV camera system 600) outputs is illustrated, in accordance with various embodiments. Image 1100 may include two or more different POV images displayed simultaneously. In the depicted embodiment, four POV images 1102 are displayed, a first image 1102*a*, a second image 1102*b*, a third image 1102*c*, and a fourth image 1102*d*. In various embodiments, each POV image 1102 may include two images corresponding to the two image sensors (e.g., first image sensor 632 and second image sensor 642) in the POV camera (e.g., POV camera system 600). In various embodiments, each POV image 1102 may include an information bar 1104, a first information bar 1104*a*, a second information bar 1104*b*, a third information bar 1104*c*, and a fourth information bar 1104*d*. In various embodiments, there may be a single information bar 1104 for all POV images 1102.

Information bar 1104 may be placed along a bottom of POV images 1102. In various embodiments, information bar 1104 may be placed along a left side of POV images 1102, a right side of POV images 1102, or a top of POV images 1102. Information bar 1104 may include player information 1106 (e.g., the player wearing the POV camera), player statics 1108, game information 1110, advertising 1112, and/or other information 1114 (e.g., fantasy football). In various embodiments, each information bar 1104 (i.e., first information bar 1104*a*, second information bar 1104*b*, third information bar 1104*c*, and fourth information bar 1104*d*) may include the same types of information in the same order (as illustrated in FIG. 11) or may include different types of information for each POV image 1102.

Figure 12:
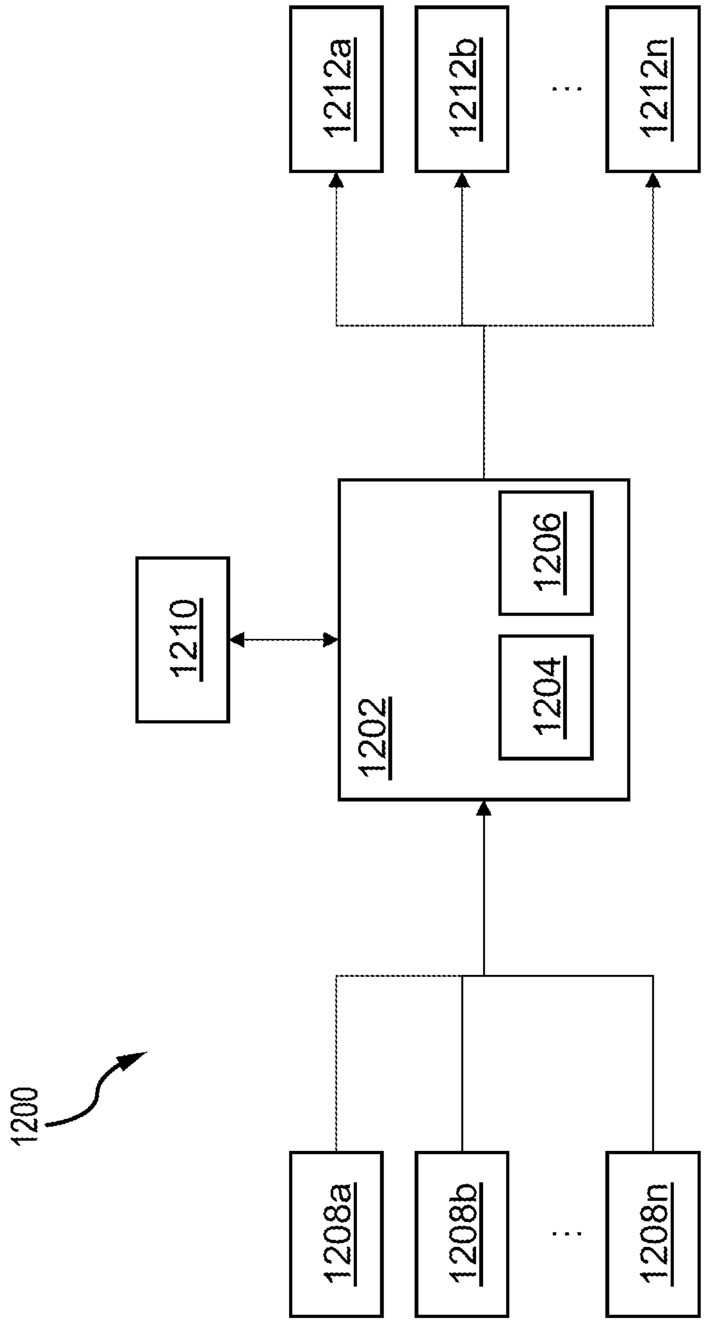
FIG. 12 illustrates a system for broadcasting video from a plurality of point of view camera systems, in accordance with various embodiments.

Referring now to FIG. 12, a system 1200 for viewing video content from one or more point of view cameras (e.g., POV camera system 600), in accordance with various embodiments. System 1200 includes one or more servers 1202 with each server including a processor 1204 and a memory 1206. Processor 1204 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof. Memory 1206 may comprise memory to store data, executable instructions, system program instructions, and/or controller instructions to implement the control logic of processor 1204.

Server 1202 receives video stream input a plurality of point of view (POV) cameras including a first POV camera 1208*a*, a second POV camera 1208*b*, up to an nth POV camera 1208*n*. Server 1202 is further connected to a remote server 1210. Server 1202 further outputs video to a plurality of user including a first user 1212*a*, a second user 1212*b*, up to an nth user 1212*n*, where each user is using their own device to view the video (e.g., computer, cell phone, tablet, TV, etc.).

Each POV camera may be an example of a POV camera disclosed herein (e.g., POV camera system 500, POV camera system 600, etc.) or another camera. Video streams may be transmitted in real time from each POV camera 1208*a*-1208*n* and received in real time by server 1202. In various embodiments, video streams may be downloaded from each POV camera for display at a later time.

In various embodiments, remote server 1210 may be one or more advertising servers that provide advertisements to be displayed to users. In various embodiments, remote server 1210 may provide player statistics, game information, fantasy football information, name image likeness (NIL) information, agent information, merchandise information, or other information. In various embodiments, remote server 1210 may further provide login credentials for viewers 1212*a*-1212*n*. In various embodiments, remote server 1210 may provide betting information for the sport being viewed (e.g., football, basketball, hockey, etc.). The betting information may be displayed to the user (e.g., information bar 1004, 1104*a*-1104*d*). Integrating information (e.g., player stats) that is external to the sport being viewed provides further engagement for the user.

Server 1202, and more specifically processor 1204, may combine video from different POV cameras 1208*a*-1208*n* to be viewed by different users at the same time. For example, user 1212*a* may view video streams from POV cameras 1208*a* and 1208*b* while user 1212*b* views video streams from POV cameras 1208*a* and 1208*n*. In various embodiments, processor 1204 may synchronize the video streams so that each video stream is showing the same moment in time as each other video stream. In various embodiments, processor 1204 may perform additional processing to ensure that each user 1208*a*-1212*n* receives the video stream at a similar time, so that one user does not view the video stream at a substantially earlier time than another user.

The video streams, in various embodiments, may further include interactive information. In various embodiments, a hype button may be visible and clickable. The hype button may be used to show that a user likes the player and/or the play, may be used to collect statistics about viewership, and/or may be used to collect statistics about user interaction for ad revenue. In various embodiments, the video streams may additionally provide performance visuals for fantasy football and/or live games. Performance visuals may include player statistics, player highlights, team statistics, team highlights, or other information.

In various embodiments, server 1202 may additionally, or in the alternative, provide a player or team timeline including the games played, the number of games, statistics per game, season, and/or career, player highlights, team highlights, or similar data. In various embodiments, server 1202 may provide information about the progression, or improvement, of a player. For example, server 1202 may store and transmit player statistics and/or highlights over the lifetime of the player, or user. The lifetime of a player, for the example of football, may include pee-wee football, middle school football, high school football, college football, and/or professional football, among others. Similar timeline information may be provided for different sports.

In various embodiments, data may be streamed directly from one or more POV cameras 1208*a*-1208*n* to an external server that may redirect the streams to end users. For example, the external servers may be run by a network that is contracted to broadcast a game being played. In various embodiments, each POV camera 1208*a*-1208*n* may stream the video and audio using a cellular connection (e.g., 4G, 5G, etc.) or a Wi-Fi connection. In various embodiments, data may be streamed from one or more POV cameras 1208*a*-1208*n* to a nearby phone or computer system using a Bluetooth or Wi-Fi connection. The phone, or computer system, may then upload the data from streaming to followers, friends, and/or family. In various embodiments, POV cameras 1208*a*-1208*n* may store the recorded data locally (e.g., SD card, flash memory, etc.) during use. The data may be transferred to an external computer system, or phone, using a USB cable, Wi-Fi, Bluetooth, or other connection.

In various embodiments, the one or more servers 1202 may include a server configured to connect one or more POV cameras 1208*a*-1208*n* to one or more coach units. Each coach unit, in various embodiments, may include a microphone and a speaker. The one or more POV cameras 1208*a*-1208*n* may be coupled to one or more external microphones and one or more speakers. In various embodiments, the one or more microphones may be disposed adjacent a player's mouth inside of a helmet (e.g., football helmet 300, a baseball helmet, a hockey helmet, etc.). In various embodiments, the one or more speakers may be disposed adjacent a player's ear inside of the helmet. A microphone wire (e.g., a flat wire) may be disposed along an inner surface of the helmet to connect a microphone to a POV camera (e.g., POV camera 1208*a*). A speaker wire (e.g., a flat wire) may be disposed along an inner surface of the helmet to connect a speaker to the POV camera. The microphone and speaker are then able to connect with the one or more servers 1202, and therefore one or more coaches, using the connection that exists with the POV camera.

Using this system, the speaker and microphone may use the connection between the POV camera and the one or more servers 1202 to communicate with a coach during gameplay. This may be used, for example, for discretely communicating plays to a quarterback during a football game. Alternatively, this may be used for discretely communicating with base runners, pitchers, catchers, or batters during a baseball game. Other uses for this system will become apparent to those of skill in the art. In various embodiments, the POV camera (e.g., POV camera 1208*a*) may be connect directly to the coach unit. In various embodiments, the POV camera may be connected to the coach unit and server 1202.

Figure 13A:
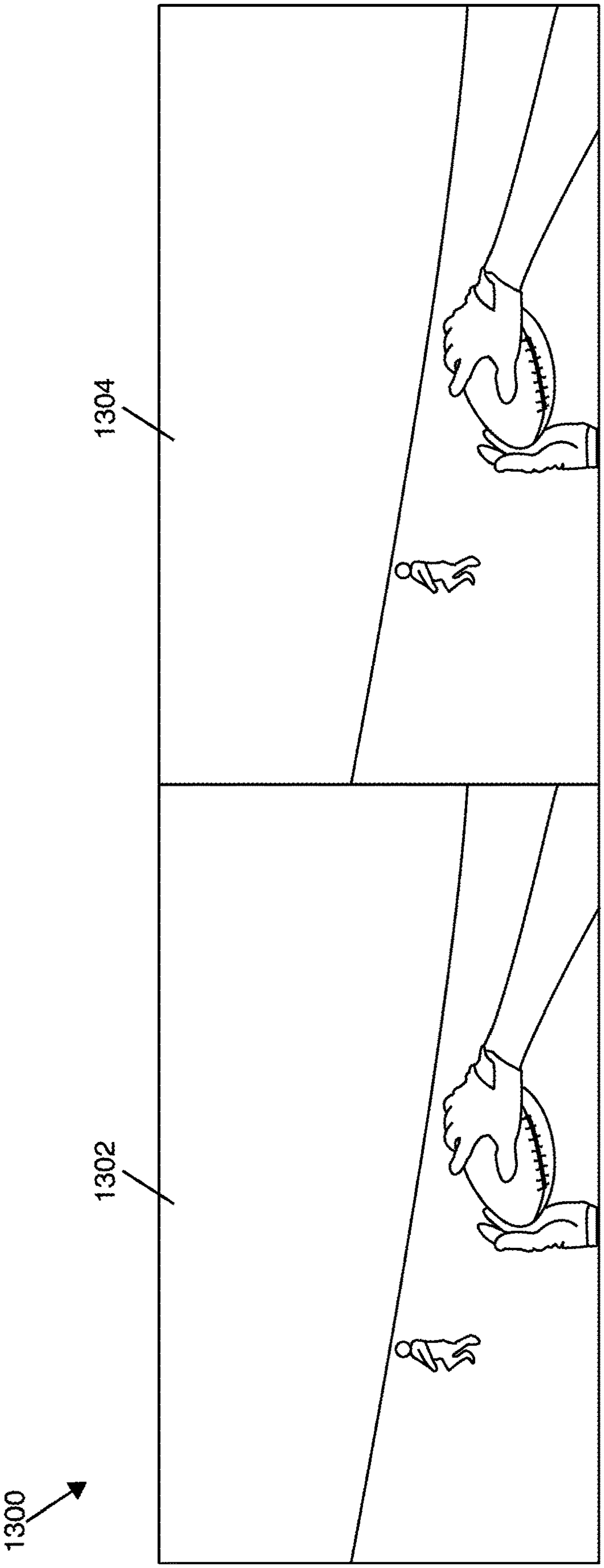
FIGS. 13A and 13B illustrates an image broadcast of a video from a point of view camera system including two cameras, in accordance with various embodiments.
Figure 13B:
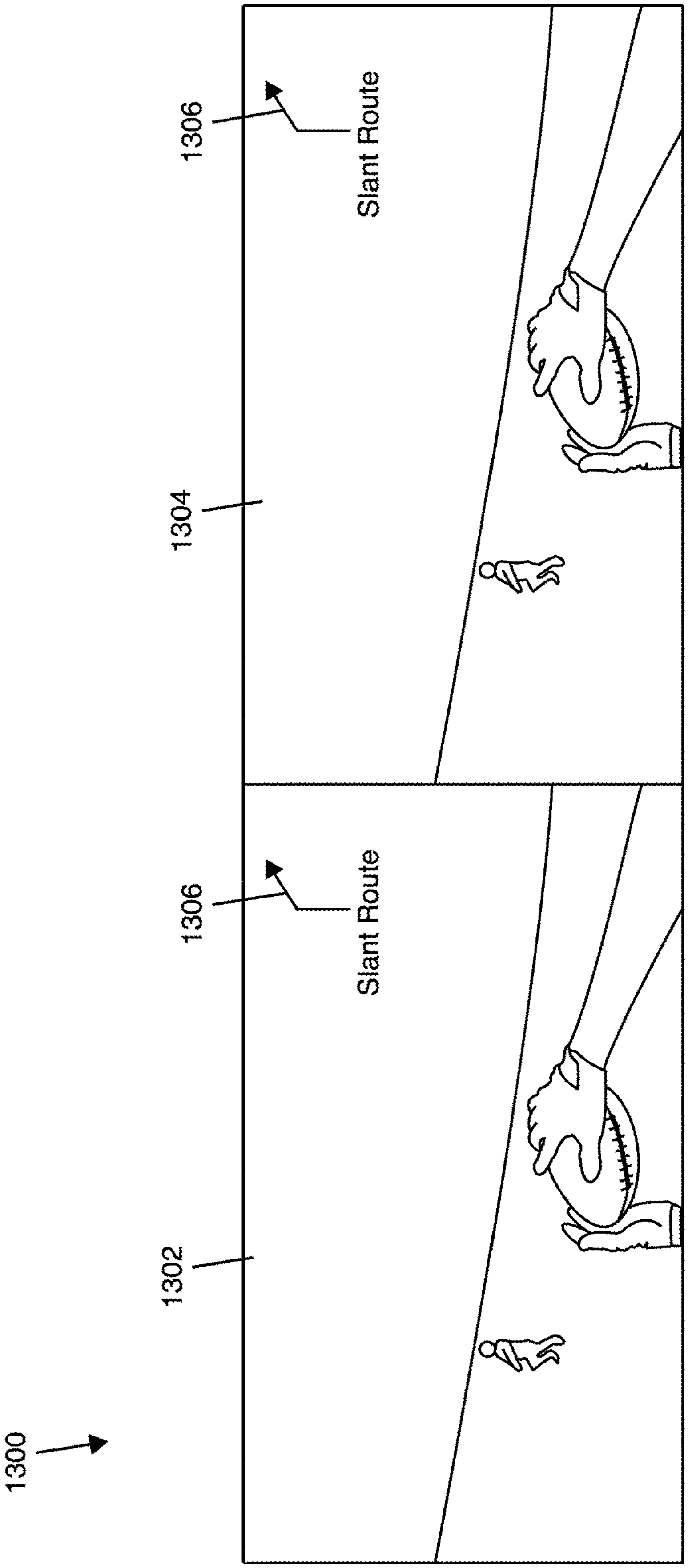
Figure 14B:
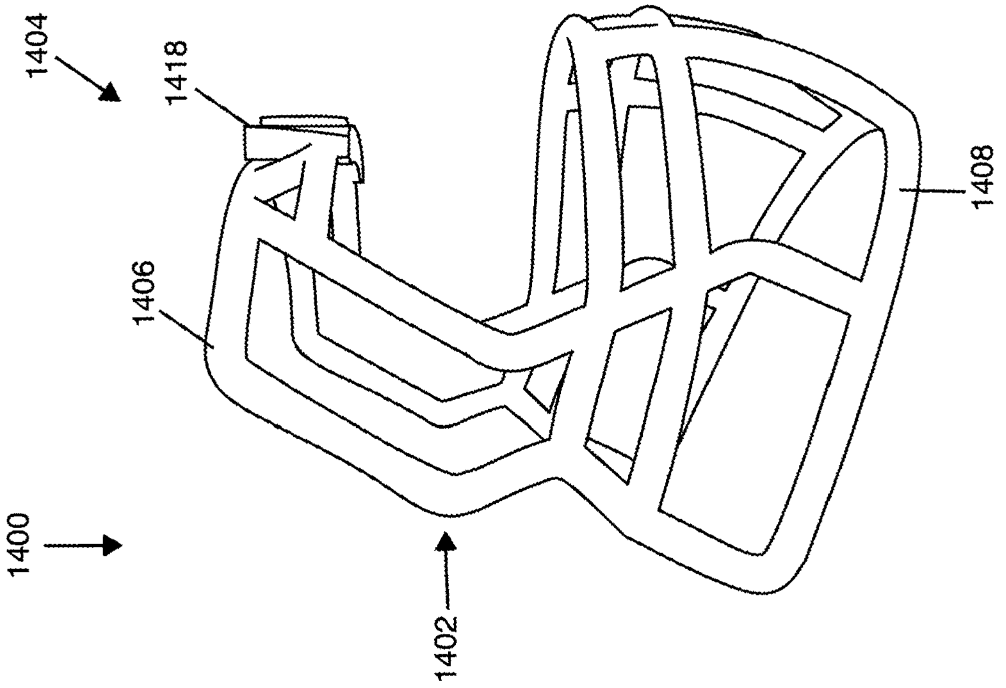
FIGS. 14A, 14B, 14C, and 14D illustrate a point of view camera system integrated into a facemask of a football helmet, in accordance with various embodiments.
Figure 14A:
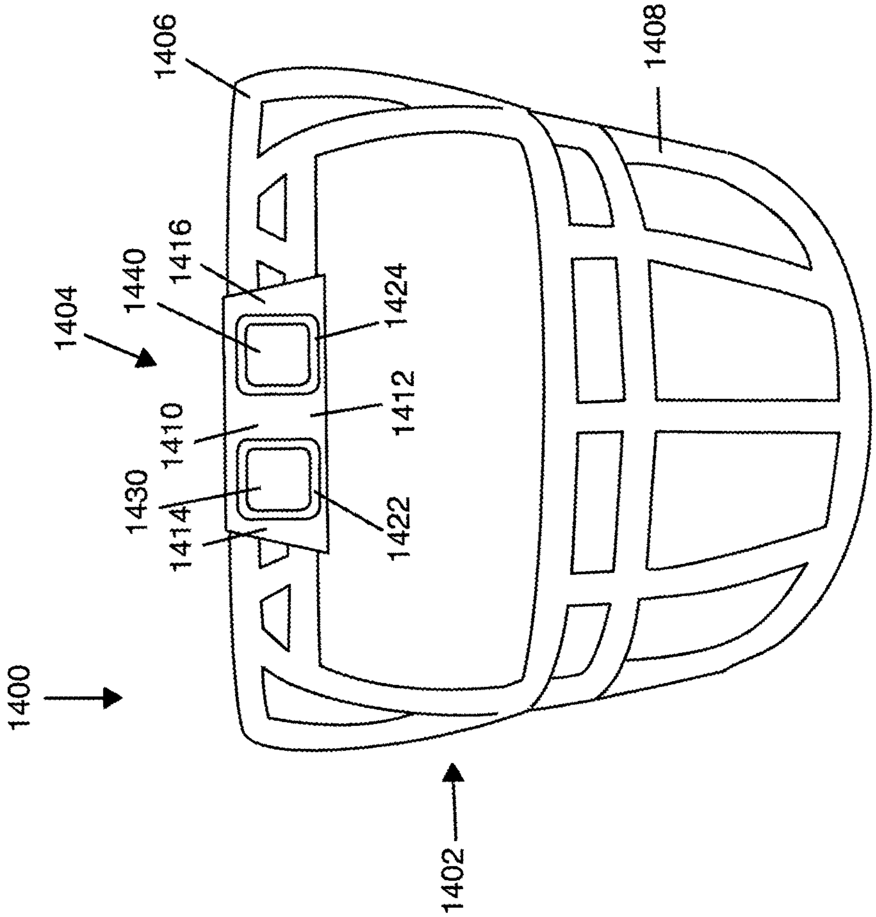
Figure 14D:
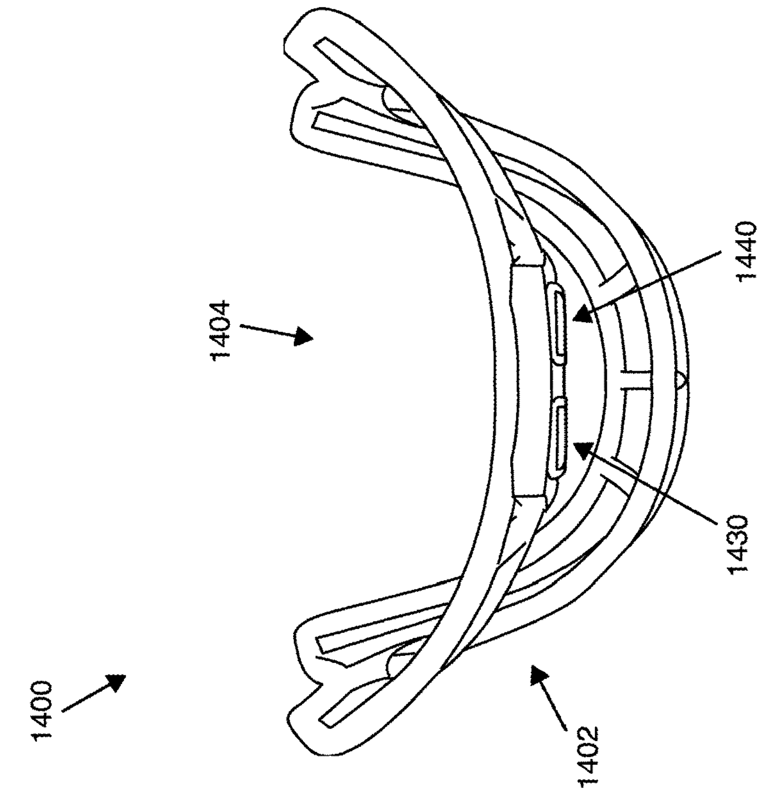
Figure 14C:
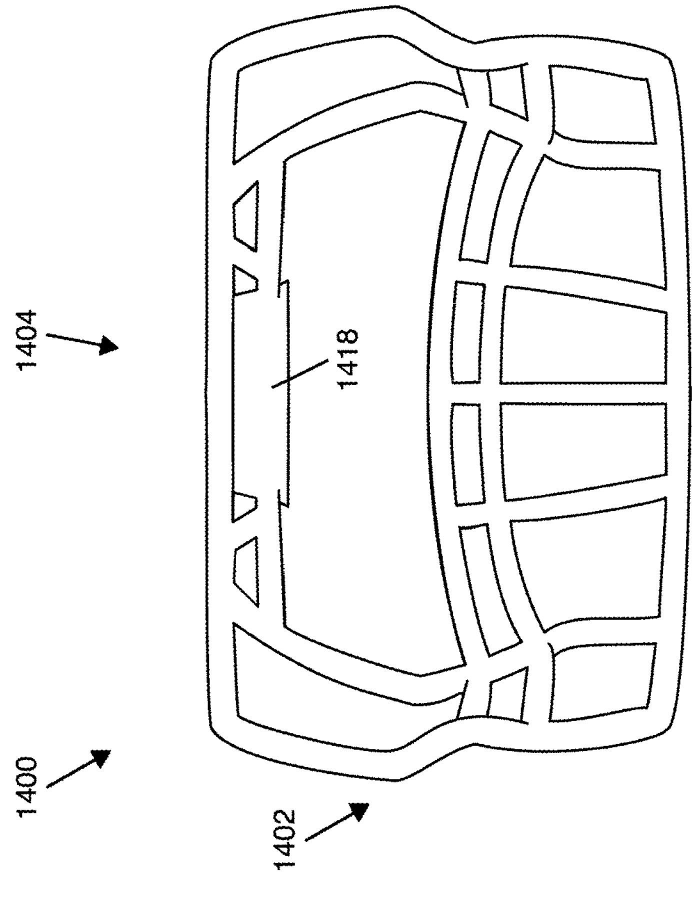

Referring now to FIGS. 13A and 13B, point of view (POV) images 1300 for stereo or virtual reality viewing are illustrated, in accordance with various embodiments. In various embodiments, POV images 1300 may be viewed using a VR headset, 3-dimension (3D) viewing glasses or goggles, or other mechanisms. Viewing POV images 1300 provides depth perception to the point of view video recorded by embodiments disclosed herein. POV image 1300 includes a left POV image 1302 and a right POV image 1304. In various embodiments, POV image 1300 may further include an information bar (e.g., information bar 1004).

In various embodiments, POV image 1300 may further include a training aid 1306. In the depicted embodiment, training aid 1306 is a pass route for a wide receiver wearing one of the camera housings disclosed herein. In various embodiments, training aid 1306 may be a block pattern, a defensive pattern, a player call out, or a play count, among other graphics that may provide additional aids to a user training by watching pre-recorded video.

Referring now to FIGS. 14A-14D, a point of view (POV) camera system 1400 is illustrated in accordance with various embodiments. POV camera system 1400 includes a facemask 1402 and a camera housing 1404. Facemask 1402 has an upper portion 1406 and a lower portion 1408. Camera housing 1404 may be integrated into upper portion 1406, as illustrated. In various embodiments, camera housing 1404 may be integrated into lower portion 1408, a side portion, or other location of facemask 1402.

Camera housing 1404 includes similar components to those described above with respect to POV camera system 600 in FIGS. 6A-6D, including a top 1410, a bottom 1412, a first sidewall 1414, a second sidewall 1416, a front wall 1418, a back wall 1420, a first opening 1422, a second opening 1424, a first camera lens 1430, a first image sensor, one or more microphones, a second camera lens 1440, and a second image sensor.

POV camera system 1400 may further include a power source and a controller circuit. In various embodiments, the power source and the controller circuit may be embedded into facemask 1402. In various embodiments, the power source and the controller circuit may be embedded into a football helmet, such as described below with respect to FIGS. 17A-17D.

Figure 15B:
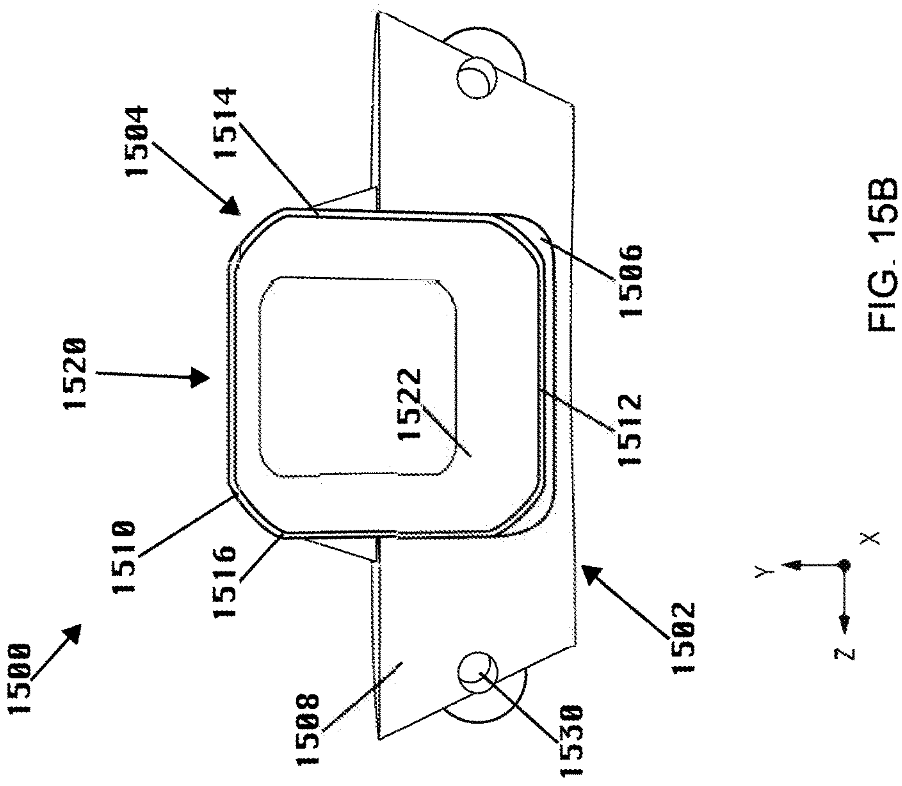
FIGS. 15A, 15B, and 15C illustrate a point of view camera mount to be mounted to a football helmet, in accordance with various embodiments.
Figure 15A:
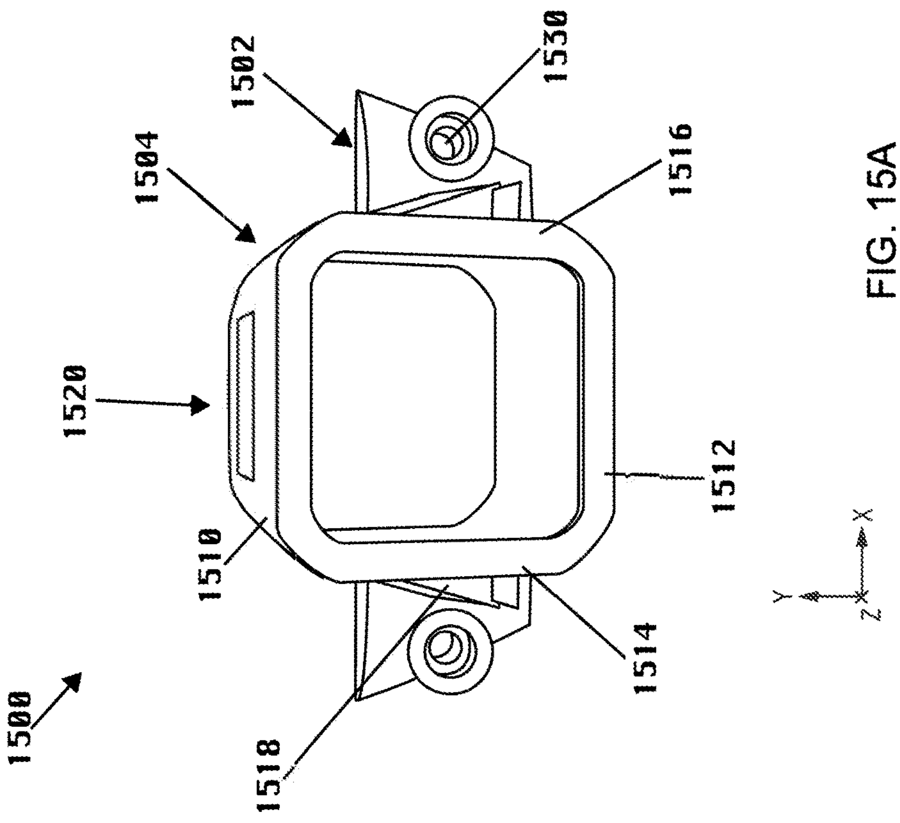
Figure 15C:
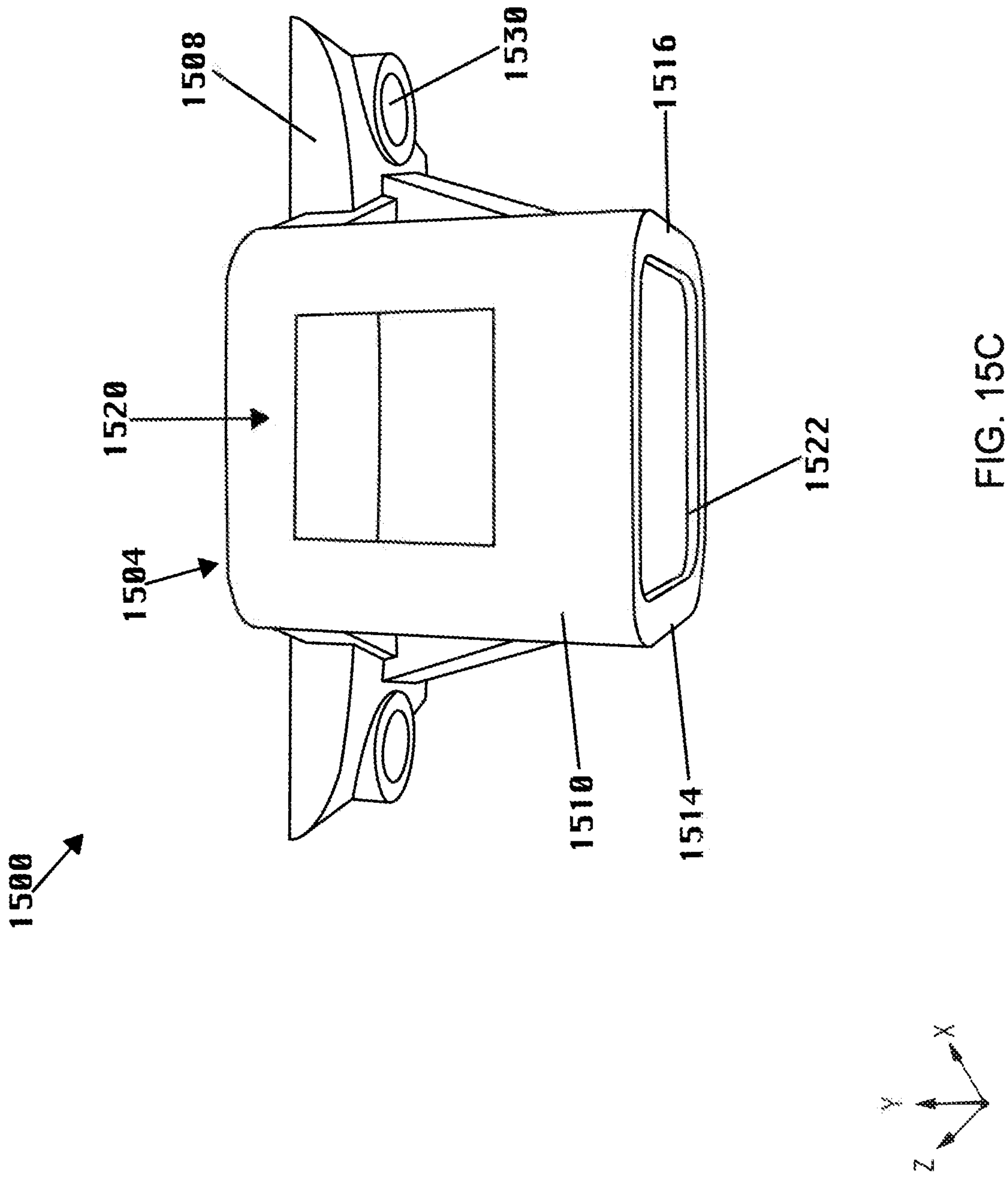
Figure 16B:
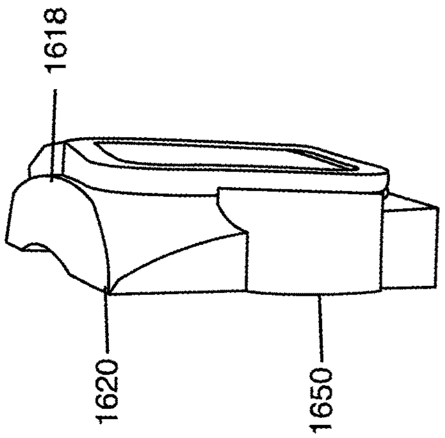
FIGS. 16A, 16B, 16C, and 16D illustrate a point of view camera system including two cameras to be mounted to a football helmet, in accordance with various embodiments.
Figure 16A:
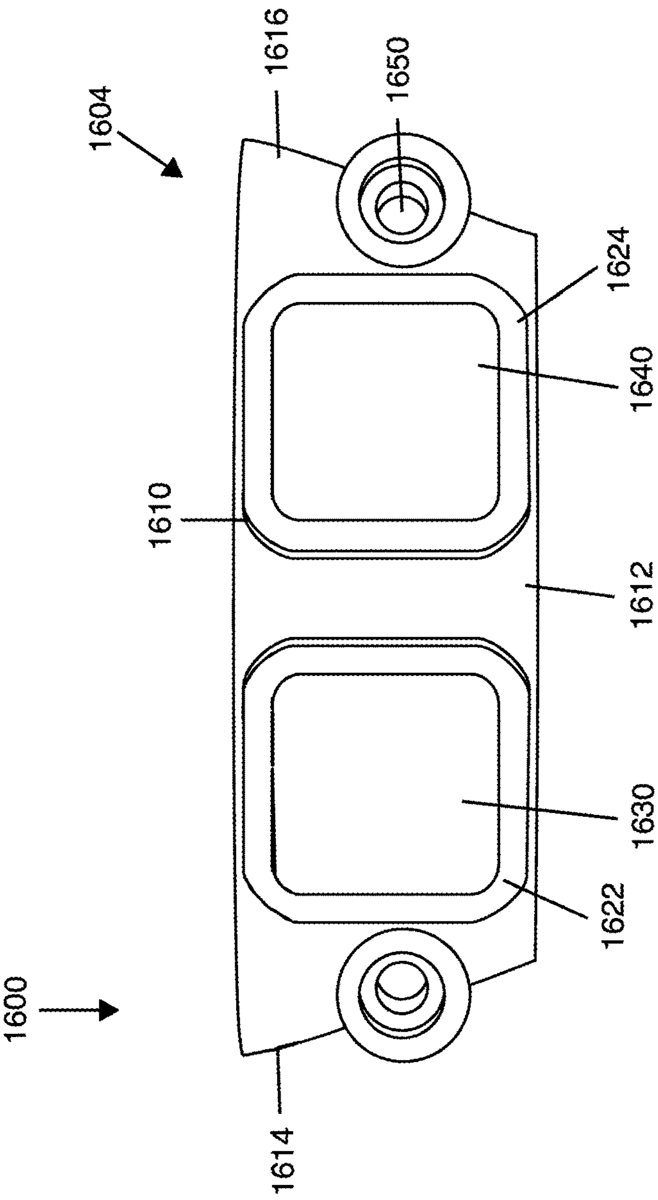
Figure 16D:
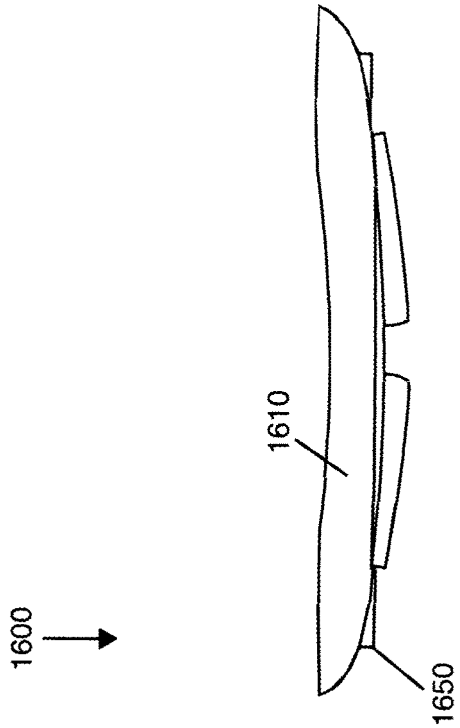
Figure 16C:
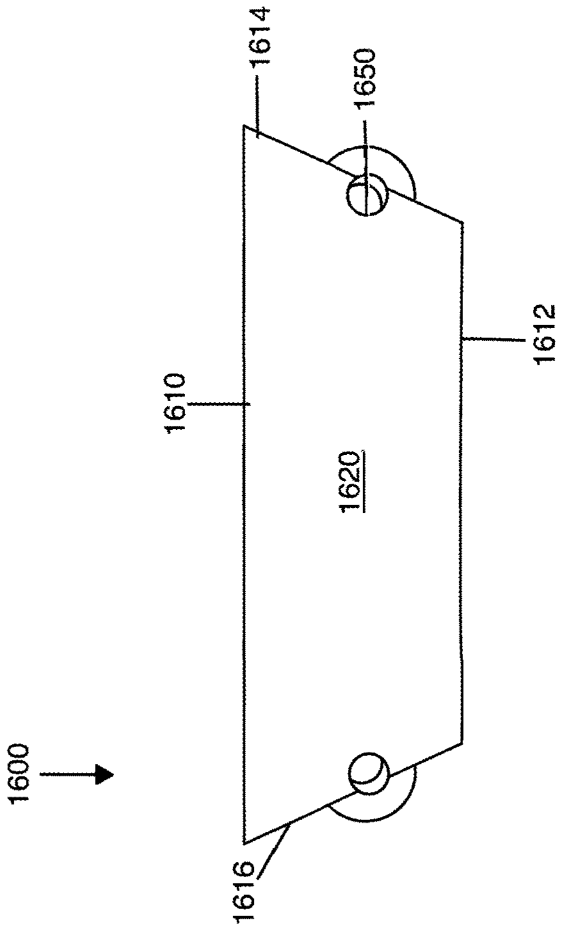
Figure 17B:
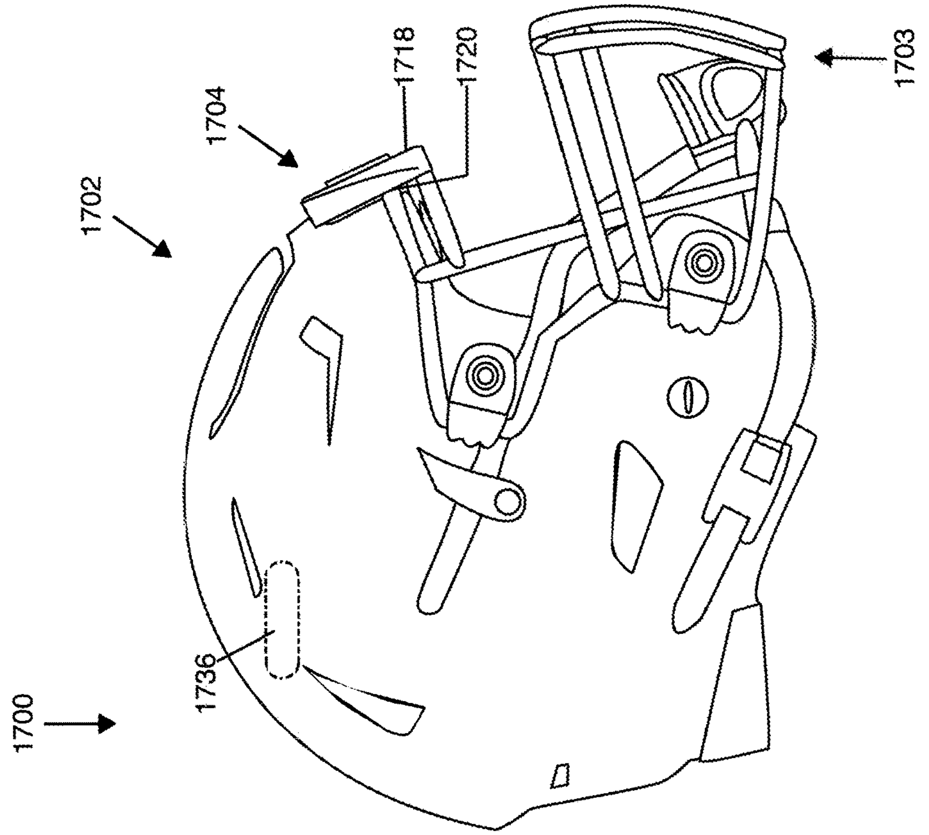
FIGS. 17A, 17B, 17C, and 17D illustrate a point of view camera system integrated into a football helmet, in accordance with various embodiments.
Figure 17A:
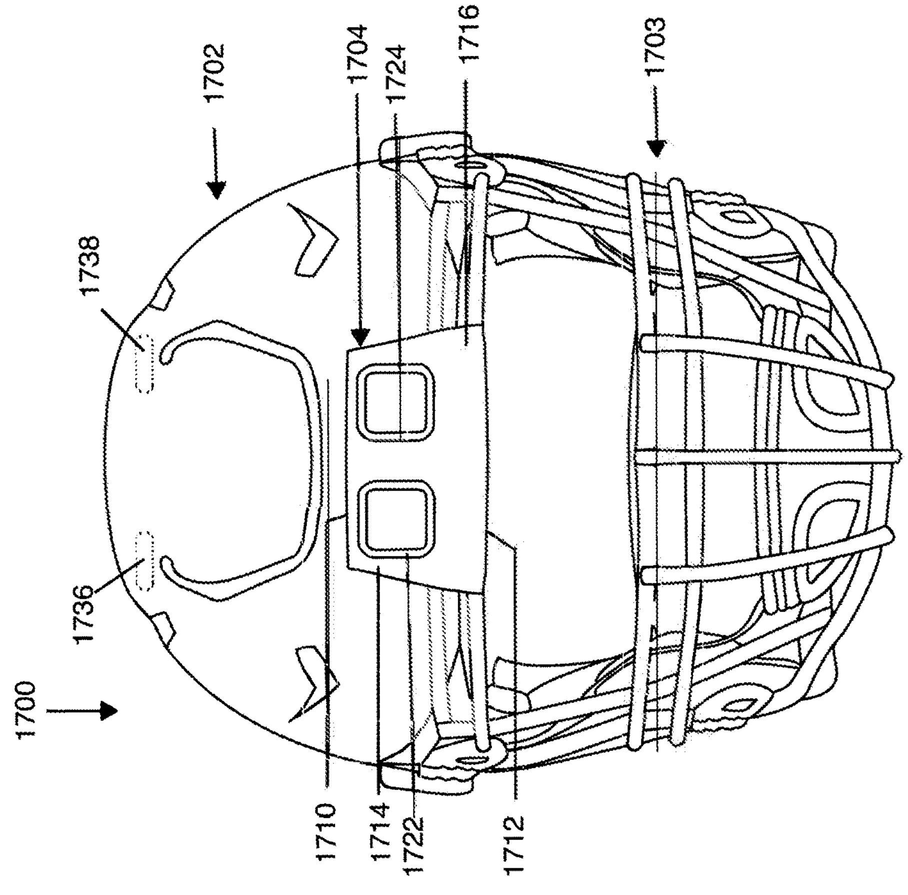
Figure 17D:
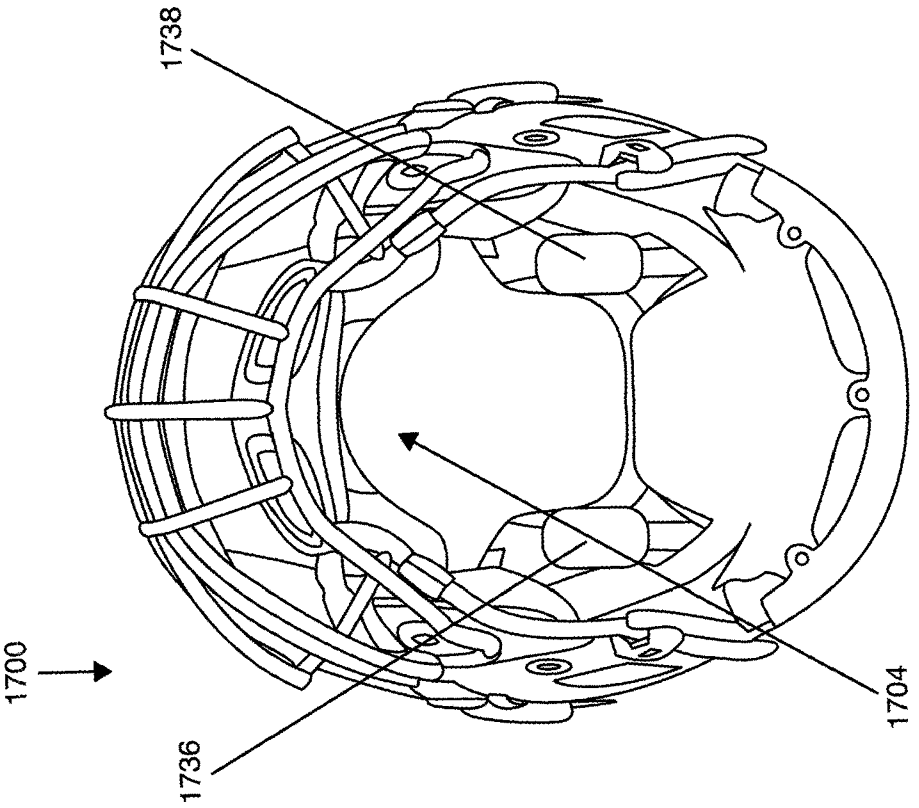
Figure 17C:
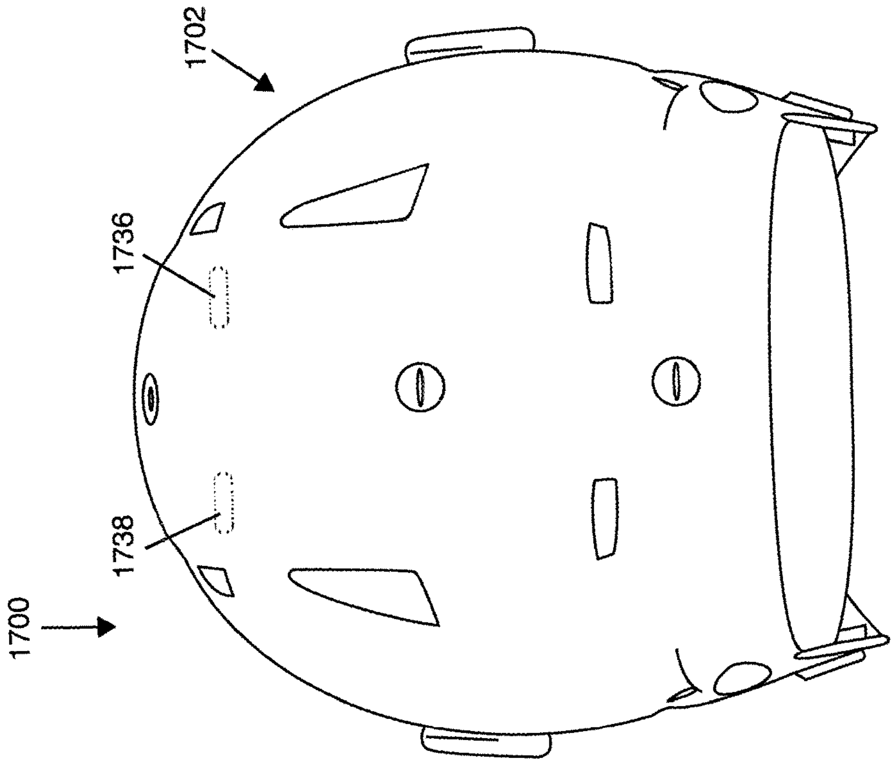

Referring now to FIGS. 15A-15C, a point of view (POV) camera mount 1500 for use with various brands of football helmets is illustrated, in accordance with various embodiments. POV camera mount 1500 includes similar components to those described above with respect to POV camera mount 100 in FIGS. 1A-1D, including a base 1502, a first camera housing 1504, a first portion 1506, a second portion 1508, a first top 1510, a first bottom 1512, a first sidewall 1514, a second sidewall 1516, one or more supports 1518, a first opening 1520, and a first structure 1522. Base 1502 may further include one or more mounting holes 1530 that are configured for securing POV camera mount 1500 to a headwear, such as, for example, a football helmet. In various embodiments, mounting holes 1530 may be located to accommodate various brands of headwear, including helmets. For example, mounting holes 1530 may align with mounting holes currently in use by various companies to secure a facemask to the football helmet.

Referring now to FIGS. 16A-16D, a point of view (POV) camera system 1600 for use with various brands of football helmets is illustrated, in accordance with various embodiments. POV camera system 1600 includes a camera housing 1604. Camera housing 1604 includes similar components to POV camera system 600 in FIGS. 6A-6D, including a top 1610, a bottom 1612, a first sidewall 1614, a second sidewall 1616, a front wall 1618, a back wall 1620, a first opening 1622, a second opening 1624, a first camera lens 1630, a first image sensor 1632, one or more microphones 1634, a second camera lens 1640, and a second image sensor 1642. POV camera system 1600 further includes one or more mounting holes 1650 disposed through camera housing 1604. Mounting holes 1650 are configured to secure POV camera system 1600, and more specifically, camera housing 1604, to a headwear, such as, for example, a football helmet. In various embodiments, mounting holes 1650 may be located to accommodate various brands of headwear, including helmets. For example, mounting holes 1650 may align with mounting holes currently in use by various companies to secure a facemask to the football helmet.

Referring now to FIGS. 17A-17D, a point of view (POV) camera system 1700 that is integrated in a football helmet is illustrated, in accordance with various embodiments. POV camera system includes a football helmet 1702, a facemask 1703, a camera housing 1704, a power source 1736, and a controller circuit 1738. Camera housing 1704 includes similar components to previously described embodiments including POV camera system 600 in FIGS. 6A-6D, including a top 1710, a bottom 1712, a first sidewall 1714, a second sidewall 1716, a front wall 1718, a back wall 1720, a first opening 1722, a second opening 1724, a first camera lens 1730, a first image sensor 1732, one or more microphones 1734, a second camera lens 1740, and a second image sensor 1742. In various embodiments, camera housing 1704 may be integrated into facemask 1703. In various embodiments, camera housing 1704 may be secured to facemask 1703 similar to POV camera system 1600 described above with respect to FIGS. 16A-16D. Power source 1736 and controller circuit 1738 may be secured to football helmet 1702 and beneath padding in football helmet 1702.

Figure 18B:
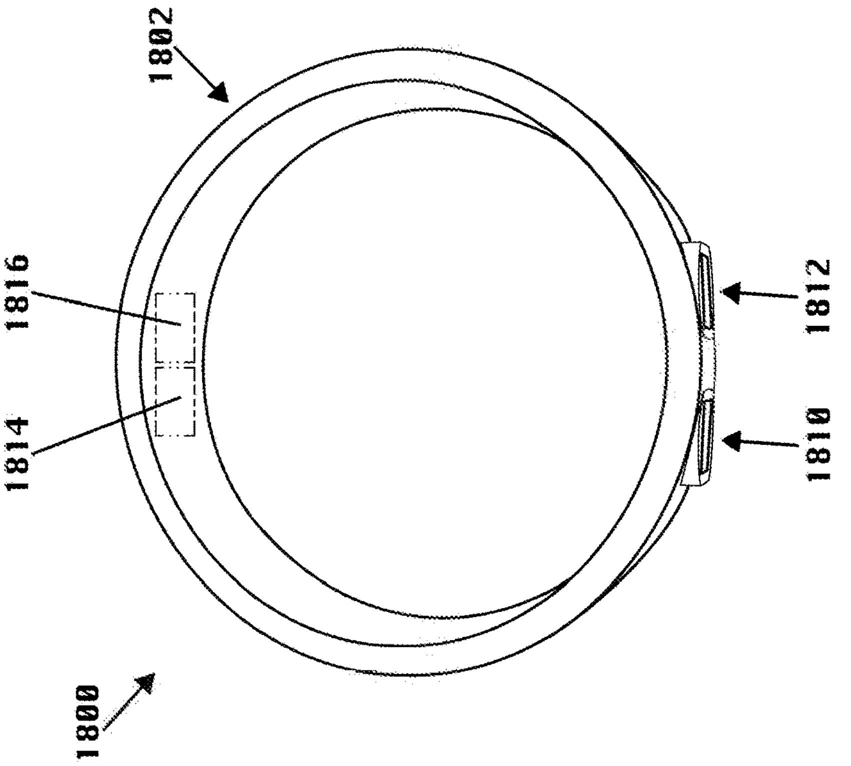
FIGS. 18A, 18B, and 18C illustrate a point of view camera system integrated into a headband, in accordance with various embodiments.
Figure 18A:
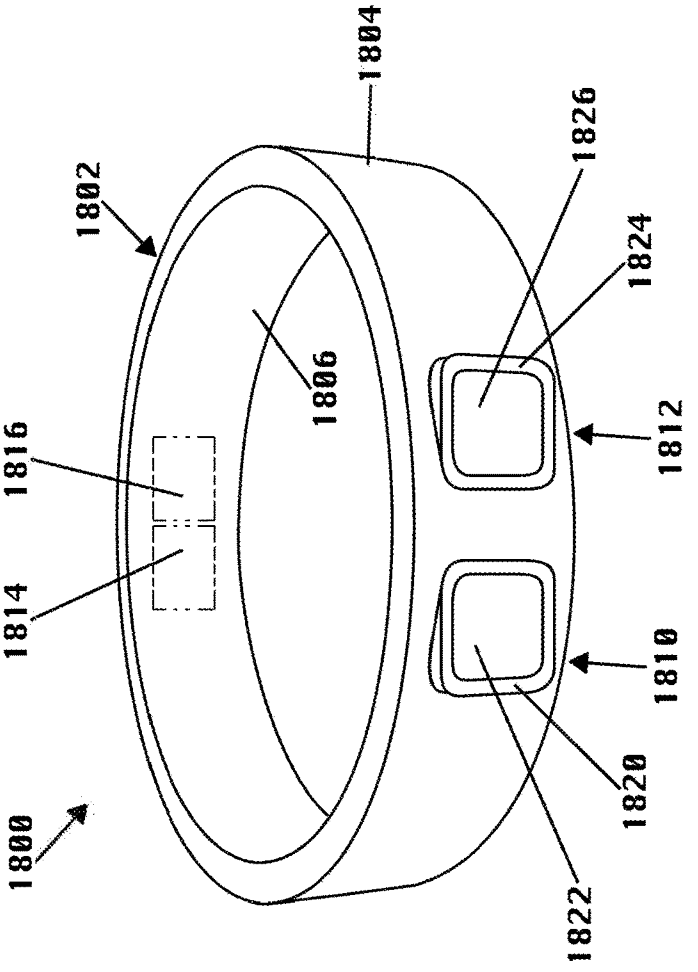
Figure 18C:
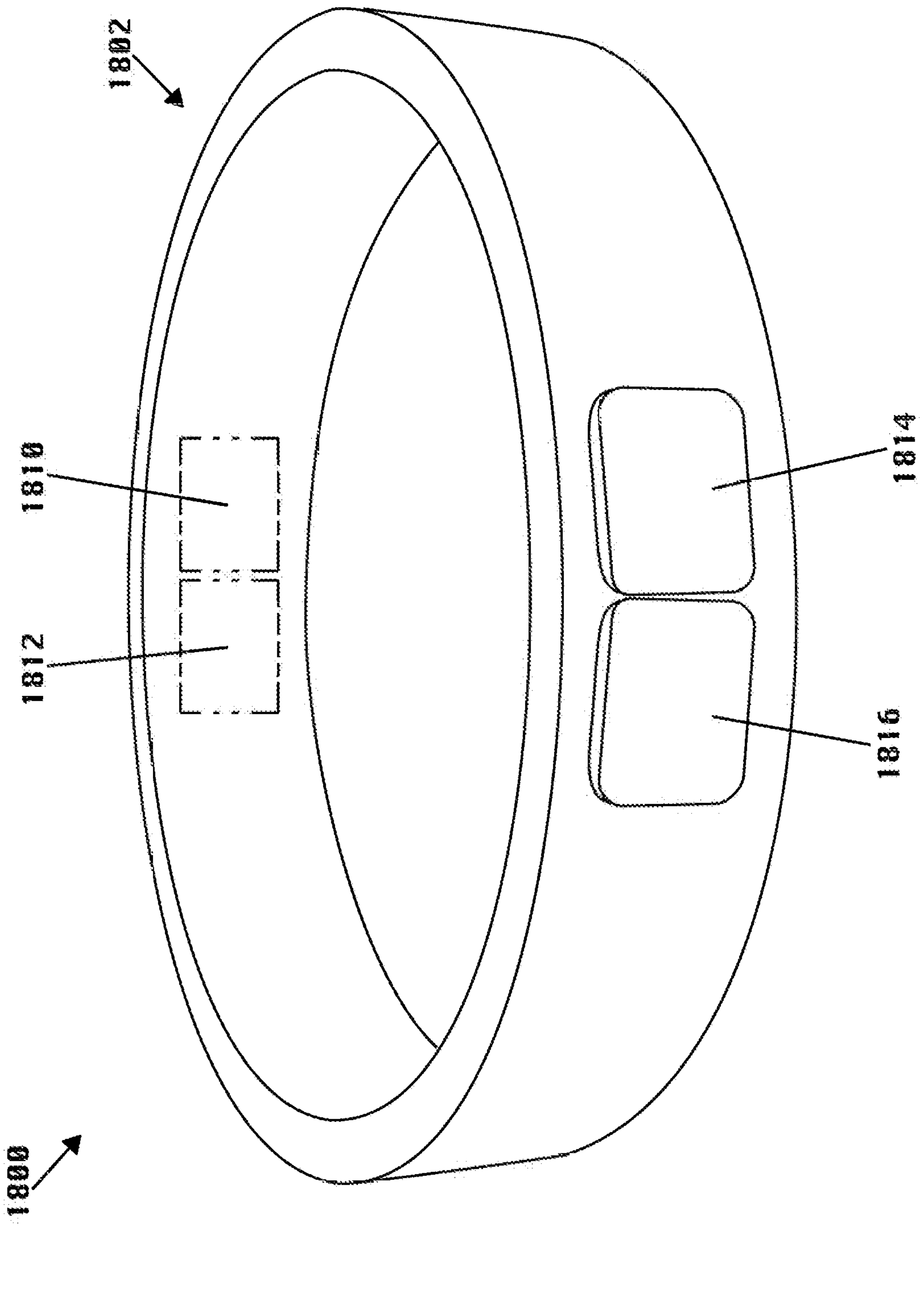

Referring now to FIGS. 18A-18C, a point of view (POV) camera system 1800 is illustrated, in accordance with various embodiments. POV camera system 1800 includes a head band 1802 including an outer surface 1804 and an inner surface 1806. POV camera system 1800 further includes a first camera 1810, a second camera 1812, a power source 1814, and a controller circuit 1816. First camera 1810 includes a first camera housing 1820 and a first lens 1822 with a first image sensor disposed within first camera housing 1820 and coupled to first lens 1822. Second camera 1812 includes a second camera housing 1824 and a second lens 1826 with a second image sensor disposed within second camera housing 1824 and coupled to second lens 1826. First camera 1810 and second camera 1812 are disposed adjacent each other and are aligned to provide point of view recordings. First camera housing 1820 and second camera housing 1824 extend out from head band 1802. In various embodiments, first camera housing 1820 and second camera housing 1824 may extend past outer surface 1804.

In various embodiments, power source 1814 and controller circuit 1816 are disposed between outer surface 1804 and inner surface 1806. In various embodiments power source 1814 and controller circuit 1816 may be disposed within head band 1802 opposite first camera 1810 and second camera 1812. In various embodiments power source 1814 and controller circuit 1816 may be offset about 90° on either side of first camera 1810 and second camera 1812. In various embodiments, power source 1814 and controller circuit 1816 may be disposed in different locations within head band 1802.

Figure 19B:
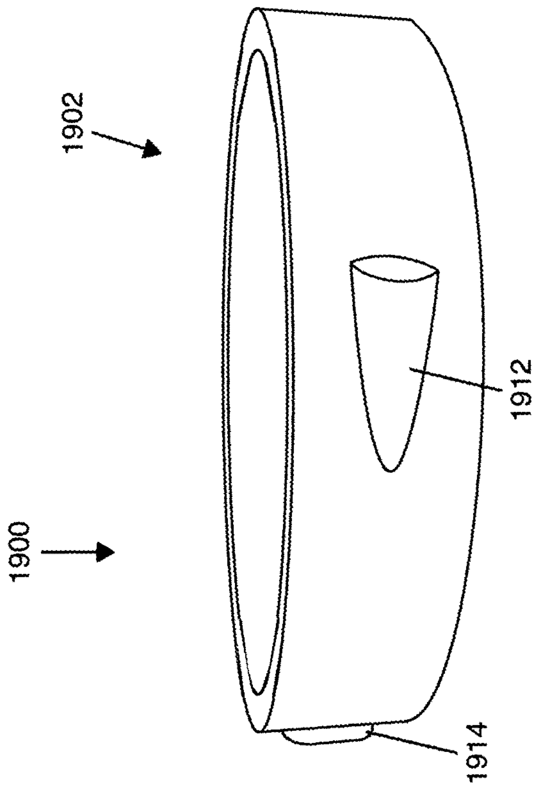
FIGS. 19A, 19B, and 19C illustrate a point of view camera system integrated into a headband, in accordance with various embodiments.
Figure 19A:
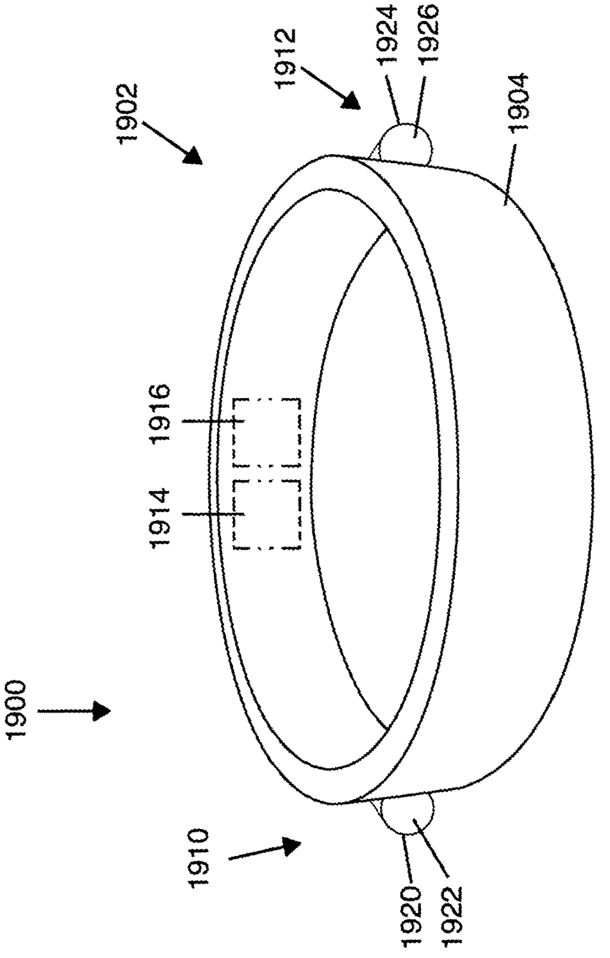
Figure 19C:
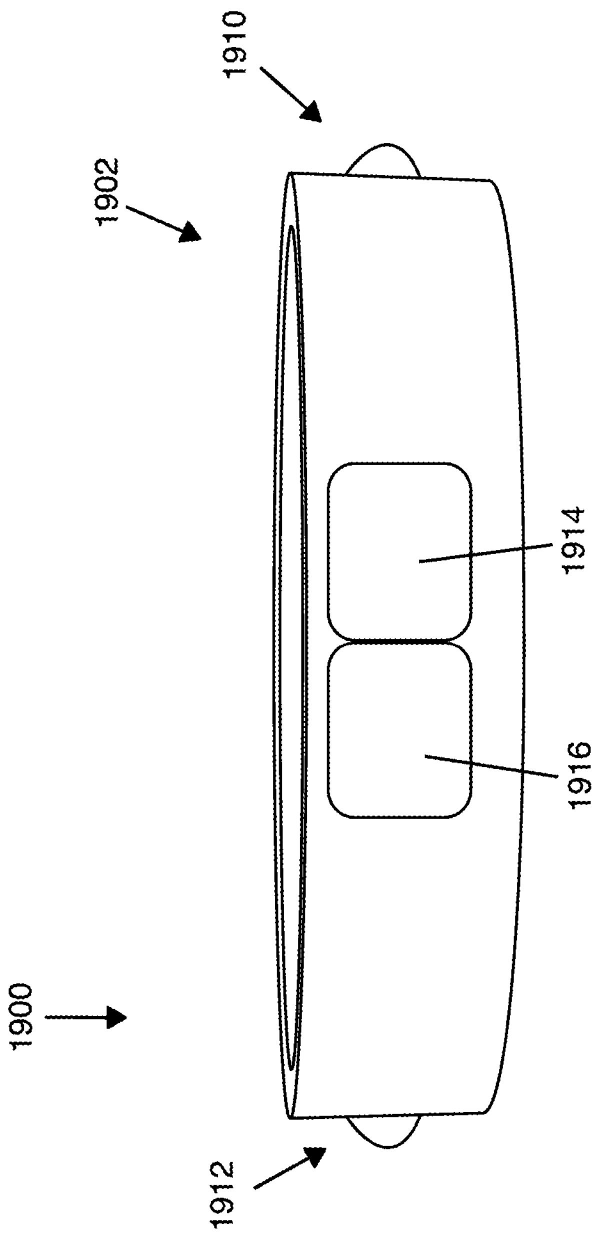

Referring now to FIGS. 19A-19C, a point of view (POV) camera system 1900 is illustrated, in accordance with various embodiments. POV camera system 1900 includes similar components to those described above with respect to POV camera system 1800 in FIGS. 18A-18C including a head band 1902, an outer surface 1904, an inner surface 1906, a first camera 1910, a second camera 1912, a power source 1914, and a controller circuit 1916, a first camera housing 1920, a first lens 1922, a first image sensor, a second camera housing 1924, a second lens 1926, and a second image. First camera 1910 and second camera 1912 are disposed opposite each other on either side of head band 1902 on outer surface 1904 and are aligned to provide point of view recordings. First camera housing 1920 and second camera housing 1924 extend out from head band 1902.

In various embodiments, power source 1914 and controller circuit 1916 are disposed between outer surface 1904 and inner surface 1906 along a back portion of head band 1902 (e.g., offset 90° from both first camera 1910 and second camera 1912). In various embodiments power source 1914 and controller circuit 1916 may be disposed adjacent first camera 1910 and second camera 1912, respectively. In various embodiments, power source 1914 and controller circuit 1914 may be disposed in different locations within head band 1902.

Figure 20:
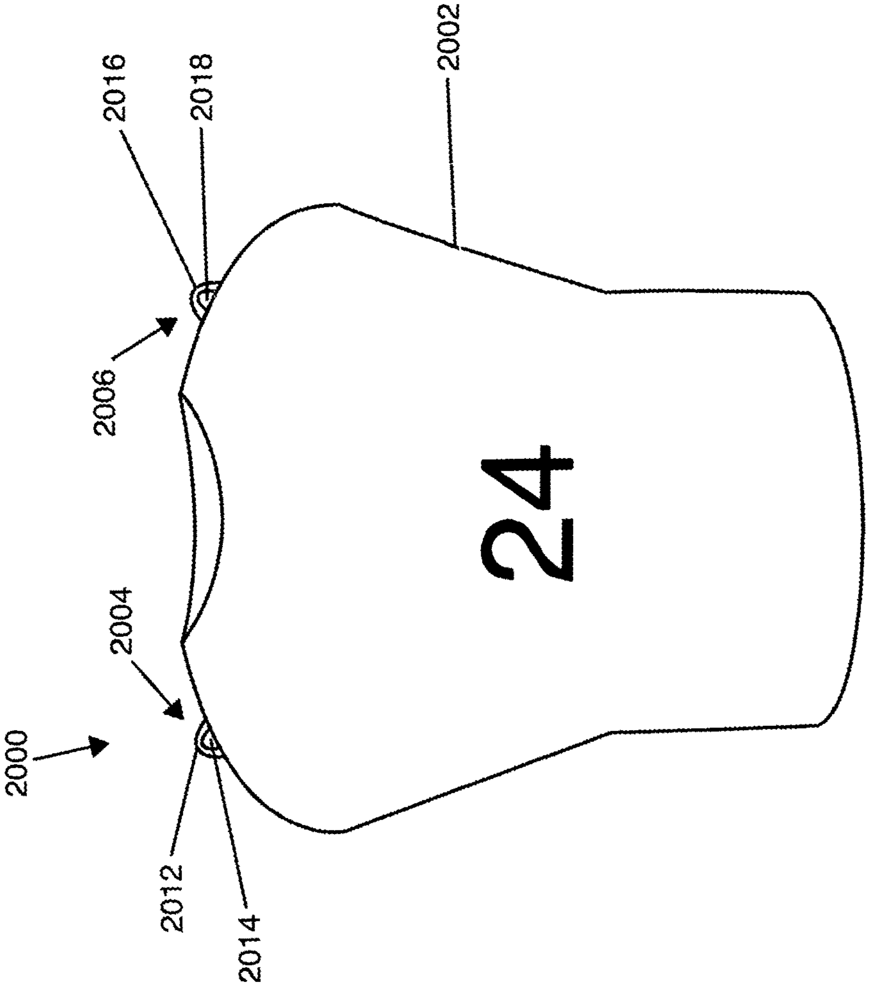
FIG. 20 illustrates shoulder mounted cameras attached to a jersey, in accordance with various embodiments.
Figure 22B:
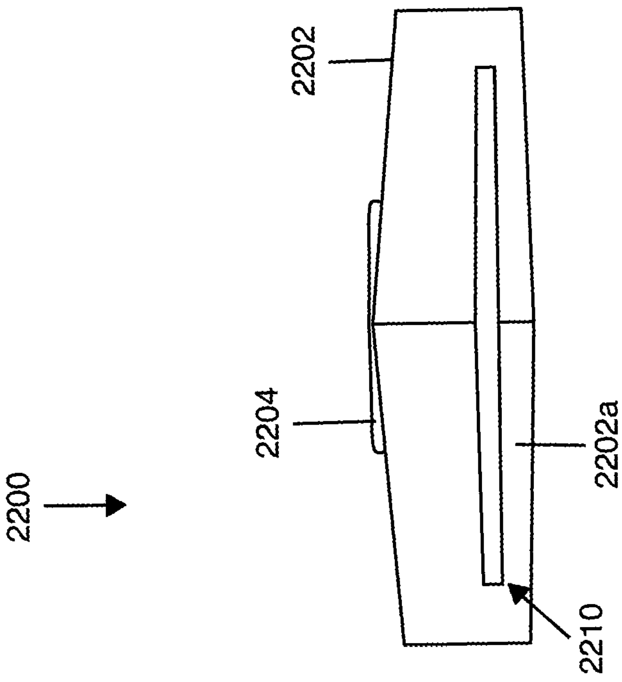
FIGS. 22A, 22B, 22C, and 22D illustrate a camera system to be secured to a jersey, in accordance with various embodiments.
Figure 22A:
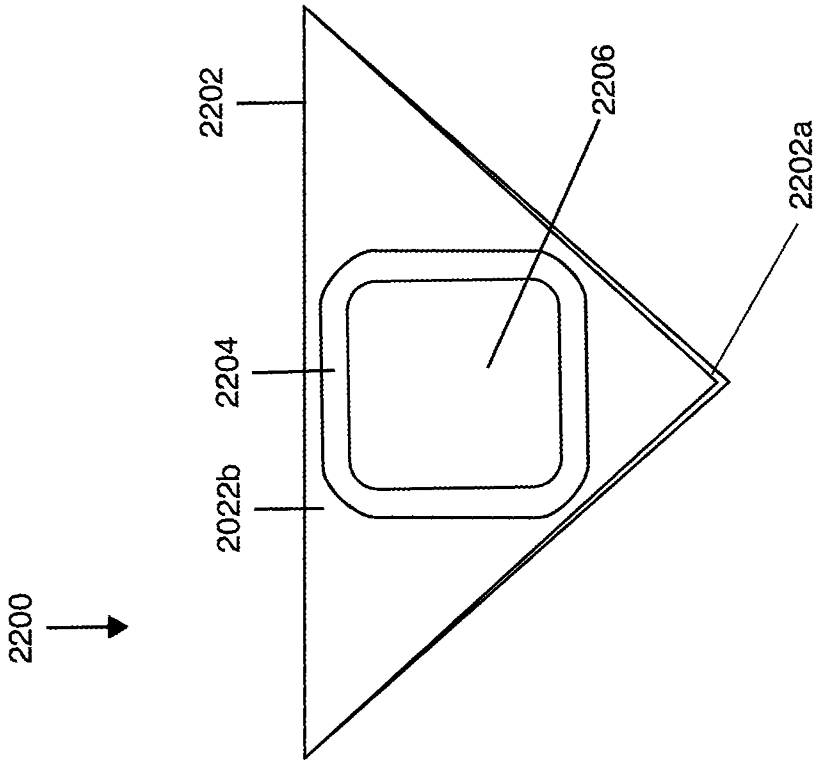
Figure 22C:
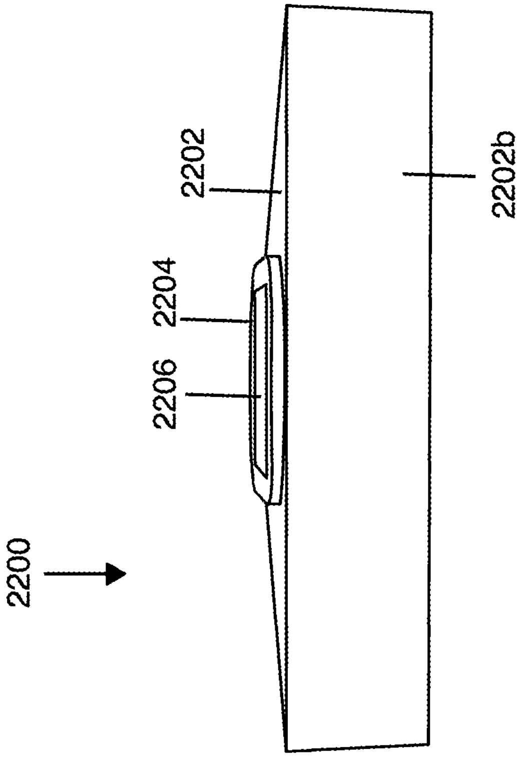
Figure 22D:
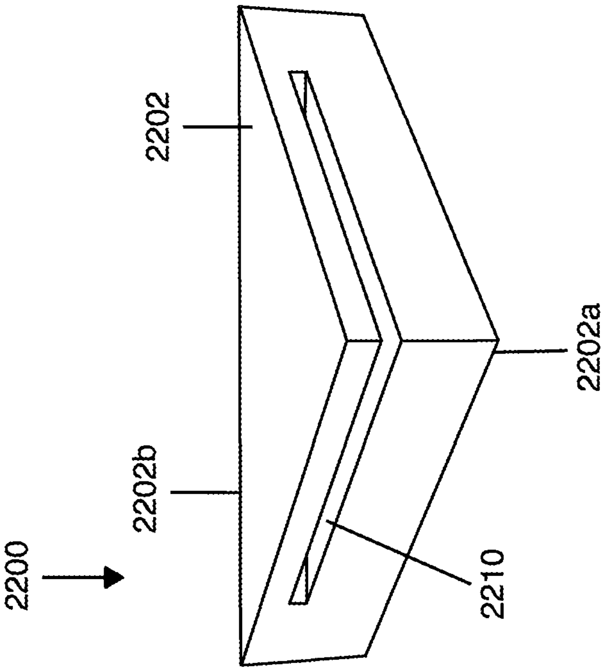
Figure 23B:
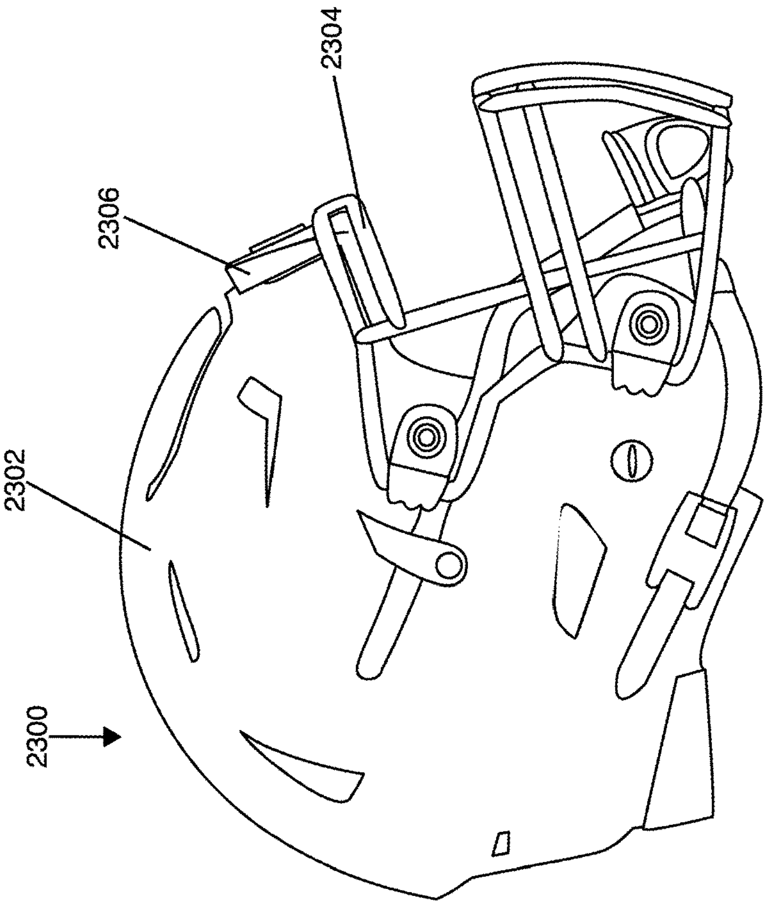
FIGS. 23A, 23B, 23C, 23D, 23E, and 23F illustrate a point of view camera system mounted to a football helmet, in accordance with various embodiments.
Figure 23A:
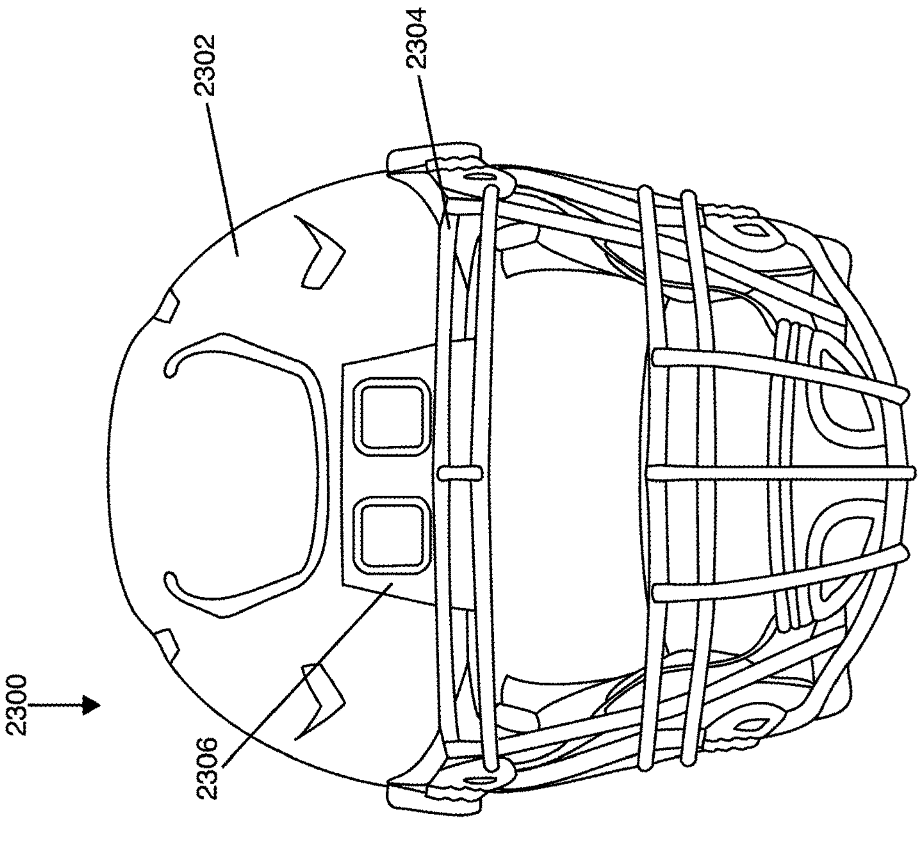
Figure 23D:
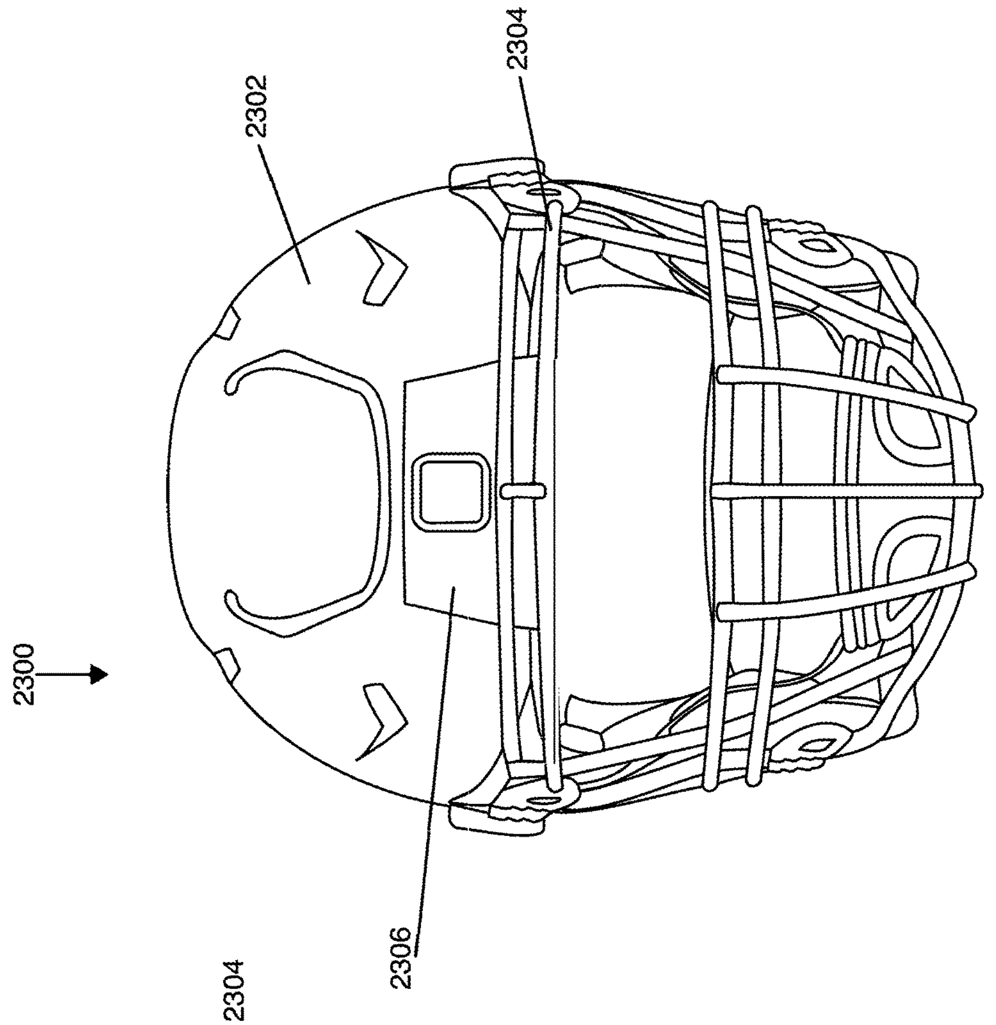
Figure 23C:
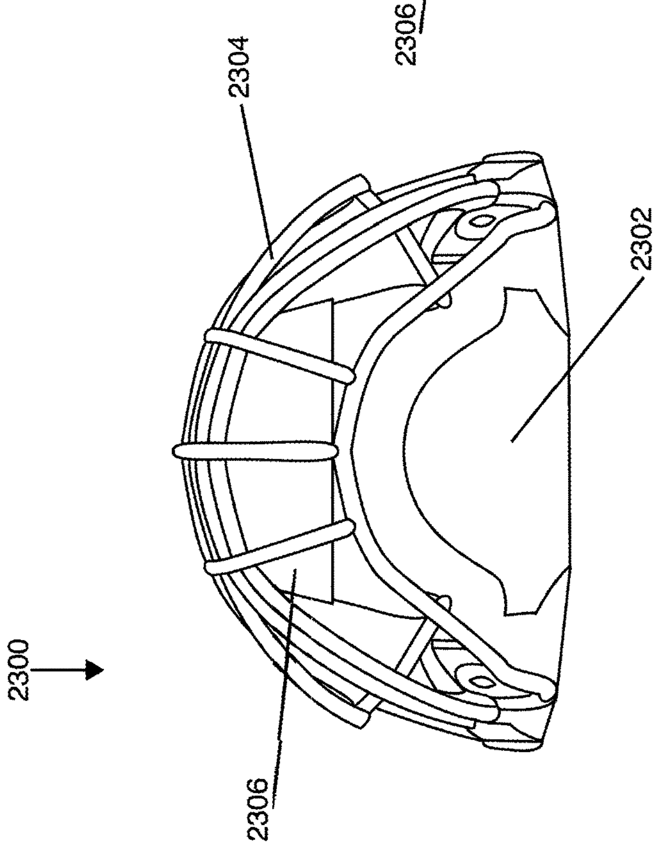
Figure 23F:
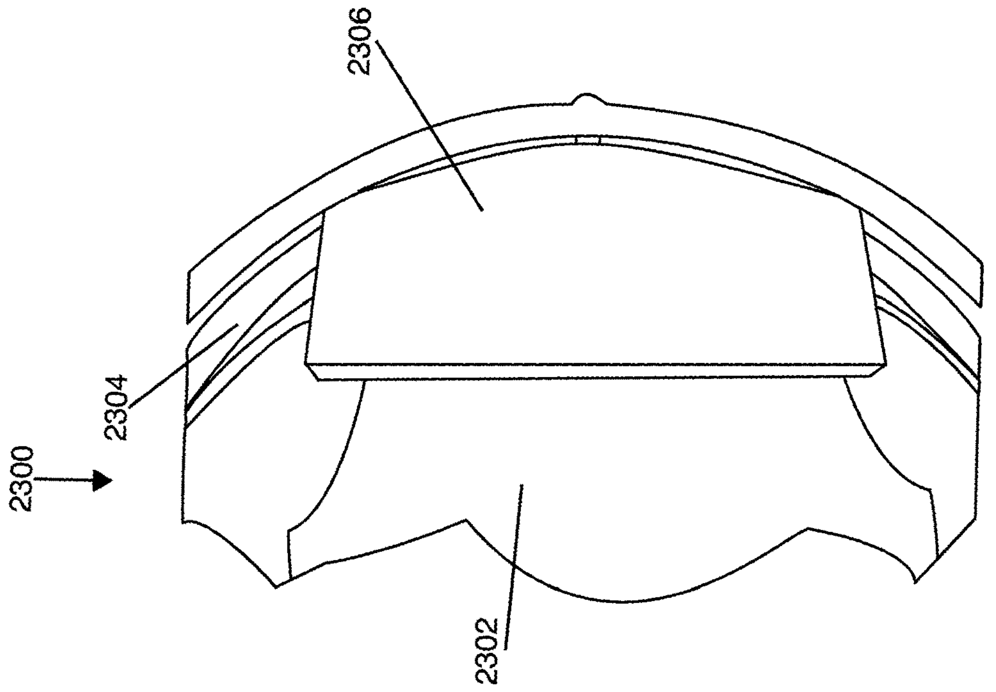
Figure 23E:
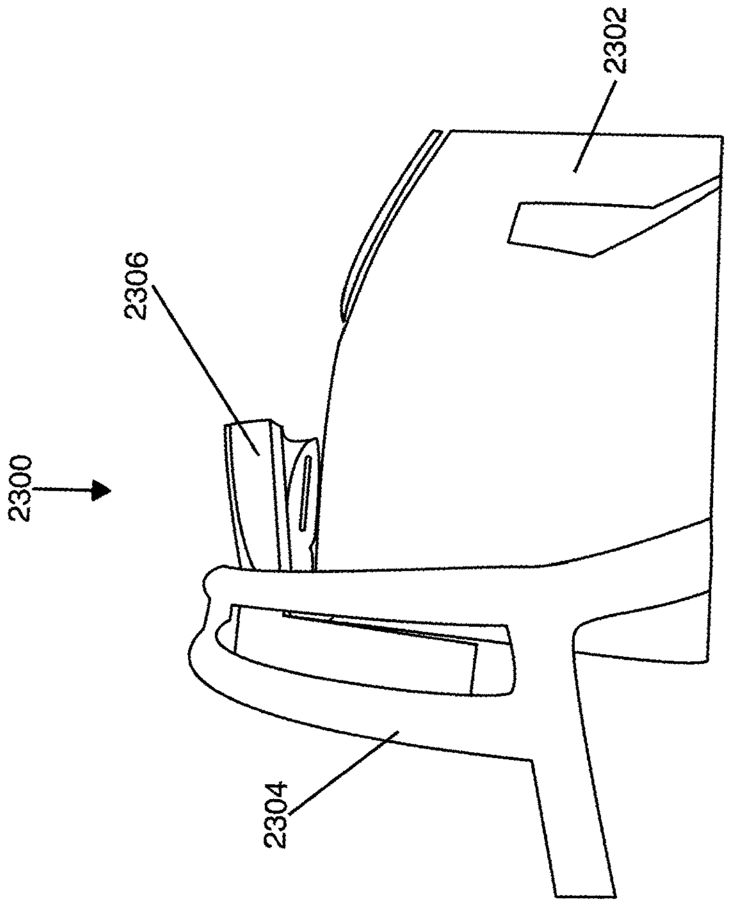

Referring now to FIG. 20, a shoulder view camera system 2000 is illustrated, in accordance with various embodiments. Camera system 2000 includes a jersey 2002, a first camera 2004, a second camera 2006, a first camera 2008, and a second camera 2010. Camera system 2000 may include similar components to other embodiments described above including a first camera housing 2012, a first lens 2014, a first image sensor, a second camera housing 2016, a second lens 2018, and a second image sensor. First camera 2008 includes first camera housing 2012, first lens 2014, and first image sensor. First lens 2014 and first image sensor may be disposed within first camera housing 2012, with first lens 2014 coupled to first image sensor. Second camera 2010 includes second camera housing 2016, second lens 2018, and second image sensor. Second lens 2018 and second image sensor may be disposed within second camera housing 2016, with second lens 2018 coupled to second image sensor.

Camera system 2000 may further include a power source and a controller circuit. In various embodiments, power source and controller circuit may be integrated into a harness worn beneath jersey 2002. In various embodiments, power source and controller circuit may be integrated into jersey 2002 at various locations including chest, upper back, shoulders, and/or lower back.

Figure 21:
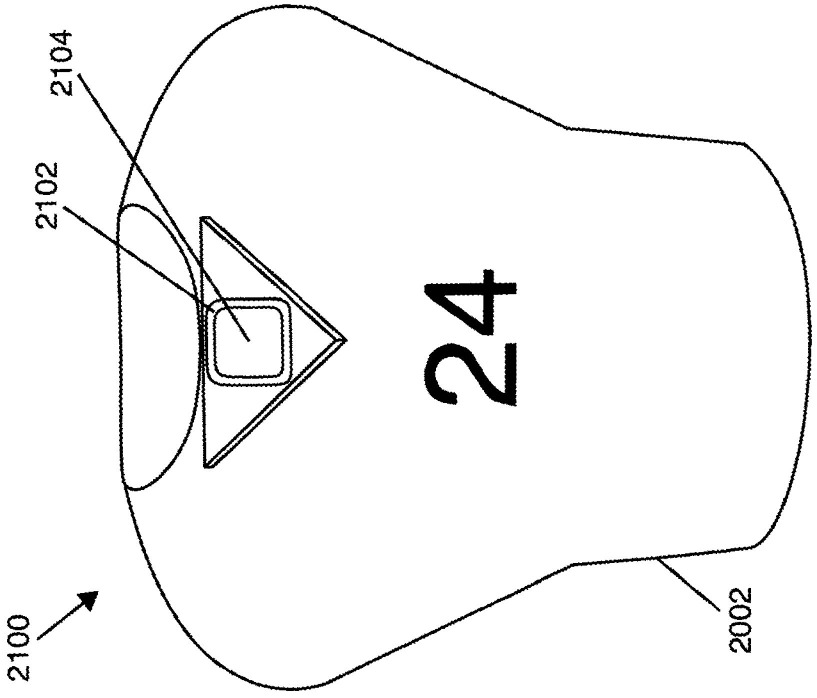
FIG. 21 illustrates a chest mounted camera secured to a jersey, in accordance with various embodiments.

Referring now to FIG. 21, a chest view camera system 2100 is illustrated, in accordance with various embodiments. Camera system 2100 includes a camera housing 2102, a camera lens 2104 disposed in camera housing 2102, and an image sensor coupled to camera lens 2104. Camera housing 2102 includes a structural feature configured to attach camera system 2100 to jersey 2002. In various embodiments, camera system 2100 further includes a power source and a controller circuit. In various embodiments, the power source and the controller circuit are disposed within camera housing 2102. In various embodiments, the power source and the controller circuit and disposed in a secondary housing that is coupled to camera housing 2102.

Referring now to FIGS. 22A-22D, a chest view camera system 2200 is illustrate, in accordance with various embodiments. Camera system 2200 may be an example of camera system 2100 described above with respect to FIG. 21. Camera system 2200 includes a camera mount 2202, a camera housing 2204, a camera lens 2206 disposed within camera housing 2204, and an image sensor coupled to camera lens 2206. Camera mount 2202 may be triangular in shape with a lower vertex **2202*a* pointing to the ground when being worn by a user. As illustrated in FIG. 21, camera system 2200 is configured to be worn on a shirt, a jacket, or a jersey, among others. When worn, lower vertex 2202*a*** points downward.

Camera housing 2204 may be integrated into camera mount 2202. In various embodiments, camera housing 2204 may be removable from camera mount 2202. Camera mount 2202 includes a securing feature 2210 formed into camera mount 2202 to secure camera mount 2202 to the shirt, jacket, jersey, etc. Securing feature 2210 may be an opening or a slit formed into camera mount 2202 that extends from lower vertex **2202*a* to an upper portion 2202*b* of camera mount 2202. In various embodiments, securing feature 2210 extends behind camera housing 2204 and into camera mount 2202**.

Referring now to FIGS. 23A-23F, various views of an integrated point of view (POV) camera system 2300 are illustrated, in accordance with various embodiments. Integrated POV camera system 2300 includes a football helmet 2302, a facemask 2304, and a POV camera system 2306 mounted to football helmet 2302, including facemask 2304. In various embodiments, POV camera system 2306 may be any one of the previously described POV camera systems 100, 200, 400, 500, 600 as described above in their various variations.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term “substantially,” “about” or “approximately” may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase “means for.” As used herein, the terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A point of view camera system, comprising:

a camera mount configured to attach to a headwear, the camera mount including a base configured to secure the camera mount to the headwear;

a first camera including a first image sensor and a first camera lens;

a second camera including a second image sensor and a second camera lens;

a camera housing configured to attach to the camera mount, the camera housing including:

a first opening configured to receive and secure the first camera; and a second opening configured to receive and secure the second camera, wherein the base includes:

a first portion extending in a first direction;

a second portion extending from the first portion in a second direction orthogonally to the first direction; and a third portion extending from the first portion in the second direction and spaced from second portion by a space.

2. The system of claim 1, further comprising:

a power source coupled to the first camera and the second camera, the power source disposed in the camera mount.

3. The system of claim 2, further comprising:

a controller operatively coupled to the first camera, the second camera, and the power source, the controller disposed in the camera mount.

4. The system of claim 1, wherein the base and the camera housing are a single monolithic component, wherein the base includes a first portion extending in a first direction and a second portion extending orthogonally to the first portion, wherein the camera housing is disposed in the second portion.

5. The system of claim 1, wherein the camera housing includes:

a housing base extending in the first direction;

a housing extending from the housing base in the second direction, the housing including a front wall and a back wall opposite the front wall; and a securing feature extending from the back wall, the securing feature configured to interface with the second portion and the third portion via the space between the second portion and the third portion.

6. The system of claim 5, wherein the headwear is a football helmet including a facemask, the camera mount is configured to be secured to the facemask, and the camera housing is configured to be detachable from the camera mount when the camera mount is secured to the facemask.

7. The system of claim 1, wherein the headwear is a football helmet and the camera mount is integral with a facemask, the facemask configured to attach to the football helmet.

8. The system of claim 1, wherein the headwear is a headband, wherein the camera mount is integral with the headband, and the camera housing is mounted to the headband.

9. The system of claim 1, wherein the headwear is a football helmet, the system further comprising:

a removable pad including a front piece, the removable pad configured to be secured to an interior of the football helmet and the front piece configured to be secured to a front of the football helmet adjacent a facemask, wherein the front piece is the camera mount.

10. A system, comprising:

a first point of view camera;

a second point of view camera;

a remote server;

a processor; and a memory operatively coupled to the processor, the memory comprising instructions stored thereon that, when executed by the processor, cause the processor:

receive a first video stream from the first point of view camera;

receive a second video stream from the second point of view camera;

synchronize the first video stream and the second video stream; and combine the first video stream and the second video stream into a third video stream to be transmitted to a plurality of users, wherein the instructions, when executed by the processor, further cause the processor to:

receive a first player information from the remote server; and insert the first player information in the first video stream before combining the first video stream and the second video stream.

11. The system of claim 10, wherein the instructions, when executed by the processor, further cause the processor to:

receive a second player information from the remote server; and insert the second player information in the second video stream before combining the first video stream and the second video stream.

* * * * *